(12) United States Patent
Wijning et al.

(10) Patent No.: US 12,687,154 B2
(45) Date of Patent: Jul. 21, 2026

(54) OFFSHORE WIND TURBINE ASSEMBLY VESSEL

(71) Applicant: Itrec B.V., Schiedam (NL)

(72) Inventors: Diederick Bernardus Wijning, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 428 days.

(21) Appl. No.: 18/271,182

(22) PCT Filed: Jan. 5, 2022

(86) PCT No.: PCT/EP2022/050166
§ 371 (c)(1),
(2) Date: Jul. 6, 2023

(87) PCT Pub. No.: WO2022/148789
PCT Pub. Date: Jul. 14, 2022

(65) Prior Publication Data
US 2024/0301869 A1     Sep. 12, 2024

(30) Foreign Application Priority Data

| Jan. 6, 2021 | (NL) | ...................................... 2027279 |
| Feb. 3, 2021 | (NL) | ...................................... 2027489 |
| Mar. 19, 2021 | (NL) | ...................................... 2027788 |

(51) Int. Cl.
*F03D 13/25*          (2016.01)
*B63B 35/44*          (2006.01)
(Continued)

(52) U.S. Cl.
CPC .............. *F03D 13/25* (2016.05); *B63B 35/44* (2013.01); *B63B 75/00* (2020.01); *B63B 77/10* (2020.01);
(Continued)

(58) Field of Classification Search
CPC ......... F03D 13/25; B63B 75/00; B63B 77/10; B63B 35/44; B63B 2035/446;
(Continued)

(56) References Cited

U.S. PATENT DOCUMENTS 6,868,646 B1 *   3/2005   Perina ..................... E04H 12/34
                                                        52/745.18
2007/0243063 A1   10/2007   Schellstede
(Continued)

FOREIGN PATENT DOCUMENTS

| EP | 2 275 340 A2 | 1/2011 |
| EP | 2 473 400 A2 | 7/2012 |

(Continued)

OTHER PUBLICATIONS

Dutch Search Report, issued in Priority Application No. 2027279, dated Sep. 14, 2021.
(Continued)

*Primary Examiner* — Stephen P Avila
(74) *Attorney, Agent, or Firm* — Birch, Stewart, Kolasch & Birch, LLP

(57)          ABSTRACT

The invention relates to a crane for assembly and installation of offshore wind turbines on an offshore location, to a vessel for assembly and installation of offshore wind turbines on an offshore location, and to a method for assembly and installation of offshore wind turbines on an offshore location. According to the invention the crane is provided with a base section and a top section, wherein the top section is rotatable supported by a bearing, and can be rotated with the wind turbine hoisting device relative to the base section about a vertical axis, wherein a first trolley guide is mounted to a top section of the installation crane for guiding a vertically mobile wind turbine supporting trolley. According to the (Continued)

invention the vessel is provided with one or more assembly stations on different sides of the installation crane.

20 Claims, 26 Drawing Sheets

(51) Int. Cl.

| | | |
|---|---|---|
| *B63B 75/00* | (2020.01) |
| *B63B 77/10* | (2020.01) |
| *B66C 23/18* | (2006.01) |
| *B66C 23/52* | (2006.01) |

(52) U.S. Cl.
CPC ............ *B66C 23/185* (2013.01); *B66C 23/52* (2013.01); *B63B 2035/446* (2013.01); *F05B 2230/6102* (2013.01); *F05B 2240/95* (2013.01)

(58) Field of Classification Search
CPC ................... B66C 23/185; B66C 23/52; F05B 2230/6102; F05B 2240/95
See application file for complete search history.

(56) References Cited

U.S. PATENT DOCUMENTS

| | | | |
|---|---|---|---|
| 2010/0293781 A1 | 11/2010 | Foo et al. | |
| 2019/0078281 A1* | 3/2019 | Cotaya, III | ........... E02B 17/027 |

FOREIGN PATENT DOCUMENTS

| | | | | |
|---|---|---|---|---|
| EP | 2 952 426 A1 | 12/2015 | | |
| EP | 3 153 398 A1 | 4/2017 | | |
| JP | 2018-53899 A | 4/2018 | | |
| KR | 10-2017-0107628 A | 9/2017 | | |
| WO | WO 2009/131826 A2 | 10/2009 | | |
| WO | WO 2011/028102 A3 | 3/2011 | | |
| WO | WO-2011028102 A2 * | 3/2011 | ............. | B63B 1/107 |
| WO | WO 2013/155521 A1 | 10/2013 | | |
| WO | WO 2019/245366 A1 | 12/2019 | | |

OTHER PUBLICATIONS

International Search Report, issued in PCT/EP2022/050166, dated Apr. 5, 2022.
Written Opinion of the International Searching Authority, issued in PCT/EP2022/050166, dated Apr. 5, 2022.

* cited by examiner

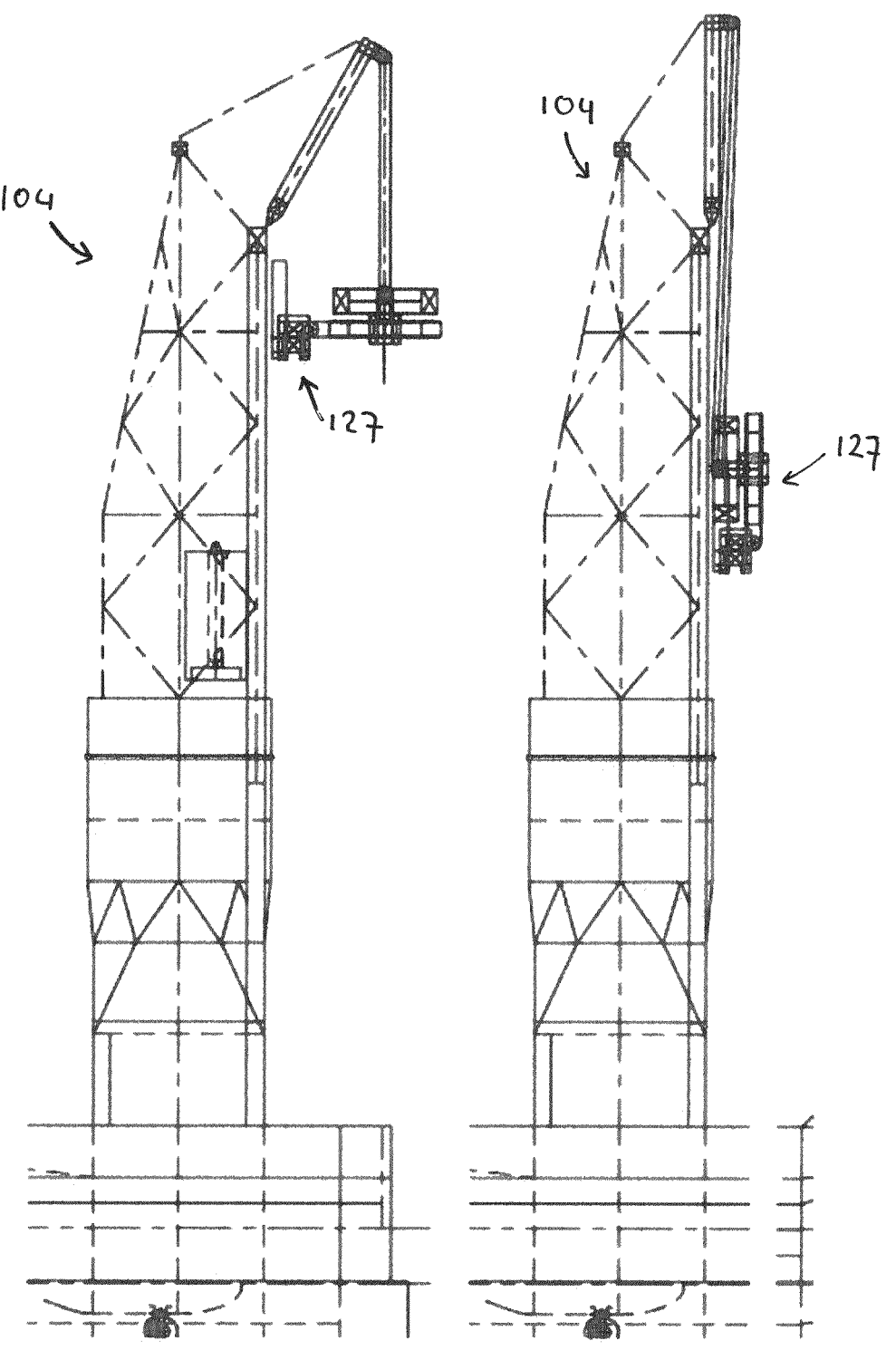
Fig. 11                                Fig. 12

OFFSHORE WIND TURBINE ASSEMBLY VESSEL

The present invention relates primarily to a crane for assembly and installation of offshore wind turbines on an offshore location, to a vessel for assembly and installation of offshore wind turbines on an offshore location, and to a method for assembly and installation of offshore wind turbines on an offshore location.

At present many offshore wind turbine parks are planned to allow for a significant electricity production. For reasons of efficiency the wind turbines have an ever increasing capacity and size. Nowadays 5 MW turbines and 8 MW are being planned. In the future even 14 MW turbines are envisaged. In known designs a 8 MW turbine has a diameter of the hub with blades of 160 metres combined with a height of the hub at about 120 metres above sea level. A proposed 14 MW turbine has a blades diameter of 220 metres combined with the hub at about 160 metres above sea level.

The weight of a wind turbine including mast, nacelle and blades, at least in future designs, may well be over 1000t. The foundation itself may well weigh several hundred tonnes, e.g. depending on the type of foundation. Many types of foundations are discussed in US2007/243063. For example JP2018053899 and EP3153398 relate to floating type foundations.

It has been proposed to build the entire wind turbine onshore. In particular the mounting and testing of the nacelle, hub and blades, on the mast is done onshore, which is far less costly than performing these operations offshore. This approach allows to reduce the offshore installation and commissioning to a compact operation, consisting of the installation of the complete wind turbine. In this approach the foundation, based on the sea floor or of the floating type, may be pre-installed and the mast with nacelle, hub and blades fastened to the foundation.

In the field of floating foundation wind turbines it is at present the common understanding that assembly of the entire floating foundation wind turbine, i.e. the combination of the floating foundation and the wind turbine, is done remote from the actual windfarm. For example, assembly is done at a port based yard. The entire floating foundation wind turbine is then towed from the assembly location to the remote offshore windfarm location.

For example, Hywind Scotland is a wind farm using floating foundation wind turbines. These wind turbines have a 120 meters tall mast mounted on a spar-type floating foundation. The mounting of the wind turbines on the spar-type floating foundation was done in a fjord in Norway using the Saipem 7000 floating crane. The assemblies were then towed across the North Sea to the coast of Scotland near Peterhead. In the windfarm, three suction anchors anchor the floating foundation to the seabed.

Up till now several installation vessels and methods dedicated to the installation of offshore wind turbines have been proposed.

The vessel MV Resolution is such a dedicated wind turbine assembly vessel. It is a jack-up vessel with six jack-up legs that are employed to raise the hull, at least partly, above the water to stabilize the hull for installation of the wind turbine. The vessel is equipped with a main pedestal mounted boom crane at the stern of the vessel, the crane having a slewable and luffable boom. The existing MV Resolution vessel has a 300t crane capacity, new builts of the same design are planned with a 1000t crane capacity.

In US2010/0293781 discloses a jack-up type vessel that is configured for fitting blades to a nacelle. The jack up vessel is provided with a track mounted nacelle support structure for temporarily supporting a nacelle, such that blades can be mounted to the nacelle. The jack-up vessel is furthermore provided with a crane that is used for mounting wind turbine masts on jacket foundations. i.e. on a foundation type that is bound to the seafloor. The track mounted nacelle support is used to move the nacelle, once it is fitted with blades, from an above deck position to an outboard position. The nacelle support is then used to lower the nacelle onto a wind turbine mast located adjacent the vessel. Furthermore, the nacelle support structure is able to lift an assembled wind turbine from a barge, positioned adjacent the jack-up vessel, and to lower the assembled wind turbine onto a jacket foundation located adjacent the jack-up vessel.

An alternative design is proposed in WO2011028102, which relates to an offshore wind turbine assembly vessel, wherein the vessel comprises a non-jack-up type floating hull, and a crane structure extending upward from the hull. The crane structure is provided with a hoisting device having one or more wind turbine suspension elements and a wind turbine engagement device supported by the one or more suspension elements and adapted to engage with the wind turbine. The hoisting device is thus adapted to support and to raise and lower in controllable manner at least the mast of the wind turbine while in vertical orientation; preferably with the nacelle and preferably also with the hub and blades fitted on top of the mast. Also, the vessel enables transport of a win turbine, with the nacelle, the hub and blades fitted on top of the mast, between an on shore location and an installation location. This is not only useful when installing wind turbines, but also allows for efficient replacement of installed wind turbines, for example when a wind turbine is no longer operational and needs major maintenance.

Further vessels of the non-jack-up type are disclosed in EP2473400 and in EP2952426. These type of vessel are configured to transport a pre-assembled wind turbine between an assembly location and an operation location.

In WO2019/245366 a floating vessel is disclosed that is configured for fitting blades to a nacelle. The vessel is provided with a deck mounted nacelle support structure for temporarily supporting a nacelle, such that blades can be mounted to the nacelle. The vessel is furthermore provided with two cranes. One crane is used for mounting wind turbine masts on jacket foundations. i.e. on a foundation type that is bound to the seafloor. The other crane is used to lift the nacelle onto the nacelle support structure, and, once the blades are fitted to the nacelle, to lift the nacelle onto a wind turbine mast located adjacent the vessel.

The present invention aims to provide an alternative approach for assembly and installation of wind turbines and/or for creating a windfarm, e.g. a wind farm with one or more floating foundation wind turbines.

The invention provides an installation crane, to be mounted on the floating hull of a vessel, for the assembly and installation of offshore wind turbines according to claim 1, A wind turbine installation crane, to be mounted on the floating hull of a vessel, according to the invention has at least one assembly side for facing a wind turbine assembly station, and has an installation side.

The installation side of the crane is herein also referred to as a first vertical side of the wind turbine installation crane, or as the side for mounting a assembled wind turbine on a foundation using the installation crane.

The installation crane is configured to perform one or more wind turbine assembly steps, e.g. upending the wind turbine mast, and is configured for arranging an assembled wind turbine from the at least one wind turbine assembly station into a mounting position, above a wind turbine foundation adjacent the vessel, at the installation side of the installation crane, and to lower the assembled wind turbine onto the foundation.

The installation crane is provided with a wind turbine hoisting device, a base section and a top section, and a first trolley guide with a first wind turbine supporting trolley.

The wind turbine hoisting device has one or more wind turbine suspension elements, e.g. cables, and is adapted to support and to raise and lower in a controllable manner an assembled wind turbine, the assembled wind turbine comprising a mast combined with a nacelle and blades fitted.

The top section is rotatable supported by a bearing, and can be rotated with the wind turbine hoisting device relative to the base section about a vertical axis, and the hoisting device can thus transfer at least an upper mast part between the assembly station and the installation side.

The first trolley guide is mounted to a top section of the installation crane. The first wind turbine supporting trolley is vertically mobile along the first trolley guide and supports a wind turbine engagement device.

The invention thus allows for a compact configuration of the installation process, and therefore allows for the method according to the invention to be exercised on compact vessels. It is submitted that assembly of wind turbines on vessel up till now has only been proposed in the context of extremely large vessels. Typically, these types of vessel are of such a size that they cannot be used to navigate a wind farm location, or even be effectively used to transfer between locations. The installation crane according to the invention allows for using a vessel both for the assembly of wind turbines and for mounting the assembled wind turbine on a foundation. Furthermore, when utilized in combination with a compact vessel, e.g. a semi-submersible, the vessel can also be used to mount the assembled wind turbine on a floating foundation.

In an embodiment, an active horizontal motion device is mounted between the trolley and the wind turbine engagement device, the active horizontal motion device being adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device.

In an embodiment, the installation crane, e.g. the first hoisting device of the installation crane, is provided with a heave compensation device that is adapted to compensate for sea-state induced heave motion of a wind turbine mast, supported by the installation crane, relative to the mast mounting structure of a foundation, e.g. a floating foundation.

Heave compensation devices are well known in the art, both in passive and active embodiments or hybrids thereof. For example, the hoisting device may include one or more winches and one or more hoisting cables, the heave compensation being formed by suitable operation of the (electric) winches and/or by one or more heave compensation cylinders carrying one or more cable sheaves over which a hoisting cable is passed.

In an embodiment, the base section of the installation crane is provided with a second trolley guide and a second wind turbine supporting trolley which is vertically mobile along said second trolley guide on the installation side of the installation crane.

4

In a further embodiment, the second trolley supports a wind turbine engagement device. Preferably an active horizontal motion device is mounted between the trolley and the wind turbine engagement device, the active horizontal motion device being adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device.

The first trolley, and optionally the second trolley, can be arranged in an active position, for supporting the wind turbine, e.g. a mast or an upper mast part of the wind turbine, and an inactive position, for moving along a mast or an upper mast part of the wind turbine supported by the wind turbine installation crane, e.g. at the at least one wind turbine assembly station.

In an embodiment, the hoisting device comprises two spaced apart jibs, that support the one or more suspension elements. The one or more suspension elements are connected to the first trolley or to the wind turbine engagement device.

In a further embodiment, the two jibs can be arranged in an active position, for supporting a first trolley and a first wind turbine engagement device in an active position, and an inactive position, for moving along a nacelle or blade of a partially or fully assembled wind turbine in the at least one wind turbine assembly station.

In an embodiment the wind turbine installation crane is configured such that, when an assembled wind turbine is supported by the installation crane, the jibs extend above the nacelle of the wind turbine, and the nacelle of the supported wind turbine is positioned between the jibs, when seen in a frontal view.

In a further embodiment, the wind turbine installation crane is configured such that, when an assembled wind turbine is supported by the installation crane, the jibs extend above the nacelle of the wind turbine, and the nacelle of the supported wind turbine is positioned between the jibs, when seen in a frontal view.

In an embodiment, the installation crane is a two sided installation crane, having the wind turbine hoisting device as a first hoisting device on a first side of the crane and having a second hoisting device on a second, opposed, side of the installation crane, to enable the crane to perform hoisting actions simultaneously on opposite sides of the installation crane.

In an embodiment, the installation crane is provided with one or more foundation pile supports, for supporting a foundation pile in an upright position adjacent the installation crane. The one or more foundation pile supports can be moved between an active position, in which the at least one foundation pile support extends in a direction away from the installation crane, and a passive position, in which the at least one foundation pile support is retracted in or is folded against the wind turbine installation crane.

The invention furthermore provides a method for assembling wind turbines on a vessel, that preferably is in floating condition. As preferred, the vessel is also used for installation of the assembled wind turbines, preferably at the site of the offshore windfarm. It will be appreciated that this allows to avoid the long-distance transport, e.g. by towing of complete wind turbines, from a shore-based, e.g. quayside, location to the windfarm. Such transport takes considerable efforts, is time-consuming, and may be impaired by weather conditions.

The invention provides a method for the assembly and installation of offshore wind turbines according to claim 16.

The method allows for assembly of wind turbines on sea, in particular at the location where the wind turbines have to be installed. Therefore, there is no need for transporting fully assembled wind turbines, which is a slow process and is difficult due to the size of assembled wind turbines. Transporting disassembled wind turbines facilitates transporting multiple wind turbines on a single vessel.

Thus, the invention allows mounting an assembled wind turbine on an already anchored floating foundation at the wind farm location. Thus the floating foundation can be transported and anchored without supporting an assembled wind turbine. This facilitates the transport and anchoring process significantly. Furthermore, the invention allows for assembling wind turbines at or near the wind farm location.

The method furthermore allows for a compact configuration of the installation process, and therefore allows for the method to be exercised on compact vessels. It is submitted that assembly of wind turbines on vessel up till now has only been proposed in the context of extremely large vessels. Typically, these types of vessel are of such a size that they cannot be used to navigate a wind farm location, or even be effectively used to transfer between locations. The method according to the invention allows for using a vessel both for the assembly of wind turbines and for mounting the assembled wind turbine on a foundation. Furthermore, when utilized in combination with a compact vessel, e.g. a semi-submersible, the vessel can also be used to mount the assembled wind turbine on a floating foundation.

Thus the invention therefore provides an alternative method for assembly as well as for installation of wind turbines.

In a method according to the invention for assembling wind turbines on a wind turbine assembly vessel, e.g. a semi-submersible crane vessel, and preferably for installing the assembled wind turbines on a foundation, e.g. a sea-bed mounted foundation or a floating foundation, using the wind turbine assembly vessel, the wind turbine assembly vessel comprises:

a floating hull;

a wind turbine components storage deck, for storing components of a wind turbine, e.g. a mast, a lower mast part, an upper mast part, a rotor assembly, e.g. a nacelle having a hub, and blades;

preferably a blade handling apparatus, for transferring a blade between a horizontal supply position and a fastening position adjacent a nacelle;

at least one wind turbine assembly station;

an installation crane, mounted on the floating hull, e.g. on a deck of the floating hull, wherein the installation crane has at least one assembly side facing the at least one wind turbine assembly station, and has an installation side, wherein the method comprises:

moving one or more wind turbine components from the wind turbine components storage deck to the at least one wind turbine assembly station; and using the installation crane to:

perform one or more assembly steps, e.g. by upending the wind turbine mast or by lifting the nacelle onto the top of the mast or the upper mast part;

support the assembled wind turbine at the assembly side and arranging the assembled wind turbine from the assembly station into the mounting position, above a wind turbine foundation adjacent the vessel, at the installation side of the installation crane;

lower the assembled wind turbine onto the foundation.

In an embodiment, the method further comprises the wind turbine assembly step of lifting the nacelle and hoisting the nacelle on the mast or upper mast part, preferably using the wind turbine installation crane, and mounting the nacelle on the mast or upper mast part.

In an embodiment, the method further comprises the wind turbine assembly step, prior to or after mounting the nacelle on the mast or upper mast part, lowering a section of the mast or of the upper mast part into a mast-receiving well that is sunk into, or through, the hull, and that is configured to receive therein at least a portion of the mast of the wind turbine, preferably using the wind turbine installation crane, such that the distance between the nacelle and the storage deck is reduced, preferably is less than the length of the turbine blade, more preferably less than four fifth the length of the blade.

In an embodiment, the method further comprises the wind turbine assembly step of arranging the mast or the upper mast part, with the nacelle mounted thereupon, in an upright installation position with the nacelle, in particular a hub of the nacelle, in an installation position for mounting a blade, preferably in a horizontal position, to the nacelle.

In a further embodiment, the a hub of the nacelle, is positioned, more in particular is rotated about a horizontal pivot axis in a position, for mounting to the nacelle a blade supported in a horizontal position, preferably supported in the horizontal positon by the blade handling apparatus.

In a further embodiment, the nacelle is positioned, more in particular is rotated about a vertical pivot axis, in a position for mounting to the nacelle a blade supported in a vertical position above the deck, while a blade already mounted to the nacelle is supported mainly vertically above the sea, i.e. is supported mainly outside ca contour of the vessel when seen in top view.

In an embodiment, the method further comprises a blade mounting process for mounting the blades to the nacelle, preferably using the blade handling apparatus, the blades mounting process comprising on ore more, preferably all, of the steps;

lifting a first blade into a fastening position adjacent the nacelle, mounting the first blade to the nacelle, and rotating the nacelle into a successive installation position, lifting a second blade into a fastening position adjacent the nacelle, mounting the second blade to the nacelle, and rotating the nacelle into a successive installation position; and lifting a third blade into a fastening position adjacent the nacelle, and mounting the third blade to the nacelle.

In a further embodiment, the mast or the upper mast part supporting the nacelle is received in a mast receiving well in the deck of the vessel, such that the distance between the nacelle and the deck is reduced, preferably is less than the length of the turbine blade, more preferably less than four fifth the length of the blade.

In an alternative further embodiment, the nacelle is mounted on a nacelle support fixed to the deck of the vessel, such that the nacelle is supported by the nacelle support at a distance above the deck, the distance preferably being less than the length of the turbine blade, more preferably being less than four fifth the length of the blade.

In an embodiment, the method further comprises the wind turbine assembly step, if the mast is to be composed out of lower mast part and an upper mast part, of arranging the upper mast part on the lower mast part using the installation crane, preferably after mounting the nacelle on the upper mast part.

In an embodiment, the method further comprises upending the mast or the upper mast part of the wind turbine from a horizontal storage position into the upright installation position, using the wind turbine installation crane.

In an embodiment, for upending, a mast is positioned with its top end at the first assembly station, and with its lowered end on a cart. At the first assembly station a trolley on a trolley track at the base section of the crane is lowered towards the deck of the vessel, such that the trolley can be hingeably coupled with the top end of the mast. Subsequently, the trolly is lifted, away from the deck and onto the trolley track on the top section of the crane. Thus, the top end of the mast is lifted, while the bottom end of the mast moves with the cart towards the base section of the crane. Thus, the mast is upended, i.e. is pivoted form a horizontal position into a vertical position. It is submitted that, because the top end of the mast and the bottom end of the mast are both guided along a track during the upending process, the movement of the mast is fully controlled. This in contrast with for example using a traditional crane for upending a mast, wherein the hoisting wire allows for sway of the mast during the upending process.

Preferably, the crane is provided with a second trolley, or with a bracket mounted on the top section of the crane, for receiving the mast when in the upright position. Thus, when upended, the mast is held at the top end, and at a location below the top end. When the lower end of the mast is released from the cradle, for example by lifting it out of the cradle, the mast is held at two points and swing can be prevented. This is in particular beneficial when the top section of the crane rotates, for example to move the load from a first to a second assembly station.

It is submitted that the installation crane may also be configured for upending of foundation piles. In a further embodiment, the deck may be extended to support the track supporting the cart for guiding the bottom end of the foundation pile during the upending process.

In an embodiment, the at least one wind turbine assembly station is a first wind turbine assembly station, located on a first side of the installation crane, which first side preferably is opposite the installation side of the installation crane, and the vessel furthermore comprises a second wind turbine assembly station, located on a second side of the installation crane, and wherein the first assembly station is used for up-ending a mast or a top section of the mast and/or for mounting the nacelle on the mast or the top section of the mast, preferably using the installation crane; and the second assembly station is used for completing the assembly of the wind turbine, e.g. if the mast is to be composed out of lower mast part and an upper mast part, of arranging the upper mast part on the lower mast part using the installation crane, preferably using the installation crane, and/or for mounting the blades to the nacelle; and wherein the installation crane is used for arranging the mast or top section of the mast, preferably with the nacelle mounted on top thereof, from the first assembly station to the second assembly station, for arranging the assembled wind turbine from the second assembly station to the installation side of the installation crane, and for lowering the assembled wind turbine on the foundation.

In an alternative further embodiment, the at least one wind turbine assembly station is a first wind turbine assembly station, located on a first side of the installation crane, which first side preferably is opposite the installation side of the installation crane, the vessel furthermore comprises a second wind turbine assembly station, located on a second side of the installation crane, and the vessel furthermore comprises a third wind turbine assembly station located on a third side of the installation crane, which third side preferably is opposite the second side of the installation crane, and wherein the first assembly station is used for lifting the nacelle and/or for lifting the nacelle mounted on a top section of the mast;

the second assembly station is used for mounting the blades to the nacelle; and the third assembly station is used for completing the assembly of the wind turbine, e.g. if the mast is to be composed out of lower mast part and an upper mast part, arranging the upper mast part provided with nacelle and blades on the lower mast part, and/or for mounting the nacelle provided with blades on the mast; and wherein the installation crane is used for arranging the assembled wind turbine from the third assembly station to the installation side of the installation crane, and for lowering the assembled wind turbine on the foundation.

In an embodiment, the wind turbine installation crane is configured to actively compensate for sea-state induced movement, e.g. horizontal displacement, of the assembled wind turbine relative to the foundation, in particular a floating foundation, onto which the wind turbine is to be lowered, the method comprising using the wind turbine installation crane to move the wind turbine relative to the vessel, to compensate for sea-state induced movement of the vessel relative to the floating foundation, and to thus keep the wind turbine substantially aligned with the floating foundation, preferably while the wind turbine is lowered onto the floating foundation.

In an embodiment, the vessel is provided with a foundation restraint system, the method comprising:

engage a floating foundation with the foundation restraint system;

reduce movement of the floating foundation relative to the vessel, more in particular relative to the assembled wind turbine to be mounted on the floating foundation and/or monitor the movement of the floating foundation relative to the to the vessel, more in particular relative to the assembled wind turbine to be mounted on the floating foundation, preferably while the wind turbine is lowered onto the foundation.

The invention furthermore provides an embodiment for assembling wind turbines on a wind turbine assembly vessel, and preferably for installing the assembled wind turbines using the wind turbine assembly vessel, wherein the wind turbine assembly vessel comprises:

a floating hull; a wind turbine components storage deck, wherein the storage deck preferably comprises a lower mast parts storage area, an upper mast parts storage area, a nacelles storage area, and a blades storage area;

a first assembly station, a second assembly station and a third assembly station;

a handling crane and an installation crane, wherein the installation crane has an installation side, and is configured for supporting an assembled wind turbine at its installation side in a mounting position above a foundation and for lowering the wind turbine onto the foundation, and wherein preferably the first assembly station is located on a first side of the installation crane, the second assembly station is located on a second side of the installation crane, the third assembly station is located on a third side of the installation crane, and the installation side is on a fourth side of the crane;

preferably a blade handling apparatus, for transferring a blade between a horizontal supply position and a fastening position;

wherein the method comprises:

storing wind turbine components, e.g. a wind turbine upper mast part, a wind turbine lower mast part, a nacelle and blades, on the wind turbine components storage deck, preferably at the wind turbine component storage area's;

arranging the upper mast part into the first assembly station, preferably using the handling crane, and supporting the upper mast part in an upright installation position;

hoisting the nacelle on said upper mast part in the first assembly station, preferably using the handling crane, and mounting the nacelle, arranging the combined upper mast part and nacelle from the first assembly station to the second assembly station, preferably using the installation crane, and supporting the wind turbine upper mast part in an upright installation position with the nacelle in an installation position for mounting a blade to the nacelle;

mounting the blades to the nacelle, preferably using the blade handling apparatus, the blades mounting process comprising;

lifting a first blade into a fastening position adjacent the nacelle, preferably using the blade handling apparatus, mounting the first blade to the nacelle, and rotating the nacelle into a successive installation position, lifting a second blade into a fastening position adjacent the nacelle, preferably using the blade handling apparatus, mounting the second blade to the nacelle, and rotating the nacelle into a successive installation position; and lifting a third blade into a fastening position adjacent the nacelle, preferably using the blade handling apparatus, and mounting the third blade to the nacelle; and arranging the lower mast part into the third assembly station, preferably using the handling crane, and supporting the lower mast part in an upright installation position;

hoisting the combined upper mast part, nacelle and blades, preferably using the installation crane, and mounting the upper mast part onto the lower mast part in the third assembly station to provide an assembled wind turbine; and hoisting the wind turbine into the mounting position at the fourth side of the installation crane; and lowering the wind turbine onto the foundation, using the installation crane.

The invention furthermore provides a method for assembling wind turbines on a wind turbine assembly vessel, and preferably for installing the assembled wind turbines using the wind turbine assembly vessel, wherein the wind turbine assembly vessel comprises:

a floating hull;

a wind turbine components storage deck, for storing components of a wind turbine, e.g. a mast, a nacelle, and blades;

a first assembly station, a second assembly station and a third assembly station;

a handling crane and an installation crane, wherein the installation crane has an installation side, and is configured for supporting an assembled wind turbine at its installation side in a mounting position above a foundation and for lowering the wind turbine onto the foundation, and wherein preferably the first assembly station is located on a first side of the installation crane, the second assembly station is located on a second side of the installation crane, the third assembly station is located on a third side of the installation crane, and the installation side is on a fourth side of the crane;

preferably a blade handling apparatus, for transferring a blade between a horizontal supply position and a fastening position;

Wherein the method comprises:

storing wind turbine components, preferably all wind turbine components, on the wind turbine components storage deck;

arranging the mast into the first assembly station, preferably using the wind turbine installation crane, and supporting the upper mast in an upright installation position; optionally preceded by: upending, preferably using the wind turbine installation crane, the mast of the wind turbine from a horizontal storage position into an upright installation positon;

lifting the nacelle and hoisting the nacelle on the mast in the first assembly station, preferably using the wind turbine installation crane, and mounting the nacelle on the mast;

arranging the combined mast and nacelle from the first assembly station to the second assembly station, using the installation crane, lowering a bottom section of the mast into a deck recess and supporting the mast part in an upright installation position and with the nacelle, in particular a hub of the nacelle, in an installation position for mounting a blade to the nacelle;

mounting the blades to the nacelle, preferably using the blade handling apparatus, to provide an assembled wind turbine, the blades mounting process comprising;

lifting a first blade into a fastening position adjacent the nacelle, preferably using the blade handling apparatus, mounting the first blade to the nacelle, and rotating the nacelle into a successive installation position, lifting a second blade into a fastening position adjacent the nacelle, preferably using the blade handling apparatus, mounting the second blade to the nacelle, and rotating the nacelle into a successive installation position; and lifting a third blade into a fastening position adjacent the nacelle, preferably using the blade handling apparatus, and mounting the third blade to the nacelle; and arranging the assembled wind turbine from the second assembly station into the mounting position at the fourth side of the installation crane; and lowering the wind turbine onto a foundation, using the installation crane.

The invention furthermore provides a method for assembling a wind turbine and for installation of the assembled wind turbine on a foundation, e.g. a sea-bed mounted foundation or a floating foundation, wherein use is made of a semi-submersible crane vessel, wherein the vessel comprises:

a floating hull with:

a deckbox structure;

two parallel pontoons, a row of support columns extending upward from each of the two pontoons, the support columns supporting thereon the deckbox structure;

wherein the deckbox structure has a deck and a box bottom, an installation crane mounted on the deckbox structure and configured to install the assembled wind turbine on the foundation, e.g. a tub mounted crane, e.g. a crane mounted above a support column at the end of a row of columns, wherein, at an assembly station, the hull of the vessel is provided with a mast-receiving well that is sunk into, or through, the hull, preferably a well that extends into, or through a support column of the hull, which well is configured to receive therein at least a portion of the mast of the wind turbine, wherein the assembled wind turbine to be installed comprises at least a part of a wind turbine mast and a rotor assembly that is mounted on the mast, e.g. a nacelle having a hub, which rotor assembly is, optionally, provided with one or more, e.g. all, of the rotor blades, in which method, during an assembly step of the wind turbine, e.g. during mounting of the rotor assembly on the mast and/or during assembly of one or more, e.g. all, of the rotor blades to the rotor assembly, the mast is arranged at least with a portion thereof in the mast-receiving well.

The invention furthermore provides a method assembling a wind turbine using a mast link mounted to the nacelle to enable manipulating the nacelle with the installation crane. The mast link is a short tubular section that with one end can be fixed to the nacelle and with an opposite end can be fixed to the top of the mast. In such a method, during the assembly process the nacelle is mounted with the mast link on top of a mast, preferably after the nacelle has been provided with blades.

The mast link is significantly shorter than an upper mast part. Providing the nacelle with a mast link enables allows for a wind turbine assembly process similar to the wind turbine assembly process of a wind turbine comprising an upper part an a lower mast part. In such a method the assembly process is completed by mounting the nacelle combined with blades with the mast link on the top end of a full length mast, instead of mounting the nacelle combined with blades and upper mast part on top of a lower mast part.

The invention furthermore provides a method for assembling a wind turbine using a mast. In such an embodiment, during the assembly process the nacelle is mounted on top of a full mast, preferably prior to providing the nacelle with blades.

In this method for assembling wind turbines on a wind turbine assembly vessel, e.g. a semi-submersible crane vessel, and for installing the assembled wind turbines on a foundation, e.g. a sea-bed mounted foundation or a floating foundation, using the wind turbine assembly vessel, the wind turbine assembly vessel comprises:

a floating hull;

a wind turbine components storage deck, for storing components of a wind turbine, e.g. a mast, a rotor assembly, e.g. a nacelle having a hub, and blades;

a blade handling apparatus, for transferring a blade between a horizontal supply position on the wind turbine storage deck and a fastening position adjacent the nacelle;

a first wind turbine assembly station, a second wind turbine assembly station and preferably a third wind turbine assembly station;

an installation crane, mounted on the floating hull, e.g. on a deck of the floating hull, wherein the installation crane has at least one assembly side facing the at least one wind turbine assembly station, and has an installation side, wherein the first wind turbine assembly station is located on a first side of the installation crane, which first side is opposite the installation side of the installation crane, wherein the second wind turbine assembly station is located on a second side of the installation crane, and wherein preferably the third wind turbine assembly station is located on a third side of the installation crane, which third side is opposite the second side of the installation crane, wherein the method comprises:

moving one or more wind turbine components from the wind turbine components storage deck to one or more of the wind turbine assembly stations, e.g. positing a mast in a horizontal orientation with a top end at the first wind turbine assembly station to enable upending of the mast using the wind turbine installation crane, and/or moving a nacelle to the third wind turbine assembly station to enable the wind turbine installation crane to lift up the nacelle and mount the nacelle on top of a mast at the first wind turbine assembly station;

at the first wind turbine assembly station up-ending the mast of the wind turbine from a horizontal storage position into an upright installation positon, using the wind turbine installation crane;

preferably at the third wind turbine assembly station picking up the nacelle, preferably using the wind turbine installation crane;

at the first wind turbine assembly station mounting the nacelle on top of the upended mast, using the wind turbine installation crane;

arranging the mast and the nacelle mounted on top of the mast from the first wind turbine assembly station to the second wind turbine assembly station using the installation crane;

at the second assembly station completing the assembly of the wind turbine by mounting the blades to the nacelle; preferably using a blade mounting process for mounting the blades to the nacelle using the blade handling apparatus, the blades mounting process comprising the steps;

lifting a first blade into a fastening position adjacent the nacelle, mounting the first blade to the nacelle, and rotating the nacelle into a successive installation position, lifting a second blade into a fastening position adjacent the nacelle, mounting the second blade to the nacelle, and rotating the nacelle into a successive installation position; and lifting a third blade into a fastening position adjacent the nacelle, and mounting the third blade to the nacelle.

using the installation crane to support the assembled wind turbine at the second wind turbine assembly station and arranging the assembled wind turbine from the second wind turbine assembly station into the mounting position, above a wind turbine foundation adjacent the vessel, at the installation side of the installation crane;

using the installation crane for lowering the assembled wind turbine onto the foundation.

In an embodiment of a method according to the invention the wind turbine installation crane is configured to actively compensate for sea-state induced movement, e.g. horizontal displacement, of the assembled wind turbine relative to the foundation, in particular a floating foundation, onto which the wind turbine is to be lowered. For example, the wind turbine installation crane can be provided with one or more trolleys that support and/or engage the wind turbine and that can be moved in horizontal direction to move the wind turbine relative to the floating vessel, to thus keep the wind turbine aligned with the movement of the floating foundation while being lowered.

In a further embodiment a method for mounting a wind turbine on a floating foundation according to the invention, the method comprises, prior to lowering the assembled wind turbine onto the floating foundation, engaging the floating foundation with a foundation restraint system, wherein the foundation restraint system is configured to reduce movement of the floating foundation relative to the vessel, more in particular relative to the assembled wind turbine to be mounted on the floating foundation and/or to monitor the movement of the floating foundation relative to the to the vessel, more in particular relative to the assembled wind turbine to be mounted on the floating foundation.

The invention furthermore provides a method for assembling wind turbines on a wind turbine assembly vessel, and preferably for installing the assembled wind turbines using the wind turbine assembly vessel, wherein the wind turbine assembly vessel comprises:

a floating hull;

a wind turbine components storage deck, wherein the storage deck preferably comprises a lower mast parts storage area, an upper mast parts storage area, a nacelles storage area, and a blades storage area;

a first assembly station, a second assembly station and a third assembly station;

a handling crane and an installation crane, wherein the installation crane has an installation side, and is configured for supporting an assembled wind turbine at its installation side in a mounting position above a foundation and for lowering the wind turbine onto the foundation, and wherein preferably the first assembly station is located on a first side of the installation crane, the second assembly station is located on a second side of the installation crane, the third assembly station is located on a third side of the installation crane, and the installation side is on a fourth side of the crane;

preferably a blade handling apparatus, for transferring a blade between a horizontal supply position and a fastening position;

the method comprises:

storing wind turbine components, e.g. a wind turbine upper mast part, a wind turbine lower mast part, a nacelle and blades, on the wind turbine components storage deck, preferably at the wind turbine component storage area's;

arranging the upper mast part into the first assembly station, preferably using the handling crane, and supporting the upper mast part in an upright installation position;

hoisting the nacelle on said upper mast part in the first assembly station, preferably using the handling crane, and mounting the nacelle, arranging the combined upper mast part and nacelle from the first assembly station to the second assembly station, preferably using the installation crane, and supporting the wind turbine upper mast part in an upright installation position with the nacelle in an installation position for mounting a blade to the nacelle;

mounting the blades to the nacelle, preferably using the blade handling apparatus, the blades mounting process comprising;

lifting a first blade into a fastening position adjacent the nacelle, preferably using the blade handling apparatus, mounting the first blade to the nacelle, and rotating the nacelle into a successive installation position, lifting a second blade into a fastening position adjacent the nacelle, preferably using the blade handling apparatus, mounting the second blade to the nacelle, and rotating the nacelle into a successive installation position; and lifting a third blade into a fastening position adjacent the nacelle, preferably using the blade handling apparatus, and mounting the third blade to the nacelle; and arranging the lower mast part into the third assembly station, preferably using the handling crane, and supporting the lower mast part in an upright installation position;

hoisting the combined upper mast part, nacelle and blades, preferably using the installation crane, and mounting the upper mast part onto the lower mast part in the third assembly station to provide an assembled wind turbine; and hoisting the wind turbine into the mounting position at the fourth side of the installation crane; and lowering the wind turbine onto the foundation, using the installation crane.

In an alternative method according to the invention, only two assembly stations are provided, and the combined upper mast part, nacelle and blades are hoisted by the installation crane from the second assembly station, to the fourth side of the installation crane, and are lowered on, and mounted to, a lower mast section that is already installed on the foundation or that is part of the foundation.

In such an embodiment, the third assembly station can be used as a storage station, to store a combined upper mast part, nacelle and blades, prior to being hoisted by the installation crane from that storage station, to the fourth side of the installation crane, for being lowered on, and mounted to, a lower mast section that is already installed on the foundation or that is part of the foundation.

The invention furthermore provides a vessel for the assembly and installation of offshore wind turbines according to claim 7.

A vessel for assembling wind turbines, e.g. a semi-submersible crane vessel, and for installing the assembled wind turbine on a foundation, e.g. a sea-bed mounted foundation or a floating foundation, according to the invention comprises a floating hull, a wind turbine components storage deck, at least one wind turbine assembly station, and a wind turbine installation crane The wind turbine components storage deck, for storing components of a wind turbine, e.g. a mast, a rotor assembly, and blades, preferably comprises dedicated storage areas, for example a mast storage area, a nacelles storage area, and/or a blades storage area.

The installation crane is configured to perform one or more wind turbine assembly steps, e.g. upending the wind turbine mast, and has at least one assembly side facing the at least one wind turbine assembly station, and has an installation side.

The installation crane is provided with a wind turbine hoisting device having one or more wind turbine suspension elements. The wind turbine hoisting device is adapted to support and to raise and lower in a controllable manner an assembled wind turbine, the assembled wind turbine comprising a mast combined with the nacelle and the blades fitted.

The installation crane has a base section and a top section. The top section is rotatable supported by a bearing, and can be rotated with the wind turbine hoisting device relative to the base section about a vertical axis. The hoisting device can thus transfer at least an upper mast part between the assembly stations and the installation side.

The installation crane is configured for arranging the assembled wind turbine from the at least one wind turbine assembly station into a mounting position, above a wind turbine foundation adjacent the vessel, at the installation side of the installation crane, for supporting an assembled wind turbine at the installation side in a mounting position above a foundation and for lowering the wind turbine onto the foundation.

The invention thus allows for assembly of wind turbines on sea, in particular at the location where the wind turbines have to be installed, i.e. at or near the wind farm location. Therefore, there is no need for transporting fully assembled wind turbines, which is a slow process and is difficult due to the size of assembled wind turbines. Transporting disassembled wind turbines facilitates transporting multiple wind turbines on a single vessel.

The invention furthermore allows for mounting an assembled wind turbine on a foundation, for example an already anchored floating foundation, at the wind farm location. Thus, a floating foundation can be transported and anchored without supporting an assembled wind turbine. This facilitates the transport and anchoring process significantly.

It will be appreciated that this allows to avoid the long-distance transport, e.g. by towing of complete wind turbines, from a shore-based, e.g. quayside, location to the windfarm. Such transport takes considerable efforts, is time-consuming, and may be impaired by weather conditions.

In an embodiment, the at least on wind turbine assembly station is a first wind turbine assembly station, and the vessel further comprises a second wind turbine assembly station and preferably a third wind turbine assembly station. The first assembly station is configured for supporting a mast in an upright installation position. The second assembly station is configured for supporting the mast in an upright installation position with the nacelle in an installation position for mounting blades to the nacelle. Preferably, the third assembly station is configured for presenting a nacelle, to be lifted by the wind turbine installation crane. The first wind turbine assembly station is located on a first side of the installation crane, the second assembly station is located on a second side of the installation crane, and preferably the third assembly station is located on a third side of the installation crane. The installation side is on a fourth side of the crane.

In an embodiment, the second and third wind turbine assembly station are located on opposite sides of the installation crane, and the first assembly station is located opposite a first vertical side of the wind turbine installation crane, i.e. the installation side of the crane, i.e. the side for mounting a assembled wind turbine on a foundation using the installation crane.

In an embodiment, the first assembly station is configured for supporting an upper mast part in an upright installation position, the second assembly station is configured for supporting the wind turbine upper mast part in an upright installation position with the nacelle in an installation position for mounting blades to the nacelle, and the third assembly station is configured for supporting the lower mast part in an upright installation position to enable hoisting the combined upper mast part, nacelle and blades, preferably using the installation crane, and mounting the upper mast part onto the lower mast part in the third assembly station to provide an assembled wind turbine.

In an embodiment, the vessel further comprises a blade handling apparatus, preferably located adjacent a second wind turbine assembly station, e.g. to a base of the installation crane, for transferring a blade between a horizontal supply position and a fastening position adjacent the nacelle on top of a mast or an upper mast section preferably supported in the second assembly station.

In an embodiment, the vessel comprises a foundation restraint system, which foundation restraint system is configured for engaging a floating foundation, and is configured to reduce movement of the floating foundation relative to the vessel, more in particular relative to a assembled wind turbine to be mounted on the floating foundation and/or is configured to monitor the movement of the floating foundation relative to the to the vessel, more in particular relative to the assembled wind turbine to be mounted on the floating foundation, preferably while the wind turbine is lowered onto the foundation.

In an embodiment, the wind turbine installation crane is configured to actively compensate for sea-state induced movement, e.g. horizontal displacement, of an assembled wind turbine relative to the foundation, in particular a floating foundation, onto which the wind turbine is to be lowered.

In an embodiment, the vessel furthermore comprises a mast-receiving well that is sunk into, or through, the hull, preferably at the at least one wind turbine assembly station or alternative wind turbine assembly station. The mast-receiving well is configured to receive therein at least a portion of the mast of the wind turbine, preferably using the wind turbine installation crane, such that the distance between the nacelle and the storage deck is reduced, preferably is less than the length of the turbine blade, more preferably less than four fifth the length of the blade, to facilitate mounting blades to the nacelle.

In an embodiment, the vessel comprises a nacelle support, which nacelle support is fixed to the deck of the vessel, such that a nacelle can be supported by the nacelle support at a distance above the deck, the distance preferably being less than the length of the turbine blade, more preferably being less than four fifth the length of the blade, to enable blades to be mounted to the nacelle, preferably by using a blade handling apparatus.

In an embodiment, the vessel is furthermore provided with a handling crane.

In an embodiment, the storage deck comprises dedicated storage areas, for example a mast storage area, a lower mast parts storage area, an upper mast parts storage area, a nacelles storage area, and/or a blades storage area.

The invention furthermore provides a vessel for assembling wind turbines, e.g. a semi-submersible crane vessel, and for installing the assembled wind turbines on a foundation, e.g. a sea-bed mounted foundation or a floating foundation, comprises:

a floating hull;

a wind turbine components storage deck, for storing components of a wind turbine, e.g. a mast, a lower mast part, an upper mast part, a rotor assembly, e.g. a nacelle having a hub, and blades;

preferably a blade handling apparatus, for transferring a blade between a horizontal supply position and a fastening position adjacent a nacelle;

preferably a handling crane;

at least one wind turbine assembly station;

an installation crane, mounted on the floating hull, e.g. on a deck of the floating hull, wherein the installation crane has at least one assembly side facing the at least one wind turbine assembly station, and has an installation side, wherein the wind turbine installation crane is configured to perform one or more wind turbine assembly steps, e.g. upending the wind turbine mast, lifting an upper mast part onto the top of a lower mast part, lifting the nacelle onto the top of the mast or the upper mast part, and for arranging the assembled wind turbine from the at least one wind turbine assembly station into the mounting position, above a wind turbine foundation adjacent the vessel, at the installation side of the installation crane, and to lower the assembled wind turbine onto the foundation.

The invention provides a vessel for assembly of wind turbines on sea, in particular at the location where the wind turbines have to be installed. Therefore, there is no need for transporting fully assembled wind turbines, which is a slow process and is difficult due to the size of assembled wind turbines. Transporting disassembled wind turbines facilitates transporting multiple wind turbines on a single vessel.

The configuration of the vessel, in particular with multiple assembly stations located around the installation crane, allows for a compact vessels and an efficient installation process. It is submitted that assembly of wind turbines on vessel up till has only been proposed in the context of extremely large vessels. Typically, these types of vessel are of such a size that they cannot be used to navigate a wind farm location, or even be effectively used to transfer between locations. The invention provides a vessel both for the assembly of wind turbines and for mounting the assembled wind turbine on a foundation. Furthermore, when utilized in combination with a compact vessel, e.g. a semi-submersible, the vessel can also be used to mount the assembled wind turbine on a floating foundation.

Thus the invention does provide an improved vessel for assembly as well as for installation of wind turbines.

The invention furthermore provides a vessel for the assembly and installation of offshore wind turbines that comprises:

a floating hull;
    a wind turbine components storage deck, wherein the storage deck preferably comprises a lower mast parts storage area, an upper mast parts storage area, a nacelles storage area, and a blades storage area;
    a first assembly station, a second assembly station and a third assembly station;
    a handling crane; and
    an installation crane, wherein the installation crane has an installation side, and is configured for supporting an assembled wind turbine at its installation side in a mounting position above a foundation and for lowering the wind turbine onto the foundation, and wherein the first assembly station is located on a first side of the installation crane, the second assembly station is located on a second side of the installation crane, the third assembly station is located on a third side of the installation crane, and the installation side is on a fourth side of the crane; and wherein the installation crane is provided with a wind turbine hoisting device having one or more wind turbine suspension elements, said wind turbine hoisting device being adapted to support and to raise and lower in a controllable manner at least an upper mast part of the wind turbine while in vertical orientation; preferably with the nacelle and the blades fitted on the upper mast part; and wherein the installation crane has a base section and a top section, wherein the top section is rotatable supported by a bearing, and can be rotated with the hoisting device relative to the base section about a vertical axis, and the hoisting device can thus transfer at least an upper mast part between the installation stations and the mounting position.

In an embodiment, the first installation location is configured for supporting an upper mast part in an upright installation position, and preferably the handling crane is configured for hoisting the nacelle on the upper mast section;

Wherein the second installation location is configured for supporting the wind turbine upper mast part in an upright installation position with the nacelle in an installation position for mounting blades to the nacelle;

Wherein the third installation location is configured for supporting the lower mast part in an upright installation position to enable hoisting the combined upper mast part, nacelle and blades, preferably using the installation crane, and mounting the upper mast part onto the lower mast part in the third assembly station to provide an assembled wind turbine.

In an embodiment, the second and third assembly station are located on opposite sides of the installation crane, and the first assembly station is located opposite the first vertical side of the crane, i.e. the side for mounting a assembled wind turbine on a foundation using the installation crane.

In an embodiment, the vessel further comprises a blade handling apparatus, located adjacent the second installation location, for transferring a blade between a horizontal supply position and a fastening position adjacent the nacelle on top of an upper mast section supported in the second installation location.

In an embodiment, the hoisting device comprises a first trolley guide, mounted to the top section of the installation crane, and a first wind turbine installation trolley which is vertically mobile along said first trolley guide, wherein the first trolley supports a wind turbine engagement device, and wherein preferably an active horizontal motion device is mounted between the trolley and the wind turbine engagement device, the active horizontal motion device being adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device,
    wherein the first trolley and the wind turbine engagement device are supported by one or more suspension elements, which are connected to the first trolley or the wind turbine engagement device.

In a further embodiment, the base section of the installation crane is provided with a second trolley guide and a second wind turbine installation trolley which is vertically mobile along said second trolley guide on the first vertical side of the installation crane wherein the second trolley supports a wind turbine engagement device, and wherein preferably an active horizontal motion device is mounted between the trolley and the wind turbine engagement device, the active horizontal motion device being adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device.

In a further embodiment, the first and optionally second trolley can be arranged in an active position, for supporting the upper mast part, and an inactive position, for moving along an upper mast part supported in an assembly station.

In an embodiment, the hoisting device comprises two spaced apart jibs, that preferably support the one or more suspension elements, which are connected to the first trolley or the wind turbine engagement device.

In a further embodiment, the two jibs can be arranged in an active positon, for supporting the first trolley and the first wind turbine engagement device in an active position, and an inactive position, for moving along a nacelle or blade of a partially or fully assembled wind turbine in an assembly station.

In a further embodiment, the installation crane is configured such that, when an assembled installation crane is supported by the installation crane, the jibs extend above the nacelle of the wind turbine, and the is positioned between the jibs, when seen in a frontal view.

The invention furthermore provides an alternative wind turbine assembly vessel, the vessel comprising only two assembly stations. In such an embodiment, the vessel is configured to hoist the combined upper mast part, nacelle and blades from the second assembly station, to the fourth side of the installation crane, and to lower them on, and mounted them to, a lower mast section that is already installed on the foundation or that is part of the foundation.

In such an embodiment, the third assembly station can be used as a storage station, to store a combined upper mast part, nacelle and blades, prior to being hoisted by the installation crane from that storage station, to the fourth side of the installation crane, for being lowered on, and mounted to, a lower mast section that is already installed on the foundation or that is part of the foundation.

The invention furthermore provides a wind turbine assembly vessel that comprises:

a floating hull;

a wind turbine components storage deck, for storing components of a wind turbine, e.g. a mast, a nacelle, and blades;

preferably a handling crane for hoisting components of a wind turbine stored on the wind turbine component storage deck;

an installation crane, wherein the installation crane has a first side, a second side, a third side located opposite the second side, and a fourth side located opposite the first side, the fourth side being an installation side, and wherein the installation crane is configured for supporting an assembled wind turbine at the installation side in a mounting position above a foundation and for lowering the wind turbine onto the foundation, a first assembly station, or nacelle installation station, for mounting a nacelle on a wind turbine mast or wind turbine mast section, and a second assembly station, or blade installation station, for mounting wind turbine blades to a nacelle mounted on a wind turbine mast or wind turbine mast section, wherein the first assembly station is located on the first side of the installation crane, the second assembly station is located on the second side of the installation crane, and the installation side is located on the fourth side of the installation crane, wherein the installation crane has a hoisting device, the hoisting device comprising at least one hoisting winch with an associated hoisting wire, at least one trolley, e.g. a wind turbine support trolley, that is supported by the hoisting wire for supporting a mast or mast section of a wind turbine, and a trolley guide for guiding the trolley in a vertical direction along the installation crane, and wherein the trolley is configured to engage the mast or mast section of a wind turbine between a bottom end and a top end of the mast or mast section, to support the mast or mast section in a lateral direction, wherein the installation crane has a base section and a top section, wherein the top section is rotatable supported by a bearing, which bearing is supported by the base section, and the top section can thus with the hoisting device be rotated relative to the base section about a vertical axis, and wherein the trolley guide comprises a first trolley guide, or top trolley guide, mounted to the top section of the installation crane, and at least one second trolley guide, or base trolley guide, mounted to the base section of the installation crane at one of the first assembly side, the second assembly side or the installation side, preferably has a second trolley guide mounted to the base section of the installation crane at each of the first assembly side, the second assembly side and the installation side, and the trolley of the hoisting device can thus move along both the top section and the base section of the installation crane at at least one assembly station, preferably at each assembly station and at the installation side.

In an embodiment of a vessel according to the invention a vessel according to the invention comprises a single main deck, and the single main deck is the storage deck, and the installation crane is extends upwards relative to the main deck.

In an embodiment, at the installation side of the crane, the main deck extends on opposite sides of the installation crane. Thus, when the installation crane supports an assembled wind turbine above a foundation, the foundation is partially enclosed by the vessel on three sides. In addition or as an alternative, the vessel comprises a catamaran like hull, with two main floaters extending along opposite sides of the vessel, and at the installation side of the crane, the hull extends, more in particular main floaters of the hull extend, at opposite sides of the installation crane. Thus, when the installation crane supports an assembled wind turbine above a foundation, the foundation is partially enclosed by the hull of the vessel on three sides. Thus, the hull provides optimal stability at the installation side of the crane during mounting and demounting an assembled wind turbine onto and form a foundation respectively.

In an embodiment, the main deck is provided with an upend track. To enable upending of for example wind turbine masts or foundation piles, the main deck is provided with track for supporting an upend cart. During the upending process, the upend cart supports the bottom end of the pile, or mast, while the top end of the pile, or mast, is lifted by the installation crane. Thus, the bottom end of the pile, or mast, is guided along the deck, over the tracks, towards installation crane.

In a further embodiment, the upend track is located at a side of the installation crane opposite the installation side. Thus, when the vessel is at an installation location for mounting a wind turbine on a foundation, the installation crane is located between the upend track and the foundation.

In an embodiment, the upend track and the installation crane are set up on a centre line of the vessel, and the upend track extends in a longitudinal direction of the vessel. For example, when the vessel is a semi sub with two main floaters, i.e. similar to a catamaran type hull, the installation crane and the upend track are mounted on the deck, are located between the two main floaters, and the upend track extends parallel to the main floaters.

Providing the upend track and the installation crane thus on a centre axis of the vessel makes that during the upending process, there is no major shift in the center of gravity, and there is minimal roll of the vessel.

In an embodiment of a vessel according to the invention, the vessel is provided with a ballast system that is configured to compensate for shifts in weight due to the installation crane moving a load, e.g. an assembled wind turbine or a foundation pile. For example, a ballast system may be provided to reduce roll of the vessel when the crane moves an assembled wind turbine from a second assembly station, located away form a centre line of the vessel, into an installation position above a foundation, in which position the assembled wind turbine is supported on the centre line of the vessel. In yet another embodiment, the a ballast foundation system may be provided to reduce pitch of the vessel when an assembled wind turbine is lowered onto a foundation, and the weight of the wind turbine is shifted form the crane to the floating foundation.

In an embodiment, the vessel is with ballast tanks for containing a ballast, e.g. a ballast liquid, e.g. ballast water. In an embodiment, a ballast control system is provided that is configured for moving the ballast liquid between ballast tanks. Also, the vessel may comprise a ballast system comprising track mounted weights, which weights are moved along the track by a ballast control system to compensate for changes in load due to the installation crane moving loads between assembly stations and/or a foundation.

In an embodiment, the vessel comprises a mast-receiving well that is sunk into, or through, the hull, preferably at the at least one wind turbine assembly station or alternative wind turbine assembly station. The mast-receiving well is configured to receive therein at least a portion of the mast of the wind turbine, preferably using the wind turbine installation crane, such that the distance between the nacelle and the main deck, or storage deck is reduced, preferably is less than the length of the turbine blade, more preferably less than four fifth the length of the blade, to facilitate mounting blades to the nacelle.

In an embodiment, the installation crane comprises a vertical crane structure. The vertical crane structure comprise a base section and a top section of the installation crane, wherein the base section is fixed to the hull of the vessel and the top section is slewable about a vertical axis relative to the base section. In a further embodiment, at least the top section is of the crane structure is a framework or truss construction.

In an embodiment, the crane structure has a cross section rectangular cross section, providing the crane with four distinguished sides. In a further embodiment, vertical tracks for moving trolleys up and down one or more of the sides of the crane are mounted at or near the corners of the vertical crane structure. In an embodiment, the installation crane, more in particular the top section of the installation crane, has a rectangular cross section and the crane is provided with three assembly stations on the vessel, and the crane can be positioned such that three sides of the crane top section each face an assembly station.

In an alternative embodiment, the vertical crane structure, in particular the top section, may comprise a triangular cross section, a hexagonal cross section, or a circular cross section. Preferably, the crane comprises at least two sides provided with a vertical track for moving trolleys up and down along the vertical crane structure, which at least two sides are opposite sides of the installation crane.

In an embodiment of the installation crane, the top section has a height than the base section, for example has two times or three times the height of the base section. Thus, in such an embodiment, the slew bearing is for example located at a third or a fourth of the total height of the installation crane, the height being measured from the deck of the vessel. Preferably, the installation crane is provided with tracks for moving trolleys up and down along the crane structure, which tracks extend along the base and the top section of the crane.

In the embodiment shown, the base part section of the crane is a closed construction, housing the bridge and crew quarters, and the top section is an open, truss construction.

In an embodiment, the installation crane is configured to support a elongate load, e.g. a wind turbine mast or a foundation pile, closely adjacent the top section of the crane. In an embodiment the hoisting device of the installation crane is configured to move guided trolleys in a vertical direction along the vertical crane structure, which guided trolleys are configured to engage a mast or foundation pile. Thus, the installation crane is configured to support the mast or pile closely adjacent the vertical crane structure.

The invention furthermore provides a method for assembly and installation of a wind turbine, using a vessel according to the preceding claim, wherein the method comprises:

storing wind turbine components on the wind turbine components storage deck;

arranging a mast of a wind turbine into the first assembly station, preferably using the wind turbine installation crane, and supporting the mast in an upright installation position, optionally preceded by: upending, preferably using the wind turbine installation crane, the mast of the wind turbine from a horizontal storage position into an upright installation position;

lifting the nacelle and hoisting the nacelle on the mast in the first assembly station, preferably using the wind turbine installation crane, and mounting the nacelle on the mast;

arranging the combined mast and nacelle from the first assembly station to the second assembly station, using the installation crane, and supporting the mast in an upright installation position preferably with the nacelle, in particular a hub of the nacelle, in an installation position for mounting a blade to the nacelle;

mounting the blades to the nacelle, preferably using a blade handling apparatus, to provide an assembled wind turbine, the blades mounting process comprising;

lifting a first blade into a fastening position adjacent the nacelle, preferably using the blade handling apparatus, mounting the first blade to the nacelle, and rotating the nacelle, in particular a hub of the nacelle, into a successive installation position, lifting a second blade into a fastening position adjacent the nacelle, preferably using the blade handling apparatus, mounting the second blade to the nacelle, and rotating the nacelle, in particular a hub of the nacelle 416, into a successive installation position; and lifting a third blade into a fastening position adjacent the nacelle, preferably using the blade handling apparatus, and mounting the third blade to the nacelle;

arranging the assembled wind turbine from the second assembly station into the mounting position at the fourth side, or installation side of the installation crane; and

lowering the assembled wind turbine onto a foundation, using the installation crane.

The invention furthermore provides a use of a vessel according to the invention, preferably for preforming a method according to the invention, for assembly and installation of a wind turbine, preferably for assembly and installation of multiple wind turbines to provide a wind farm.

Herein, the term wind turbine assembly station is used to refer to a location adjacent the wind turbine installation crane, and in reach of the wind turbine installation crane, for performing one or more wind turbine assembly steps, preferably using the wind turbine installation crane, e.g. lifting the nacelle, upending the mast, mounting the blades to the nacelle. As an alternative for wind turbine installation location the term installation location can be used. Thus the installation crane can be provided with three win turbine installation locations, located on the vessel at three sided of the crane for performing wind turbine assembly steps.

In the field of offshore construction semi-submersible crane vessels are known as the workhorse for (heavy) lifting activities. These crane vessel are nowadays also employed for the installation of wind turbines on a foundation. Commonly such a semi-submersible crane vessel comprises:

a floating hull with:
 a deckbox structure,
 two parallel pontoons,
 a row of support columns extending upward from each of the two pontoons, the support columns supporting thereon the deckbox structure,
wherein the deckbox structure has a deck and a box bottom, and
 an installation crane mounted on the deckbox structure and configured to install the assembled wind turbine on the foundation.

In the field, many of the vessel have a tub mounted crane, wherein the slewable superstructure of the crane is mounted via a bearing, e.g. a roller bearing or an arrangement of bogies, on a tub that is integral with the deckbox structure, e.g. directly above a support column at the end of a row of columns. In other known embodiment, the crane is a mast crane.

The present invention also aims to provide an enhanced semi-submersible crane vessels for use in wind turbine installation, e.g. allowing for more effective assembly of (a part of) the wind turbine on-board of the crane vessel.

The present invention provides a semi-submersible crane vessel for use in assembling a wind turbine and for installation by means of a crane of the vessel of the assembled wind turbine on a foundation, e.g. a sea-bed mounted foundation or a floating foundation, wherein the assembled wind turbine to be installed comprises at least a part of a wind turbine mast and a rotor assembly that is mounted on the mast, e.g. a nacelle having a hub, which rotor assembly is, optionally, provided with one or more, e.g. all, of the rotor blades,
wherein the vessel comprises:

a floating hull with:
 a deckbox structure,
 two parallel pontoons,
 a row of support columns extending upward from each of the two pontoons, the support columns supporting thereon the deckbox structure, wherein the deckbox structure has a deck and a box bottom,
an installation crane mounted on the deckbox structure and configured to install the assembled wind turbine on the foundation, e.g. a tub mounted crane, e.g. a crane mounted above a support column at the end of a row of columns,
wherein, at an assembly station, the hull of the vessel is provided with a mast-receiving well that is sunk into, or through, the hull, preferably a well that extends into, or through a support column of the hull, which well is configured to receive therein at least a portion of the mast of the wind turbine during an assembly step of the wind turbine, e.g. during mounting of the rotor assembly on the mast and/or during assembly of one or more, e.g. all, of the rotor blades to the rotor assembly.

The crane structure according to the invention may also be configured to lift and install monopiles, or piles, i.e. foundation piles for wind turbines, and/or jackets for supporting wind turbines or other off shore devices. Also, the crane may be used to lift or lower structures from or onto floating foundations, for example tension leg platforms or barges. The vertical crane construction, in combination with trolley tracks and associated trolleys to be coupled with the load that is lifted by the crane, allows for controlled lifting and lowering of a load, i.e. without or with minimal sway of the load relative to the crane construction and thus with minimal sway relative to the vessel onto which the installation crane is mounted.

In an embodiment, according to the invention the crane is provided with a trolley for supporting wind turbine blades. For example, a cradle for supporting blades can be coupled with a trolley to enable that trolley to lift a blade in a horizontal position. Thus, the installation crane can be used for removing wind turbine blades from and/or attaching wind turbine blades to a nacelle of a wind turbine, the nacelle being mounted on a mast supported by a floating foundation or a foundation bound to the sea floor.

In such an embodiment, the trolley preferably is heave compensated, e.g. the hoisting device supporting the trolley compensates for vertical movement of the vessel due to heave, and preferably is configured to actively compensate for sea-state induced movement in the horizontal plane, e.g. is configured to actively move the load in the horizontal plane to compensate the for movement of the vessel in the x-y plane relative to the sea floor due to waves, currents, etc. Thus, the blade can be held relative to the nacelle at a substantially constant to enable mounting the blade to the nacelle.

In a further embodiment, the heave compensation system and the compensation system of the trolley are configured to also compensate for movement, for example sea state induced movement, of the nacelle relative to the vessel.

In a further embodiment, the trolley and/or the cradle for supporting the blade are/is furthermore configured to adjust the position of the blade relative to the nacelle, for example to correctly align fastening openings on the root of the blade with fastening openings on the rotor of the nacelle, to enable the blade to be mounted to the nacelle.

In an embodiment, the deck of the vessel is provided with one or more mast supports, that are configured to engage a lower end of a mast section for supporting the mast section in an upright position relative to the vessel. In a further embodiment, the mast supports are removable mounted to the deck of the vessel. Thus, they can be mounted to the deck, for example at an assembly station or at a storage location, when needed, and removed from the deck, for example to storage, when not needed.

In an embodiment, different sized mast supports are provided, to fit different sizes of masts, masts or mast sections or even foundation piles. In such an embodiment, the right size of mast support is mounted in for example an assembly station for supporting the mast or mast section into the upright position.

In an embodiment, the mast supports are cylindrical shaped or conical shaped, and sized to be at least partially inserted into the lowered end of a mast or mast section. In an embodiment, the mast supports are provided with apertures that can be aligned with apertures provided in a flange of the mast or mast section, for bolting the mast or mast section onto the mast support. Preferably the features provided for mounting the mast or mast section on a foundation or other mast section are used for securing the mast or mast section onto a mast support.

In an embodiment, the mast supports are configured to engage different sizes of masts and/or mast sections. In such an embodiment, the mast support may for example comprise moving pads or jaws that can be moved between a passive position, for when the mast or mast section is lowered onto the mast support, and, once the mast or mast section is lowered onto the mast support, an active position in which they engage the mast ort mast section to secure the mast or mast section in the upright position.

In an embodiment one or more mast supports are mounted on a deck mounted track. The track for example extends between an assembly station and a storage location, or between two or more assembly stations. Thus, the mast supports ca be moved along the track between different locations. In a further embodiment, the mast supports and the tracks are configured to move a mast or mast section in an upright position along the track.

In an embodiment, the blade handling apparatus comprises a support arm that is at one end pivotably supported on the deck, and that is at an opposite end provided with a pivotable supported cradle for supporting a blade. In such an embodiment, the blade can be moved into the cradle using a crane. In alternative embodiment the blades can be stored with cradles mounted to the blades, and the blade handling apparatus is configured to couple with the cradle instead of with the blade to lift the blade from the storage position.

In an embodiment, the blade handling apparatus is mounted to the base of the crane.

In an embodiment, the installation crane comprises a vertical crane structure. The vertical crane structure comprise a base section and a top section of the installation crane, wherein the base section is fixed to the hull of the vessel and the top section is slewable about a vertical axis relative to the base section. Preferably, the crane comprises at least two sides provided with a vertical trolley track for moving trolleys up and down along the vertical crane structure. In such an embodiment, each of the two trolley tracks comprises a section mounted to the top section of the crane, and a section mounted to the base section of the crane. Thus, when the sections of the respective trolley tracks are aligned, a trolley can be moved from the section of the trolley track mounted to the base section of the crane, onto the section of the trolley track mounted on the top section of the crane.

Providing a trolley track on the base section of the crane allows for moving a trolley close to the surface of the deck. This is beneficial for coupling the trolley with a load to be lifted with the installation crane. For example a nacelle of a top end of a pile for upending said pile with the installation crane. Because the trolley can be moved closely to the object to be lifted form the deck of the vessel, the object can be coupled directly with the trolley, or can be coupled using short wires. Such a direct coupling, or the use of short wires is beneficial because it prevents or reduces swing of the object relative to the trolley. Furthermore, because the trolley is guided by the trolley track, this allows for hoisting of a load in a controlled manner, i.e. with no or a minimal amount of swing relative to the installation crane. Also, wind and sea conditions have no or only a minimal influence on the load during the hoisting process.

In an embodiment, wires of the hoisting device extend between the top of the crane, e.g. from crown blocks provided at the top of the jibs of the crane, and the upper trolley, and further wires may be provided between the upper trolley and the lower trolley, such that the lower trolley is suspended from the upper trolley. In an embodiment, the lower trolley is supported by wires extending from the upper trolley, which wires may are provided with an associated winch to adjust distance between the two trolleys.

In alternative embodiment, both trollies are supported by a wires of the hoisting device that extend between the respective trolley, via the jibs of the crane, to an associated winch.

In an embodiment, the installation crane is mounted on a catamaran type hull, or semi-submersible, and the installation crane is mounted on part of the deck that bridges the distance between the two hulls of the catamaran. Furthermore, in such an embodiment the installation crane is mounted between the two hulls of the catamaran such that these two hulls extend on opposite sides of an installation location at the installation side of the crane. Thus, in the particular embodiment shown, when an assembled wind turbine is lowered onto, or is lifted from, a floating foundation, that floating foundation is partially located between the two hulls of the catamaran.

Preferably the two sided crane is provided with two first trolley tracks, each with at least one trolley, which trolley tracks are provided on the top section of the crane at the first side and at the opposite side, and are thus associated with the first hoisting device and the second hoisting device respectively.

In an embodiment, the base of the crane is provided with two second trolley tracks, at the first side and at the opposite side of the crane. These second trolley tracks are configured to align with a first trolley track when the first hoisting device is positioned at the first side of the crane, to operate at the first assembly station or at the opposite side of the crane, to operate at the installation side of the crane. When the top of the crane is provided with a first hoisting device and a second hoisting device on opposite sides of the crane, each hoisting device being provided with a trolley track and associated trolley on the top section of the crane, the two trolley tracks mounted on the top section of the crane preferably each align with one of the trolley tracks on the base of the crane, when the first hoisting device is positioned at the first side of the crane, to operate at the first assembly station or at the opposite side of the crane, to operate at the installation side of the crane.

In a preferred embodiment, a blade handling apparatus is used for mounting the blades. In an embodiment, the blade handling apparatus comprises a gripper section for engaging and supporting a blade, and a base with which the blade handling apparatus is mounted to the vessel. In an embodiment, the blade handling apparatus is mounted to the wind turbine installation crane that is mounted to the vessel. The blade handling apparatus may further comprise an arm between the base and the gripper section.

In an embodiment, the crane is provided with an upper and a lower trolley for supporting a wind turbine, wherein both trolleys are configured to engage the mast of a wind turbine. In an embodiment, the trolleys are each provided with a wind turbine engagement device, which wind turbine engagement device is movably supported by the trolleys, such that the wind turbine engagement device can be moved in a horizontal plane relative to the crane structure, i.e. in a horizontal plane, to enable movement of a wind turbine mast engaged by the wind turbine engagement devices relative to the crane, and more in particular relative to the vessel supporting the crane.

It is submitted that the wind turbine engagement devices are not configured to support the weight of an assembled wind turbine. They are configured to enable the trolleys to position the wind turbine in the horizontal plane.

In an embodiment, the ring wind turbine engagement devices are ring shaped, i.e. are configured to enclose a section of the mast of the wind turbine. The wind turbine engagement devices may be configured, regarding construction and hydraulics, similar to the pile guides. Pile guides are configured to engage foundation piles for wind turbines. They typically comprise a ring shaped construction, the ring shaped construction comprising one or more hingeably mounted sections, that function as doors for opening the ring structure to enable a pile to be moved into or out of the ring. Furthermore, the ring shaped constructions are, along their inner circumference, provided with movable mounted pile engagement devices. The pile engagement devices can be moved in a radial direction for engaging the circumference of the pile.

Thus, the wind turbine engagement devices can be of a similar design and construction for engaging the masts of wind turbines. It is to be noted that mast of wind turbines in general have a smaller cross section than the foundation piles guided by pile guides. Thus, design and construction of the ring, the hingeably mounted section and the mast engagement devices may be configured to fit the dimensions of the wind turbine mast. Furthermore, since wind turbine masts taper towards the top, the wind turbine engagement device supported by the upper trolley may be of a more compact design than the pile engagement device of the lower trolley.

It is submitted that the shape of the rings does not necessarily has to be circular, but can for example be octagon shaped. Also, the ring may comprise two halves that are configured to hinge towards or away from each other to close and open the ring.

In an embodiment, the crane is provided with an upper and a lower trolley for supporting a wind turbine, wherein both trolleys are configured to move a load in the horizontal plane to compensate for movement of the crane, more in particular movement of the trolley, relative to the sea floor, or relative to a mounting surface of a floating foundation. Thus, the trolley is configured to compensate for sea state induced movement, i.e. movement of the trolley caused by for example waves of currents.

In an embodiment, each of the trolleys comprises two support arms, the support arms supporting a ring, for engaging the mast of the wind turbine, at opposite side thereof. In such an embodiment, the ring is moveably supported by the arms, such that it can move along the arms in a first direction towards and away from the crane. For example, the arms may each be provided with tracks extending along the arm, and the ring may be configured to move along the tracks. Thus, the ring is movably supported at opposite sides.

Furthermore, in such an embodiment, the arms are each mounted on a base, such that the arms and the base form a U-shaped configuration, and the base is movable supported by the trolley for movement in a direction for movement in a second direction, wherein the second direction is perpendicular to the first direction. Thus, ring can be moved in both the first and in the second direction.

In such an embodiment, actuators are provided for moving the base relative to the trolley and actuators are provided for moving the ring relative to the arms. Furthermore, a control system is provided that controls the actuators, and thus controls the movement of the ring, which control system is preferably configured to compensate for sea induced movement of the vessel supporting the crane, more in particular is configured to prevent sea induced movement of the ring relative to the sea floor and/or relative to a floating foundation or a mounting surface on a floating foundation.

In an embodiment, the control system is also linked to the hoisting device supporting the trolley, to control the hoisting device for providing the trolley with heave compensation.

In a further embodiment, the control system is provided with one or more sensors configured to detect movement of an object to be engaged by the ring, and the control system is configured to move the ring with the object to be lifted, to thus enable the ring to engage the object. With such an embodiment, for example the control system may actively move the ring synchronous with the section of a wind turbine mast to be engaged by the ring. Thus, the control system facilitates engaging the mast of a wind turbine mounted on a foundation, for example to lift the wind turbine form the foundation for maintenance and/or to replace the wind turbine with another wind turbine. This is in particular beneficial when the foundation is a floating foundation.

In an embodiment, the wind turbine engagement device comprises a ring, the ring having a ring shaped construction comprising one or more hingeable sections for opening the ring for moving the mast of a wind turbine into or out of the ring. These one or more door sections, more in particular the opening created by opening the one or more door sections, faces away from the crane. To move the mast of the wind turbine into the ring, the wind turbine mast can me moved towards the crane, for example when the mast is mounted on a cart on a deck mounted track or by moving. In an embodiment, the ring is movably supported by the trolley, such that the ring can be moved towards and away from the crane for moving the mast into and out of the ring respectively. In an embodiment, the ring, or the part of the trolley supporting the ring, is hingeably supported such that the ring can be pivoted between an active position, in which the ring is in a horizontal position, for engaging the mast of a wind turbine, and a passive position, in which the ring is in a substantially vertical position, for disengaging the mast of the wind turbine. Thus, in such an embodiment, the mast of the wind turbine is moved into the ring by pivoting the ring, with the one or more door sections of the ring in an opened position, into the active position. For removing the mast out of the ring, the ring is pivoted into the inactive position.

For example, a mast of a wind turbine is supported on the deck of the vessel in an upright position in a first assembly station adjacent the crane. When the trolleys of the crane are, with there rings in the active position, at a second assembly station, the rings are first hinged into the passive position, after which the top section of the crane is rotated to move the trolleys to the first assembly station. Here, the rings with there door sections in the open position, are hinged into the active position, thus receiving the mast into the ring. Subsequently, the door sections of the ring are closed, and the ring engagement devices are moved in a radially inward direction to engage the mast.

In an embodiment according to the invention, the trolleys are heave compensated. In such an embodiment, the hoisting device of the crane is configured to move the trolley along the track in a manner that compensates for sea state induced vertical movement, i.e. movement in the vertical direction caused by waves. It is submitted that heave compensation systems for cranes are generally known in the art, and many types of known heave compensation systems may be configured to provide a trolley of an installation crane according to the invention with heave compensation without a requiring inventive step.

Furthermore, the trolley preferably is configured to compensate for sea state induced movement in a horizontal direction. In such an embodiment, the trolley is configured to actively move a load supported by the crane in a horizontal plane to compensate the for sea state induced movement of the vessel relative to the sea floor.

Preferably the heave compensation device of the crane and the compensation device of the trolley are controlled such that they in combination compensate a load supported by the crane for sea state induced movement of the vessel, and thus of the crane, supporting the load. Such a movement compensation system may thus not only compensate for movement of the vessel relative to the sea floor, but also for movement, in particular sway, of the crane relative to the sea floor. This is for example in particular relevant for a trolley supporting a load near the top of the crane structure.

With an installation crane according to the invention, an assembled wind turbine is typically supported by two trolleys, wherein the upper trolley is supported by the hoisting devices of the installation crane, the lower trolley is supported by wires and/or chains extending between the upper trolley and the lower trolley, and the wind turbine is supported via chains and/or wires connected to the lower trolley and to a bottom end of the mast of the wind turbine. In an embodiment according to the invention one or both trolleys may be configured to provide heave compensation, i.e. to correct for vertical movement of the vessel. For example, wires supporting the lower trolley from the upper trolley, and/or wires supporting the wind turbine from lower trolley may be provided with heave compensation, for example by guiding the wires or chains over sheeves supported by heave compensation cylinders. It is submitted that it is generally known in the prior art to provide a wire supported load with a heave compensation system, and that these types of systems can be integrated with a crane, or with a trolley of the crane, according to the invention.

In embodiment, the crane is provided with alternative trolleys, i.e. trolleys configured particular jobs, for example for lifting and/or engaging objects other than the mast of a wind turbine.

For example, in an embodiment, the crane is provided with a trolley configured for engaging the top end of a mast, for lifting the top end of the mast to upend the mast from a horizontal position into a vertical position. Also, a trolley may be provided that is configured to connect with the top end of a foundation pile, for upending the foundation pile into an upright position. It is submitted that foundation piles are larger and heavier than wind turbine masts, and thus may require a more robust trolley compared to the trolley for upending a wind turbine mast. Also, a trolley may be provided for engaging a nacelle. Thus the installation crane can be used for lifting a nacelle and for installing the nacelle onto the top of a mast, for example the mast already mounted on a floating foundation. In an embodiment, the trolley comprises two arms for engaging the nacelle along opposite sides thereof, preferably for engaging the nacelle, with the front section where the blades have to be mounted to the nacelle facing away from the crane.

Also, a trolley may be provided that is configured to engage the top end of a floating foundation, to engage a floating foundation at the installation side of the crane, and preferably for damping movement of the floating foundation relative to the vessel In an embodiment, the crane is provided with space for storing a pile drive for driving a foundation pile into the sea floor. Thus, when the crane is used for the installation of a foundation pile, the pile drive can be moved from the storage in the crane to a position on top of the pile. In an embodiment, a trolley for supporting the pile drive is provided, and the entry to the pile drive storage is provided between tracks for guiding the trolley, such that, when the trolley is supported adjacent the pile drive storage, the pile drive can be guided along a support rail from inside the pile drive storage to an outside position, in which it is coupled to the trolley such that it can be lowered onto the top of the pile.

In an embodiment, the method for lifting the mast of a wind turbine comprises providing the mast of the wind turbine at the bottom end with a ring, the ring having a radius substantially similar to the radius of the mast, wherein the ring is provided with attachment devices, for example loops or ears, for attaching hoisting wires, for example hoisting wires extending from a trolley on the track of the crane. In a further embodiment, the mast is furthermore provided with a slip joint for mounting the mast onto a foundation. In an alternative embodiment, the slip joint is provided with the attachment devices for attaching hoisting wires for lifting the wind turbine.

In an embodiment, the vessel is provided with mast supports that are configured to cooperate with a slip joint provided at the bottom end of a mast of a wind turbine, such that the mast supports can engage the slip joint to support the mast in an upright position on the deck.

In an embodiment, the bottom section of the crane is at least 10%, preferably is at least 15% of the height of the installation crane, for example is 20% of the height of the installation crane. In an embodiment, the top section of the crane is at least twice as high as the bottom section of the crane. By providing the installation with a high bottom section, the slew bearing is provided at a height that allows for a more optimal load transfer between top section and bottom section, compared to a position closer to the deck, when the crane is supporting an assembled wind turbine.

The present invention also provides a method for assembling a wind turbine and for installation of the assembled wind turbine on a foundation, e.g. a sea-bed mounted foundation or a floating foundation, wherein use is made of a semi-submersible crane vessel, wherein the vessel comprises:

a floating hull with:
  a deckbox structure;
  two parallel pontoons,
  a row of support columns extending upward from each of the two pontoons, the support columns supporting thereon the deckbox structure;
wherein the deckbox structure has a deck and a box bottom,
  an installation crane mounted on the deckbox structure and configured to install the assembled wind turbine on the foundation, e.g. a tub mounted crane, e.g. a crane mounted above a support column at the end of a row of columns,
  wherein, at an assembly station, the hull of the vessel is provided with a mast-receiving well that is sunk into, or through, the hull, preferably a well that extends into, or through a support column of the hull, which well is configured to receive therein at least a portion of the mast of the wind turbine, wherein the assembled wind turbine to be installed comprises at least a part of a wind turbine mast and a rotor assembly that is mounted on the mast, e.g. a nacelle having a hub, which rotor assembly is, optionally, provided with one or more, e.g. all, of the rotor blades, in which method, during an assembly step of the wind turbine, e.g. during mounting of the rotor assembly on the mast and/or during assembly of one or more, e.g. all, of the rotor blades to the rotor assembly, the mast is arranged at least with a portion thereof in the mast-receiving well.

The invention is based on the insight that a semi-submersible vessel is well-suited to be provided with a mast-receiving well that is sunk into, or even through, the hull, which well is configured to receive therein at least a portion of the mast of the wind turbine in the course of the assembly of the wind turbine.

In a preferred embodiment, the mast-receiving well extends into a support column, optionally even into the pontoon. The well, preferably has a floor configured for the mast to stand thereon, e.g. the floor being integrated with the pontoon and/or with a lower section of the support column.

It will be appreciated that the mast-receiving well can be retrofitted in existing semi-submersible vessels.

Preferably, the mast-receiving well is arranged with reach of the installation crane, thereby allowing for use of the crane to place the mast, or part thereof in the well and to later remove the assembled, or partly assembled wind turbine from the well, the wind turbine then being placed by the crane on the foundation.

For example, the installation crane is mounted directly above a support column at the end of a row of columns, so practically at a corner of the deckbox structure, and the mast-receiving well is provided in the adjacent support column of the same row of columns on the pontoon. In another embodiment, e.g. when the vessel has one installation crane at one corner of the deckbox structure above a support column at the end of a row of columns on the one pontoon, the mast-receiving well is arranged into or through a support corner at the end of the row of columns on the other pontoon, e.g. the crane and the well both being located at the stern of the vessel, each, for example, practically at a corner of the deckbox structure.

In embodiments, as known in the art, the vessel has two, possible identical, cranes, each fitted at a corresponding corner, e.g. at the stern, of the of the deckbox structure.

In an embodiment, the well is fitted, and the vessel has one mast-receiving well is provided in the adjacent support column of the same row of columns on the pontoon.

For example, the well has a depth of at least 15 meters, e.g. at least 30 meters, measured from the deck of the deckbox structure. For example, the well has a depth over 40 meters, which is, for example, possible within a vessel like the recently launched Sleipnir vessel as the overall height there is about 50 meters.

For example, an embodiment of the well having a depth of at least 30 meters, e.g. over 40 meters, allows for receiving a significant portion of the entire mast of a wind turbine in the well, e.g. as mast heights may vary between 75 and 110 meters in practical embodiments. Due to the placement in the well, the top of the mast is closer to the deck, which facilitates operations like mounting the nacelle on the mast top, mounting one or more, e.g. all, blades to the nacelle, etc.

In view of the height of the mast, and the advantages of having the top end relatively close to the deck for performing some assembly steps, e.g. mounting the nacelle and/or mounting one or more, e.g. all, blades, it is envisaged that in embodiments the well extends through the hull, e.g. through a support column and the further down through the pontoon. In the latter version the well resembles a moonpool or shaft entirely through the hull, e.g. allowing for operations wherein the mast sticks out below the bottom of the pontoon of the vessel. In such an open bottomed well, the mast or part thereof can be suspended, e.g. by means of winch driven cables, e.g. said cables engaging on the lower end of the mast.

An open bottomed well may allow for arranging, e.g. suspending, the mast (or mast part) therein such that the top thereof is in proximity of the deck. For example, this allows for the nacelle to be moved substantially horizontally over the deck, e.g. by one or more vehicles or by a cart, e.g. over rails mounted on deck, e.g. skidded by a skid cart, in order for the nacelle to be positioned over the mast top end and connected thereto. For example, the mast is then lifted over part of its height to a height that is suited for mounting one or more blades to the nacelle.

The above described operation could in combination with an closed bottom well, so one that does extend into the hull yet not through the hull, also be carried out when use is made of a two-part mast for the wind turbine. Herein the upper part of the mast is placed in the well and the nacelle mounted then on top thereof.

It will be appreciated by the skilled person that a technical feature discussed herein as required or as optional with respect to one embodiment of the invention may be equally applicable to one or more other embodiments described herein, with the feature performing its designation function. Such combinations are all envisaged herein unless a combination would result in a technical impossible solution and/or not meet the desired functionality.

In the drawings, components corresponding in terms or construction and/or function are provided with the same last two digits of the reference numbers.

BRIEF DESCRIPTION OF THE DRAWINGS

In the drawings

FIGS. 11 and 12 show an installation crane according to the invention with a first trolley in an active position and in an inactive position respectively;

Further objects, embodiments and elaborations of the apparatus and the method according to the invention will be apparent from the following description, in which the invention is further illustrated and elucidated on the basis of a number of exemplary embodiments, with reference to the drawings.

Figure 1:
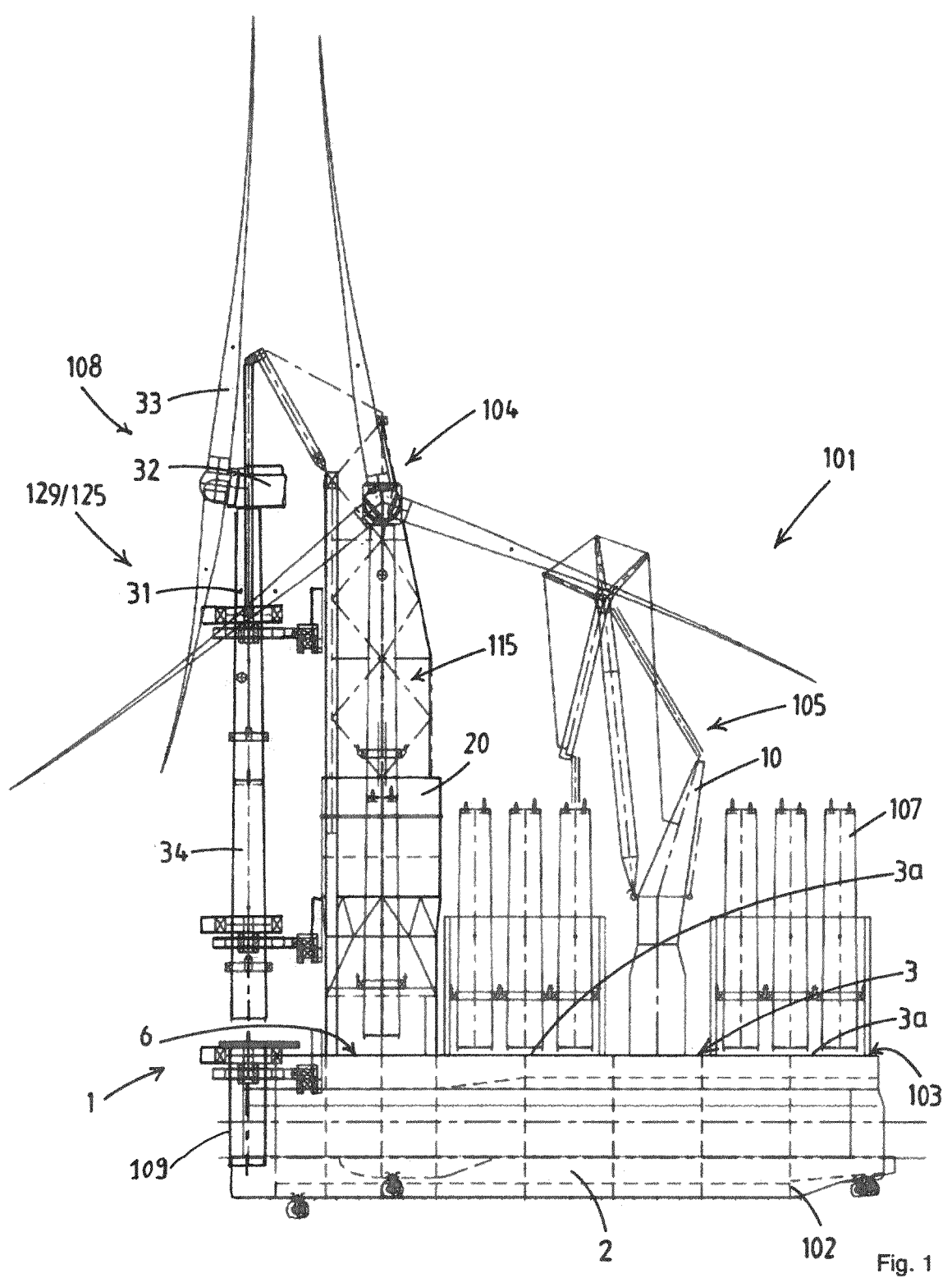
FIG. 1 shows a side view of a wind turbine assembly and installation vessel according to the invention, the vessel comprising a floating hull, a wind turbine components storage deck, an installation crane and a handling crane.

In FIG. 1 a wind turbine assembly and installation vessel 1, 101 is shown, comprising a floating hull 2, 102, a wind turbine components storage deck 3, 103, a handling crane 10, 105 and an installation crane 20, 104.

The installation crane 20 is provided adjacent a side of the hull of the vessel, preferably at the front side or stern side of the vessel, to be able to lower a wind turbine from the vessel onto a foundation, e.g. a floating foundation. The handling crane 10 is provided in the vicinity of the installation crane 20, at a more central position of the hull of the vessel and thus remote from the front and stern sides of the hull of the vessel.

The wind turbine components storage deck 3 as shown comprises distinct storage areas for distinct wind turbine components. In particular a lower mast parts storage area 3a is provided adjacent an upper mast parts storage area 3b, visible in the top view of FIG. 3. Both storage areas are arranged at the same side of the vessel, remote from the installation crane 20, and within reach of the handling crane 10.

Furthermore, a nacelles storage area 3c and a blades storage area 3d are provided. The blades storage area 3d is provided at an opposite side of the vessel 1 of the lower and upper mast parts storage area 3a, 3b. The nacelles storage are 3c is provided centrally there between. In the shown configuration, six nacelles, six lower and six upper mast parts can clearly be discerned in FIG. 3.

Figure 3:
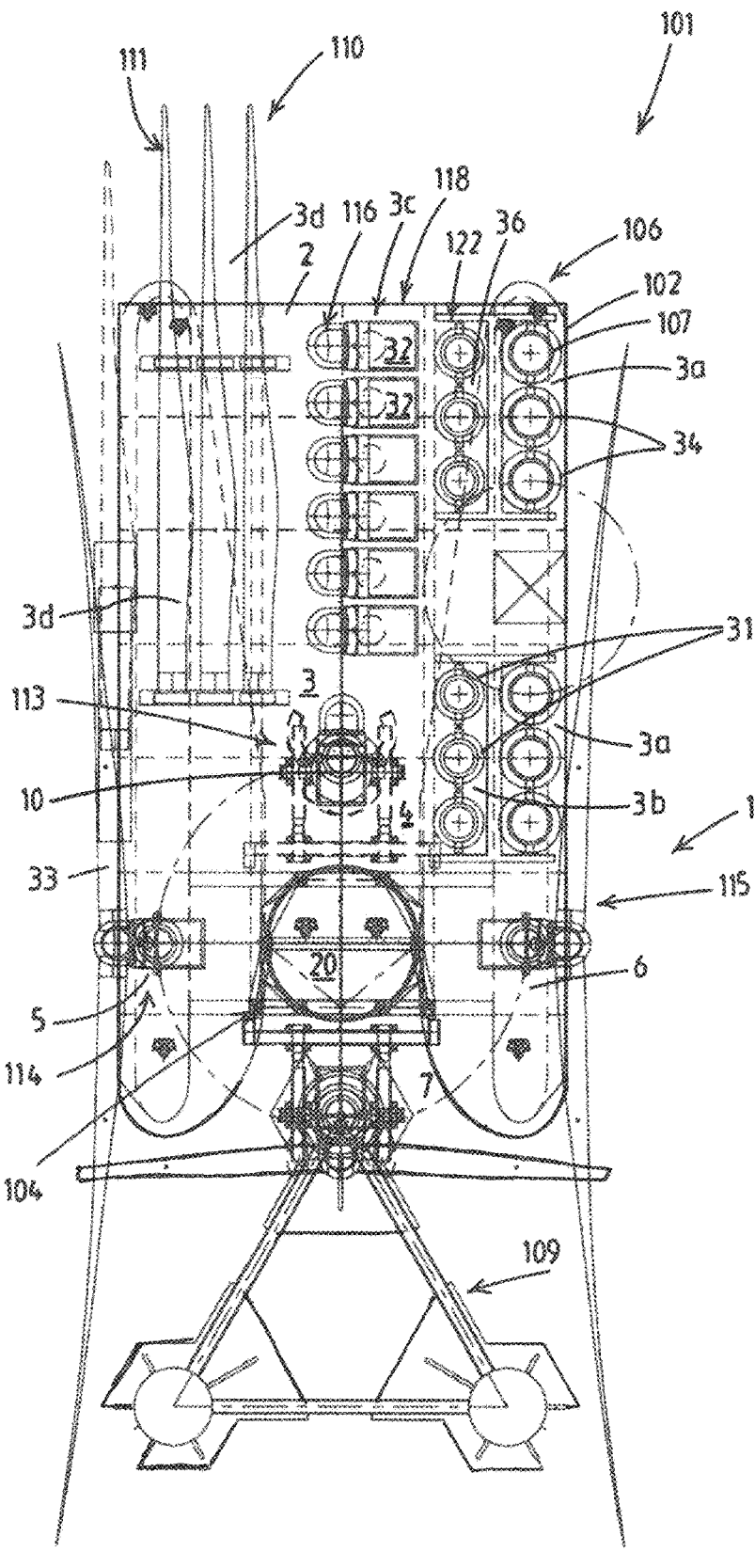
FIG. 3 shows a top view of the wind turbine assembly and installation vessel of FIG. 1, wherein the handling crane is not shown, and wherein part of a hoisting device of the installation crane is shown hoisting an upper mast part in a first installation position and engaging an upper mast part in a first installation position.

The wind turbine assembly and installation vessel 1 further comprises a first assembly station 4, a second assembly station 5 and a third assembly station 6, see FIG. 3.

These assembly stations are provided adjacent the installation crane 20. The installation crane 20 has an installation side 7, and is configured for supporting an assembled wind turbine at its installation side in a mounting position above a foundation 109 and for lowering the wind turbine onto the foundation. With the installation crane 20 in the centre, in top view, the installation side 7 is provided at a 6 o'clock position.

In the shown embodiment, the first assembly station 4 is located on a first side of the installation crane, opposite the installation side, at the 12 o'clock position in FIG. 3. The second assembly station 5 is located on a second side of the installation crane, at a 9 o'clock position, and the third assembly station 6 is located on a third side of the installation crane, opposite the second assembly station 5, at a 3 o'clock position.

In the shown embodiment, the upper and lower mast parts storage areas 3a, 3b are situated in the vicinity of the first assembly station 4 and the third assembly station 6. The nacelles storage area 3c is situated in the vicinity of the first assembly station 4 and the blades storage area 3d is provided in the vicinity of the second assembly station 5.

The shown configuration allows the arrangement of an upper mast part 31 from the upper mast part storage area 3b into the first assembly station 4, preferably using the handling crane 10, and supporting the upper mast part in an upright installation position. In an embodiment, the deck of the vessel is provided with mast supports, for example a cone or cylindrical shaped support, onto which a mast section can be lowered, and which is configured to engage the mast section such that it supports the mast section in an upright position.

Subsequently, a nacelle 32 is hoisted from the nacelles storage area 3c on said upper mast part 31 in the first assembly station 4, preferably using the handling crane 10. The nacelle 32 is mounted onto the upper mast part 31.

In a subsequent step, the combined upper mast part 31 and nacelle 32 is arranged from the first assembly station 4 to the second assembly station 5, preferably using the installation crane 20. The wind turbine upper mast part 31 is supported with the nacelle 32 in an upright installation position for mounting a blade to the nacelle.

Figure 2:
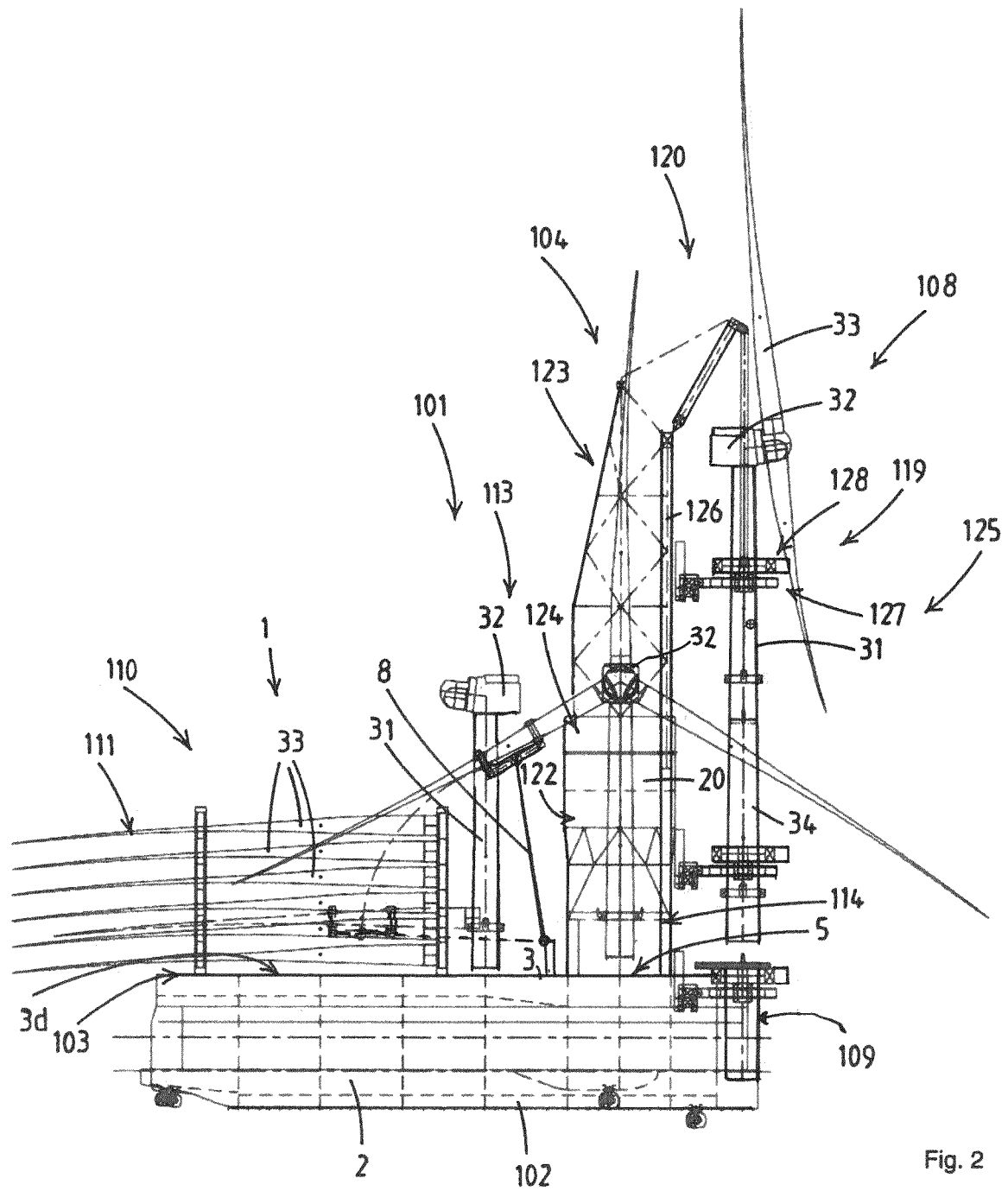
FIG. 2 shows another partial side view of the wind turbine assembly and installation vessel of FIG. 1, wherein the handling crane is not shown.

In FIG. 2 is schematically shown a blade handling apparatus 8, for transferring a blade 33 between a horizontal supply position and a fastening position.

The blades 33 are mounted to the nacelle 32, preferably using the blade handling apparatus 8.

In an embodiment, the blade handling apparatus comprises a support arm that is at one end pivotably supported on the deck, and that is at an opposite end provided with a pivotable supported cradle for supporting a blade. In such an embodiment, the blade can be moved into the cradle using a crane. In alternative embodiment the blades can be stored with cradles mounted to the blades, and the blade handling apparatus is configured to couple with the cradle instead of with the blade to lift the blade from the storage position.

In an alternative embodiment, the blades are moved into the fastening position using a crane.

Figures 4, 5:
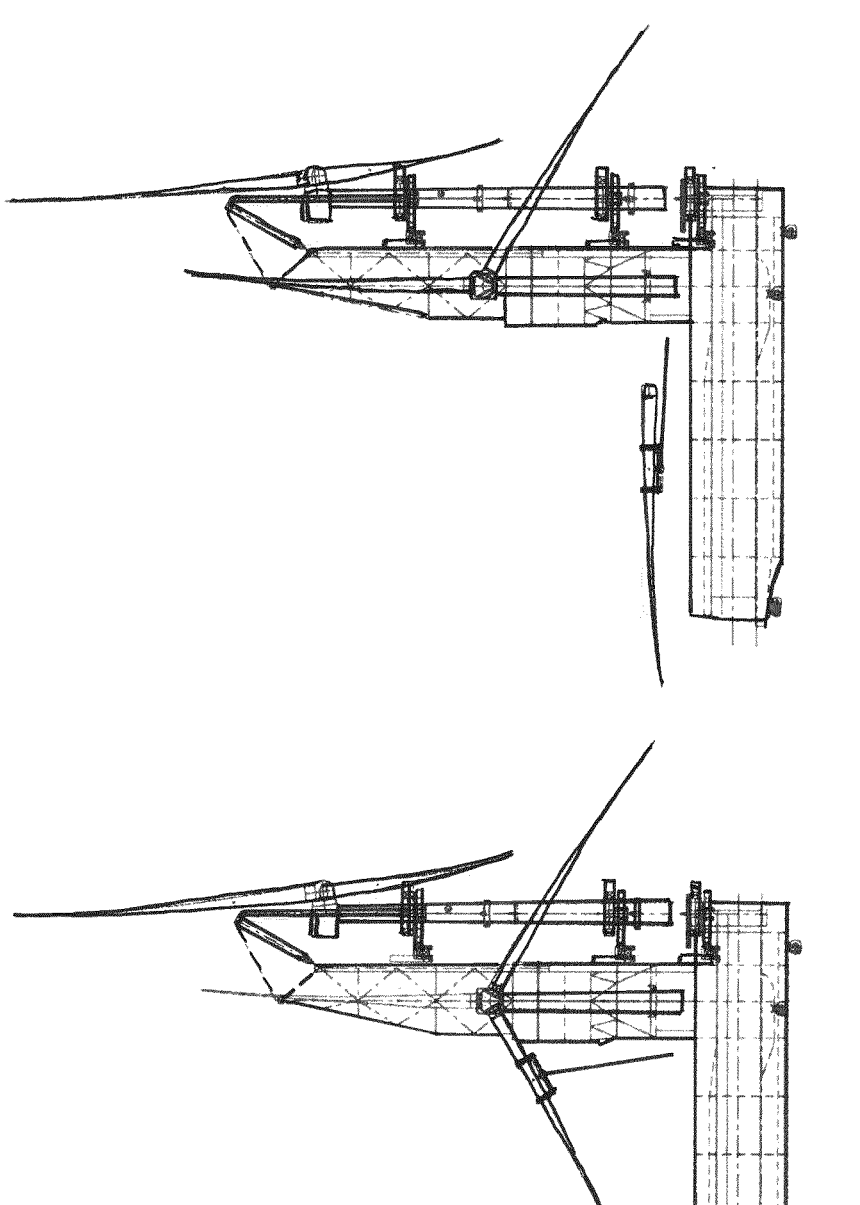
FIG. 4 shows a side view of the wind turbine assembly and installation vessel of FIG. 1, wherein a blade handling apparatus supports a blade in a horizontal supply position.
FIG. 5 shows a side view of the wind turbine assembly and installation vessel of FIG. 1, wherein the blade handling apparatus supports a blade in a fastening position.

The blades mounting process, partially shown in FIG. 4 and FIG. 5, comprises the following steps:

lifting a first blade into a fastening position adjacent the nacelle, in the embodiment shown using the blade handling apparatus, mounting the first blade to the nacelle, and rotating the nacelle into a successive installation position, lifting a second blade into a fastening position adjacent the nacelle, in the embodiment shown using the blade handling apparatus, mounting the second blade to the nacelle, and rotating the nacelle into a successive installation position; and lifting a third blade into a fastening position adjacent the nacelle, in the embodiment shown using the blade handling apparatus, and mounting the third blade to the nacelle.

The assembly method comprises a subsequent step of arranging a lower mast part 34 from the lower mast part storage area 3a into the third assembly station 6, in the embodiment shown using the handling crane 10, and supporting the lower mast part 34 in an upright installation position.

The combined upper mast part 31, nacelle 32 and blades 33 are hoisted, in the embodiment shown using the installation crane 20 towards the third assembly station 6 and the upper mast part 31 is mounted onto the lower mast part 34 in the third assembly station 6 to provide an assembled wind turbine.

Figure 6:
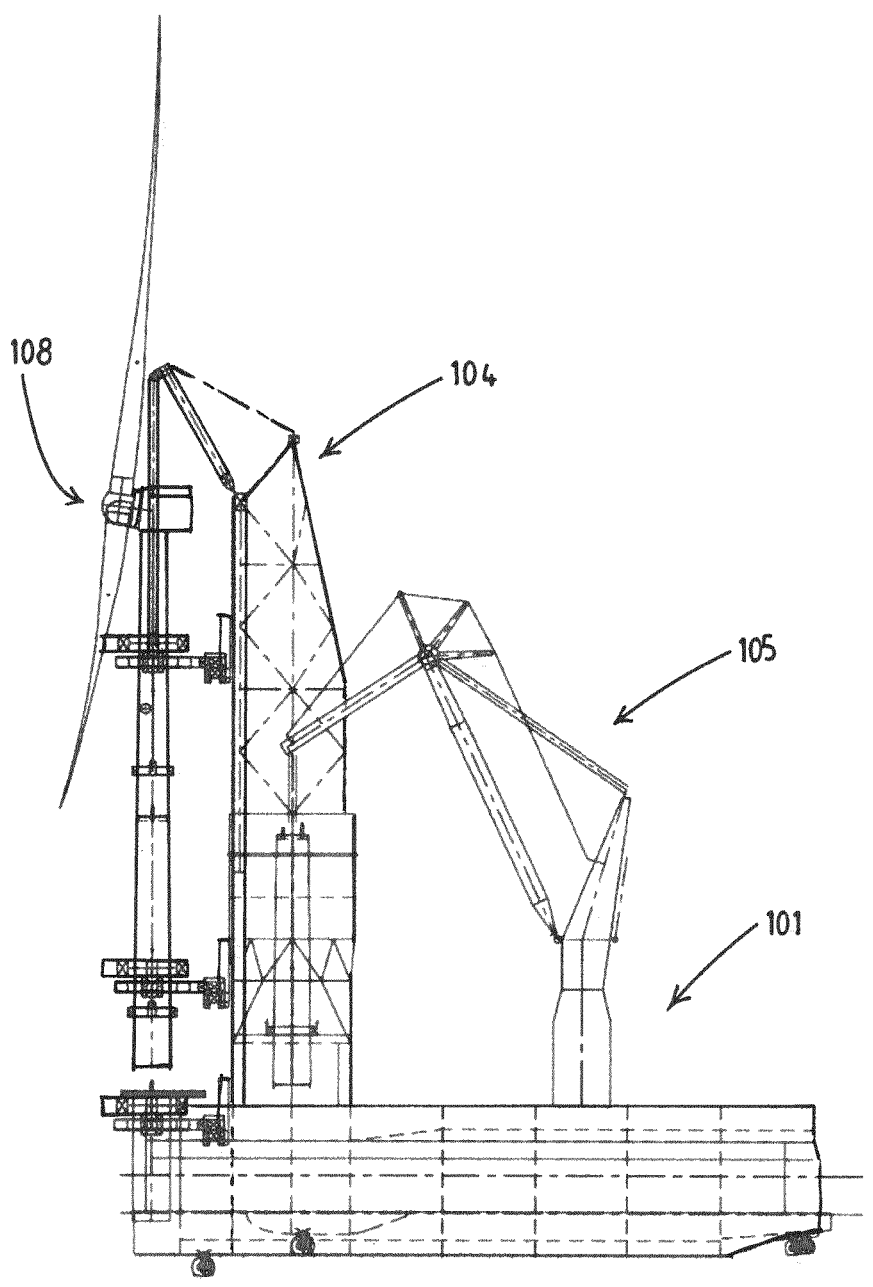
FIG. 6 shows a side view of the wind turbine assembly and installation vessel of FIG. 1, wherein the handling crane hoists a lower mast part into a third assembly station.

Finally, the assembled wind turbine is hoisted into the mounting position at the installation side 7 of the installation crane 20, and is lowered onto the foundation, using the installation crane 20. This step is shown in FIG. 6.

FIG. 1 shows a side view of a wind turbine assembly and installation vessel 101 according to the invention, the vessel comprising a floating hull 102, a wind turbine components storage deck 103, an installation crane 104 and a handling crane 105.

In the exemplary embodiment shown in FIG. 1, the wind turbine components storage deck 103, comprises a lower mast parts storage area, an upper mast parts storage area, a nacelles storage area, and a blades storage area.

In FIG. 1, the lower mast parts storage area 106 with multiple lower mast parts 107, is shown.

Furthermore, in FIG. 1, an assembled wind turbine 108 is shown in a position adjacent the installation crane 104 in a third assembly station 115, and in a position being supported by the installation crane 104 above a floating foundation 109 at an installation side 119 of the installation crane 104. The floating foundation 109 is only partially depicted.

FIG. 2 shows another partial side view of the wind turbine assembly and installation vessel 101. In this figure, the handling crane 105 is not shown. The blades storage area 110, with multiple blades 111, is shown.

Furthermore, in FIG. 2, an assembled wind turbine 108 is shown in a position being supported by the installation crane 104 above a floating foundation 109. The floating foundation 109 is only partially depicted.

Furthermore, FIG. 2 shows an upper mast part 112, provided with a nacelle 116 and blades in a position adjacent the installation crane 104 in a second assembly station 114. Also, an upper mast part 112 provided with a nacelle 116, without the blades, is shown in a position adjacent the installation crane 104 in a first assembly station 113.

FIG. 3 shows a top view of the wind turbine assembly and installation vessel of FIG. 1. The figure shows the lower mast parts storage area 106 adjacent the upper mast parts storage area 117, which are located on opposite sides of the handling crane 105, of which only the base is depicted. Also shown is the blades storage area 110, and the nacelle storage area 118, with multiple nacelles 116.

The first assembly station 113, second assembly station 114 and third assembly station 115 are shown adjacent the installation crane 104.

It is noted that in FIG. 3 and upper mast part with nacelle is shown in the first assembly station 113, an upper mast part provided with nacelle and blades is shown in the second assembly station, and an assembled wind turbine 108, comprising a lower mast part 107 an upper mast part 112, a nacelle 116 and blades 111 is shown being supported by the installation crane 104.

With respect to the FIGS. 1-3 it is noted that the figures depict multiple assembly stations being occupied by a partially or fully assembled wind turbine. In practice, an upper mast part is transferred along the successive assembly stations to assemble a wind turbine. Preferably, only after the assembled wind turbine is installed, a new upper mast section is arranged in the first assembly station to start a new assembly process. Thus, typically only one of the assembly stations is occupied at one moment in time. However, a lower mast section can already be arranged at the third assembly station while the upper mast section is in, or is transferred between, the other assembly stations. Also, it is possible to arrange a new lower mast section in the first assembly station while the wind turbine is being assembled or installed.

The installation crane 104 is provided with a wind turbine hoisting device 120 having one wind turbine suspension element 121. The wind turbine hoisting device 120 is adapted to support and to raise and lower in a controllable manner at least an upper mast part of the wind turbine, e.g. for moving an upper mast part provided with a nacelle from the first assembly station to the second assembly station, while in vertical orientation.

The installation crane 104 has a base section 122 and a top section 123. The top section 123 is rotatable supported by a bearing 124, and can be rotated with the hoisting device 120 relative to the base section 122 about a vertical axis. The hoisting device can thus transfer an upper mast part between the installation stations and the mounting position.

In the embodiment shown, the wind turbine hoisting device 120 is adapted to support and to raise and lower in a controllable manner an upper mast part that is part of an assembled wind turbine, for moving the assembled wind turbine from the third assembly station into an installation position above a foundation.

In the embodiment shown, the first assembly station 113 is configured for supporting an upper mast part in an upright installation position, see FIG. 2. The handling crane 105 is configured for hoisting the nacelle 32 on the upper mast section in the assembly station. The second installation location 114 is configured for supporting the wind turbine upper mast part in an upright installation position with the nacelle in an installation position for mounting blades to the nacelle, see for example FIG. 2.

The third installation location 115 is configured for supporting the lower mast part in an upright installation position to enable hoisting the combined upper mast part, nacelle and blades, in the embodiment shown using the installation crane, and mounting the upper mast part onto the lower mast part in the third assembly station to provide an assembled wind turbine, see for example FIG. 1.

The second assembly station 114 and third assembly station 115 are located on opposite sides of the installation crane 104, and the first assembly station 113 is located opposite the first vertical side 125 of the installation crane, i.e. the side of the installation crane for mounting a assembled wind turbine on a foundation using the installation crane.

In an embodiment, the vessel further comprises a blade handling apparatus, located adjacent the second installation location, for transferring a blade between a horizontal supply position and a fastening position adjacent the nacelle on top of an upper mast section supported in the second installation location.

Figures 9, 10:
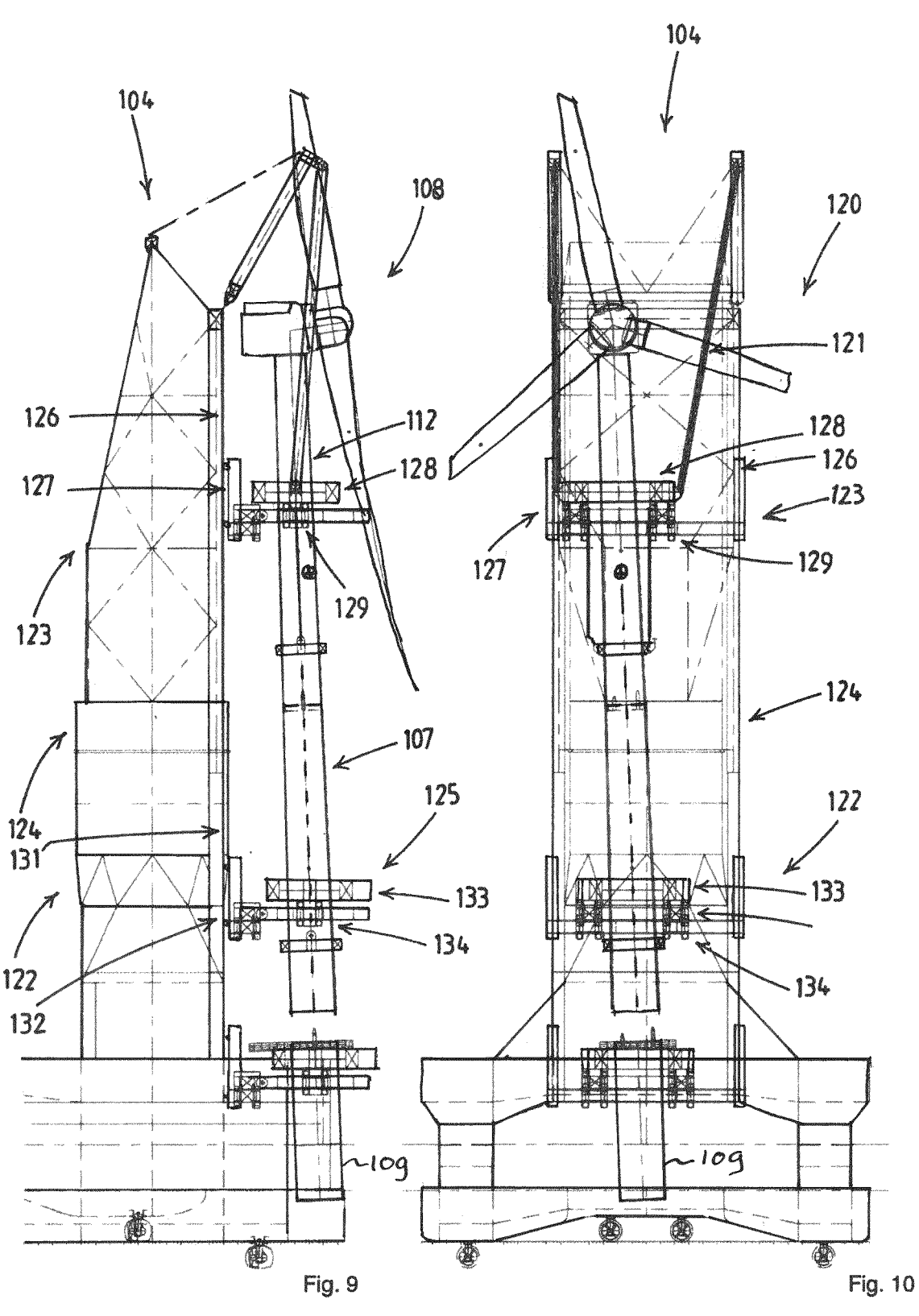
FIGS. 9 and 10 show side and a frontal view of the installation crane of the vessel of FIG. 1 in close up, the installation crane supporting an assembled wind turbine in an installation position and compensating for wave induced motion of the wind turbine relative to the foundation.

In the exemplary embodiment shown, the wind turbine hoisting device 120 comprises a first trolley guide 126, mounted to the top section 123 of the installation crane 104, and a first wind turbine installation trolley 127 which is vertically mobile along said first trolley guide 126. See for example FIG. 9 and FIG. 10. The first trolley 127 supports a wind turbine engagement device 128. An active horizontal motion device 129 is mounted between the trolley and the wind turbine engagement device, the active horizontal motion device 129 is adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device.

The first trolley 127 and the wind turbine engagement device 128 are supported by multiple suspension elements 130, which, in the exemplary embodiment shown, are connected to the wind turbine engagement device 128.

In the particular embodiment shown, the suspension elements are hoisting wires attached to associated winches. The winches can be used to lower and lift the first trolley.

In exemplary embodiment shown, the base section 122 of the installation crane 104 is provided with a second trolley guide 131 and a second wind turbine installation trolley 132 which is vertically mobile along said second trolley guide on the first vertical side of the installation crane.

The second trolley supports a wind turbine engagement device 133, and an active horizontal motion device 134 is mounted between the second trolley 132 and the wind turbine engagement device. The active horizontal motion device being adapted to actively compensate for sea-state induced horizontal displacement of the wind turbine engagement device relative to the foundation in at least one horizontal direction, possibly in two non-parallel horizontal directions, e.g. in orthogonal horizontal directions, while a wind turbine is supported by said wind turbine engagement device.

In the exemplary embodiment shown, the first trolley 127 and second trolley 132 can be arranged in an active position, see for example FIG. 11, for supporting the upper mast part, see for example FIGS. 7-10, and an inactive position, see for example FIG. 12, for moving along an upper mast part supported in an assembly station. The first trolley 127 is shown in its active position in FIG. 11, and is shown in its inactive position in FIG. 12

In the exemplary embodiment shown, the hoisting device 120 comprises two spaced apart jibs 135, that support the suspension elements 130, which are connected to the wind turbine engagement device on the first trolley.

The two jibs 135 can be arranged in an active position, shown in FIG. 11, for supporting the first trolley 127 and the first wind turbine engagement device 128 in an active position, and an inactive position, shown in FIG. 12, for moving along a nacelle or blade of a partially or fully assembled wind turbine in an assembly station.

Figures 7, 8:
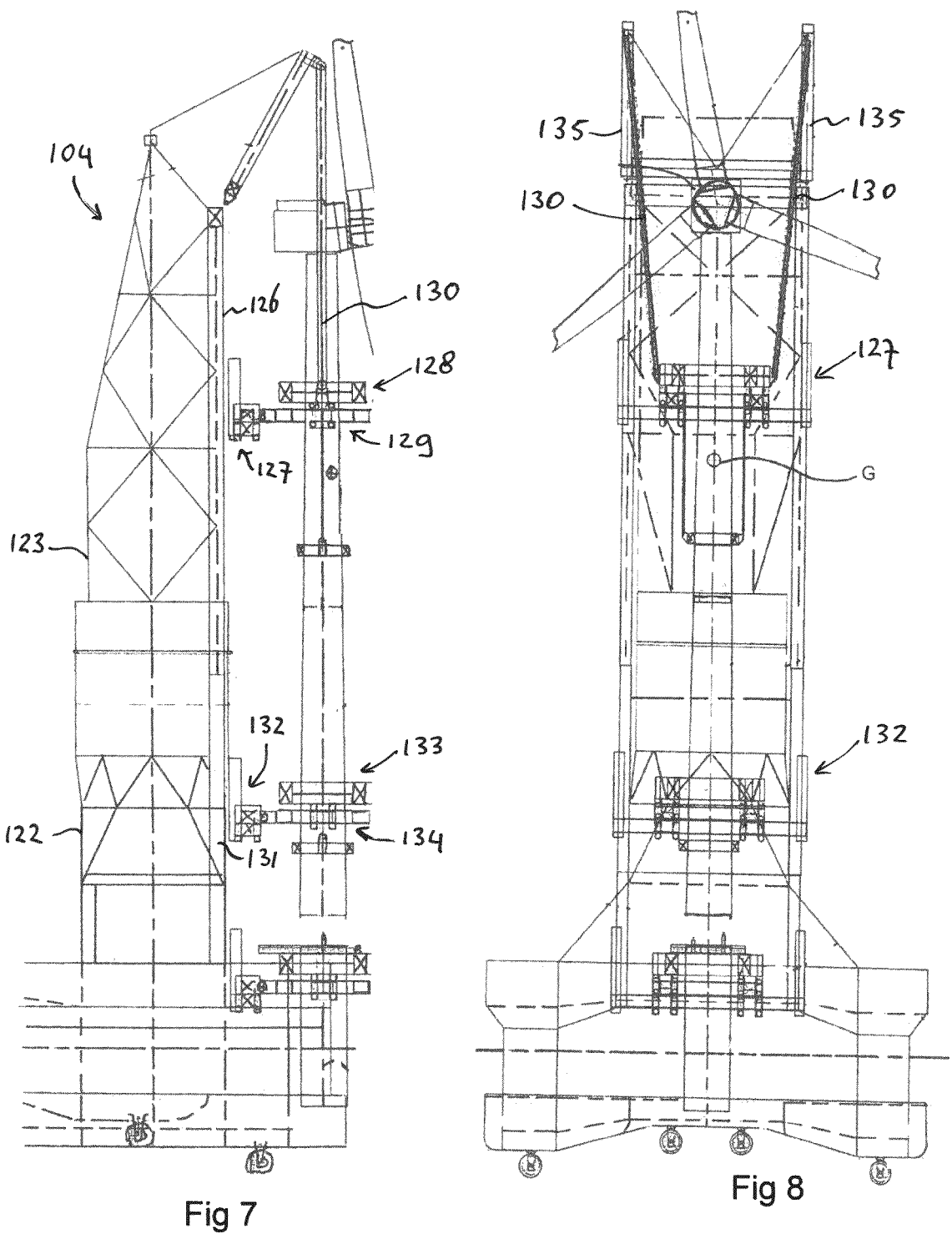
FIG. 7 shows a side view of the installation crane of the vessel of FIG. 1 in close up, the installation crane supporting an assembled wind turbine in an installation position.
FIG. 8 shows a frontal view of the installation crane of the vessel of FIG. 1 in close up, the installation crane supporting an assembled wind turbine in an installation position.

Furthermore, the installation crane 104 is configured such that, when an assembled wind turbine is supported by the installation crane, see FIGS. 7 and 8, the jibs extend above the nacelle of the wind turbine, and the nacelle is positioned between the jibs, when seen in a frontal view.

FIG. 11 show an installation crane 104 according to the invention with a first wind turbine installation trolley 127 in an active position, i.e. a position in which the trolley can support a load, e.g. a wind turbine. FIG. 12 shows the same installation crane with the first trolley in an inactive position. With the trolley in the inactive position, the top section of the installation crane can be rotated with the first trolley passing for example an assembled wind turbine standing in a first wind turbine assembly station located adjacent a side of the crane.

Figure 13:
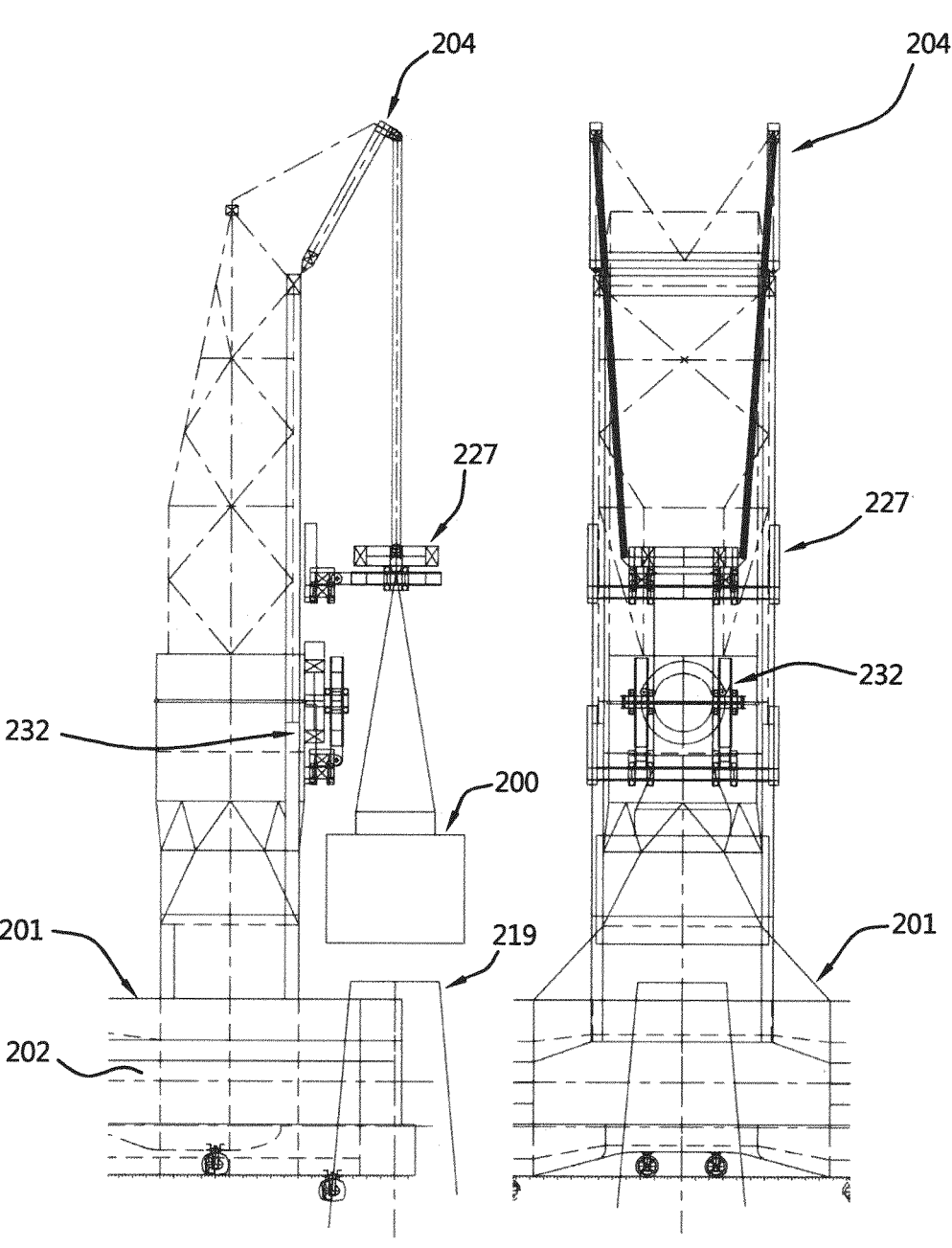
FIG. 13 show a side view of an installation crane according to the invention with a first trolley in an active position and a second trolley in an inactive position respectively, the installation crane lifting an object using the first trolley.

FIG. 13 show a side view of a wind turbine installation crane 204 according to the invention with a first trolley 227 in an active position and a second wind turbine installation trolley 232 trolley in an inactive position respectively, the installation crane lifting an object 200 using the first trolley 227.

FIGS. 14-20 show subsequent assembly steps of a wind turbine assembly and installation process according to the invention. The process comprises multiple wind turbine assembly steps.

The method relates to a wind turbine comprising a mast 235. In such an embodiment, during the assembly process a nacelle 216 is mounted on top of the mast 235, preferably prior to providing the nacelle 216 with blades 211.

Figures 24, 25, 26:
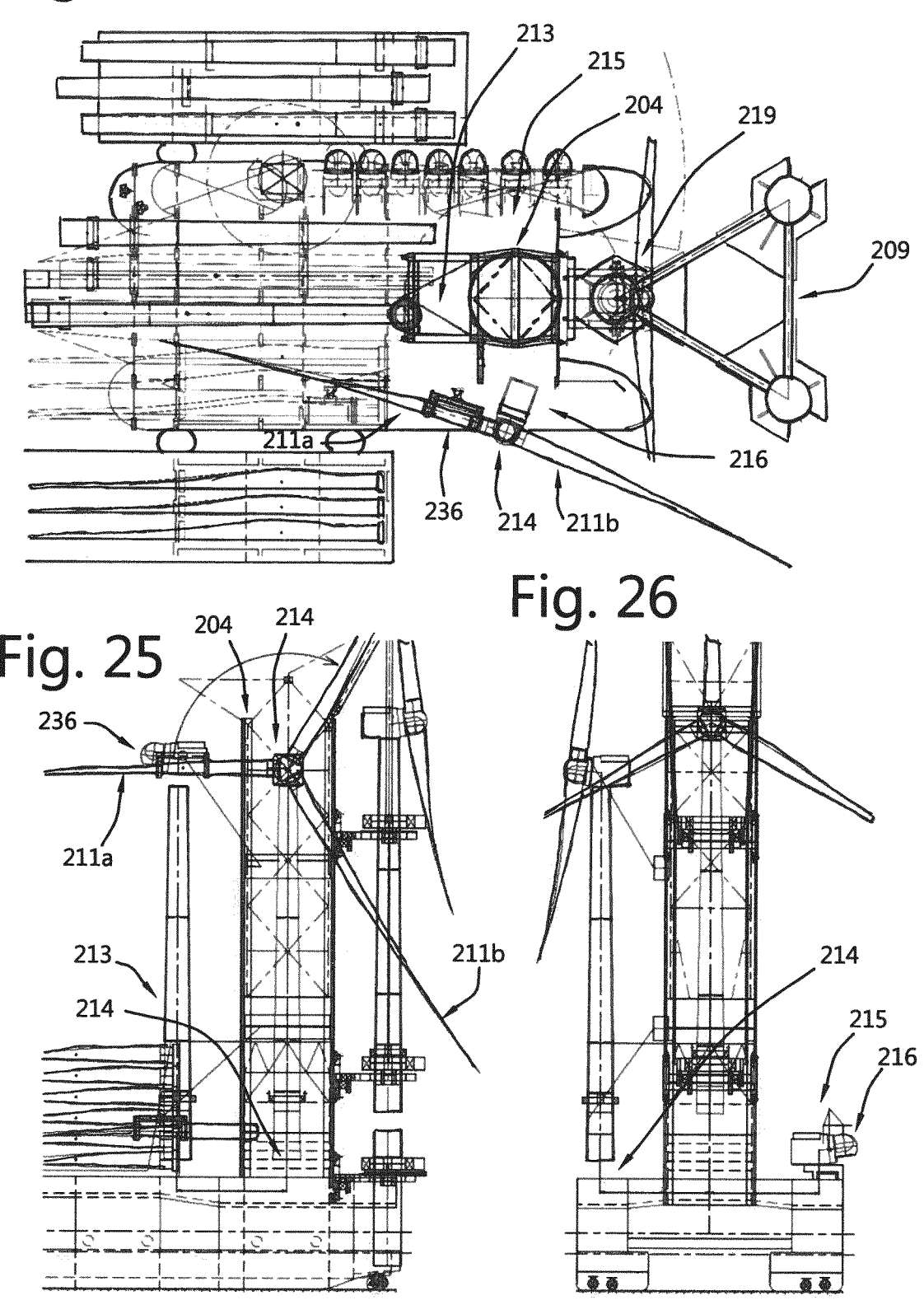
FIG. 24 shows a partial top view of a vessel according to the invention with a wind turbine at a second wind turbine assembly station being fitted with a blade.
FIG. 25 shows a partial side view of a vessel according to the invention with a wind turbine at a second wind turbine assembly station being fitted with a blade.
FIG. 26 shows a frontal view of the vessel of FIG. 25.

The wind turbine installation vessel 201 shown in the FIGS. 14-20 comprises a floating hull 202, a wind turbine components storage deck 203, a wind turbine installation crane 204, a blade handling apparatus 236, a first wind turbine assembly station 213, a second wind turbine assembly station 214 and a third wind turbine assembly station 215. The wind turbine assembly stations, in particular their position relative to the wind turbine installation crane, are also indicated in FIG. 24.

The wind turbine installation crane 204 is mounted on the floating hull 202, in the embodiment shown on a deck of the floating hull. In the embodiment shown, the installation crane 204 has a first, second and third assembly side, the respective assembly sides facing the first, second and third wind turbine assembly stations. The installation crane 204 furthermore has an installation side 219.

Thus first wind turbine assembly station 213 is located on the first side of the installation crane 204. It is furthermore opposite the installation side 219 of the installation crane 204.

The third wind turbine assembly station 215 is located opposite the second wind turbine assembly station.

In the embodiment shown, the wind turbine components storage deck 203 is provided with a blades storage area 210, a masts storage area 217 and a nacelle storage area, shown in the partial top view of FIG. 24.

The vessel furthermore comprises a blade handling apparatus 236, for transferring a blade between a horizontal supply position and a, raised, blade fastening position adjacent the nacelle 216 of the wind turbine being assembled. In the preferred embodiment shown, the blade handling apparatus 236 is located at the second wind turbine assembly station 214.

The method comprises multiple wind turbine assembly steps.

Figures 14, 15:
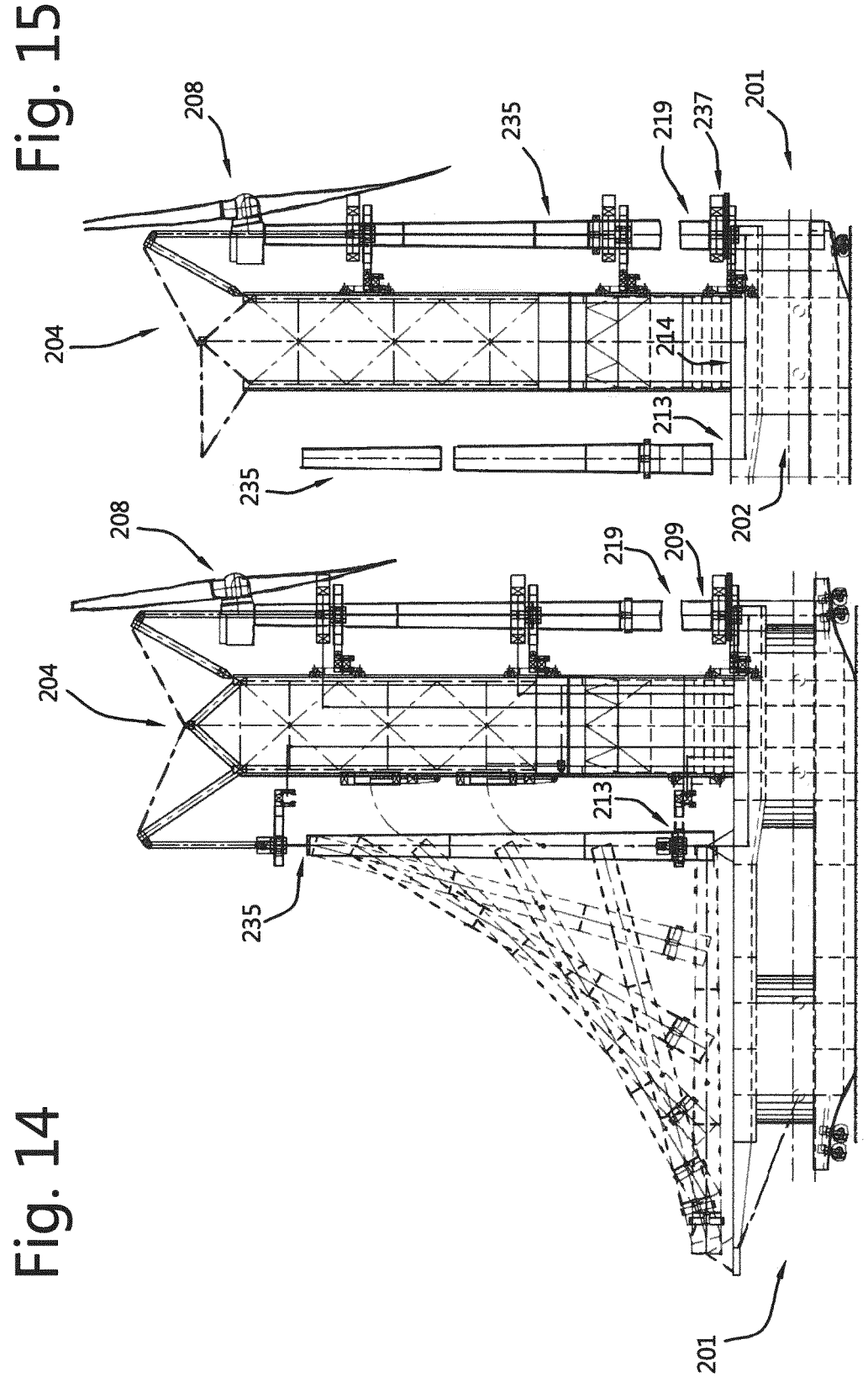
FIG. 14 shows a side view of a vessel according to the invention, with an installation crane up-ending a mast for a wind turbine at a first wind turbine assembly station at one side and supporting a assembled wind turbine at an installation side of the wind turbine installation crane.
FIG. 15 shows a partial side view of the vessel of FIG. 14 with the mast upended in an upright installation position at the first wind turbine assembly station.

The method starts with moving one or more wind turbine components from the wind turbine components storage deck 203 to one or more of the wind turbine assembly stations. In the particular embodiment shown, a mast 235 in a horizontal orientation is with a top end positioned at the first wind turbine assembly station 213 to enable up-ending of the mast 235 using the wind turbine installation crane 204. The upending of the mast horizontal storage position into an upright installation position is shown in FIG. 14, in which the mast 235 is shown in multiple subsequent positions during the up-ending process. FIG. 15 shows the mast 235 upended in an upright installation position at the first wind turbine assembly station 213.

It is noted that, in the particular embodiment shown, the wind turbine installation crane 204 is a two sided crane, having a first hoisting device on a first side of the crane and a second hoisting device on a second, opposed, side of the crane, to enable the crane to perform hoisting actions simultaneously on opposite sides of the crane. In FIG. 15 the installation crane supports an assembled wind turbine at the installation side of the crane while upending a mast at the first wind turbine assembly station.

Preferably the two sided crane is provided with two first trolley tracks, each with at least one trolley, which trolley tracks are provided on the top section of the crane at the first side and at the opposite side, and are thus associated with the first hoisting device and the second hoisting device respectively.

In an embodiment, the base of the crane is provided with two second trolley tracks, at the first side and at the opposite side of the crane. These second trolley tracks are configured to align with a first trolley track when the first hoisting device is positioned at the first side of the crane, to operate at the first assembly station or at the opposite side of the crane, to operate at the installation side of the crane. When the top of the crane is provided with a first hoisting device and a second hoisting device on opposite sides of the crane, each hoisting device being provided with a trolley track and associated trolley on the top section of the crane, the two trolley tracks mounted on the top section of the crane preferably each align with one of the trolley tracks on the base of the crane, when the first hoisting device is positioned at the first side of the crane, to operate at the first assembly station or at the opposite side of the crane, to operate at the installation side of the crane.

The method furthermore comprises the assembly steps of moving the nacelle 216 to the third wind turbine assembly station 215 to enable the wind turbine installation crane 204 to lift up the nacelle 216 and mount the nacelle on top of the mast 235 at the first wind turbine assembly station.

Figures 16, 17, 18:
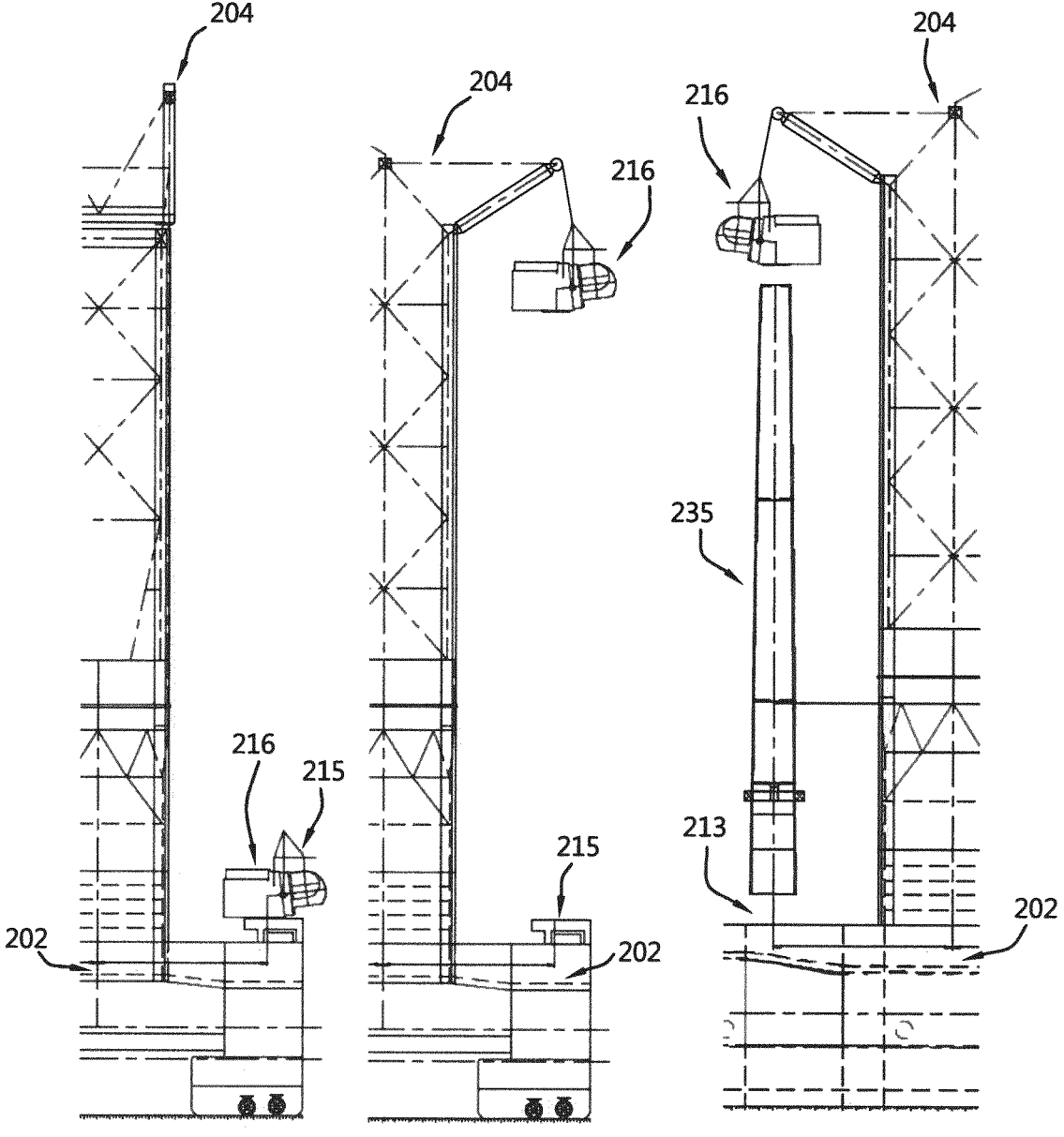
FIG. 16 shows a partial frontal view of the vessel; of FIG. 14 with a nacelle in a third wind turbine assembly station ready to be lifted by the wind turbine installation crane.
FIG. 17 shows a partial frontal view of the vessel of FIG. 14 with the nacelle lifted by the installation crane at the third wind turbine assembly station.
FIG. 18 shows a partial side view of the vessel of FIG. 14 with the nacelle being lowered on top of the upended mast at the first wind turbine assembly station.

FIG. 16 shows the nacelle 216 in the third wind turbine assembly station 215, ready to be lifted by the wind turbine installation crane 204. FIG. 17 shows the nacelle 216 lifted by the installation crane at the third wind turbine assembly station. FIG. 18 shows the nacelle 216 being lowered on top of the upended mast 235 at the first wind turbine assembly station 214.

Figures 19, 20:
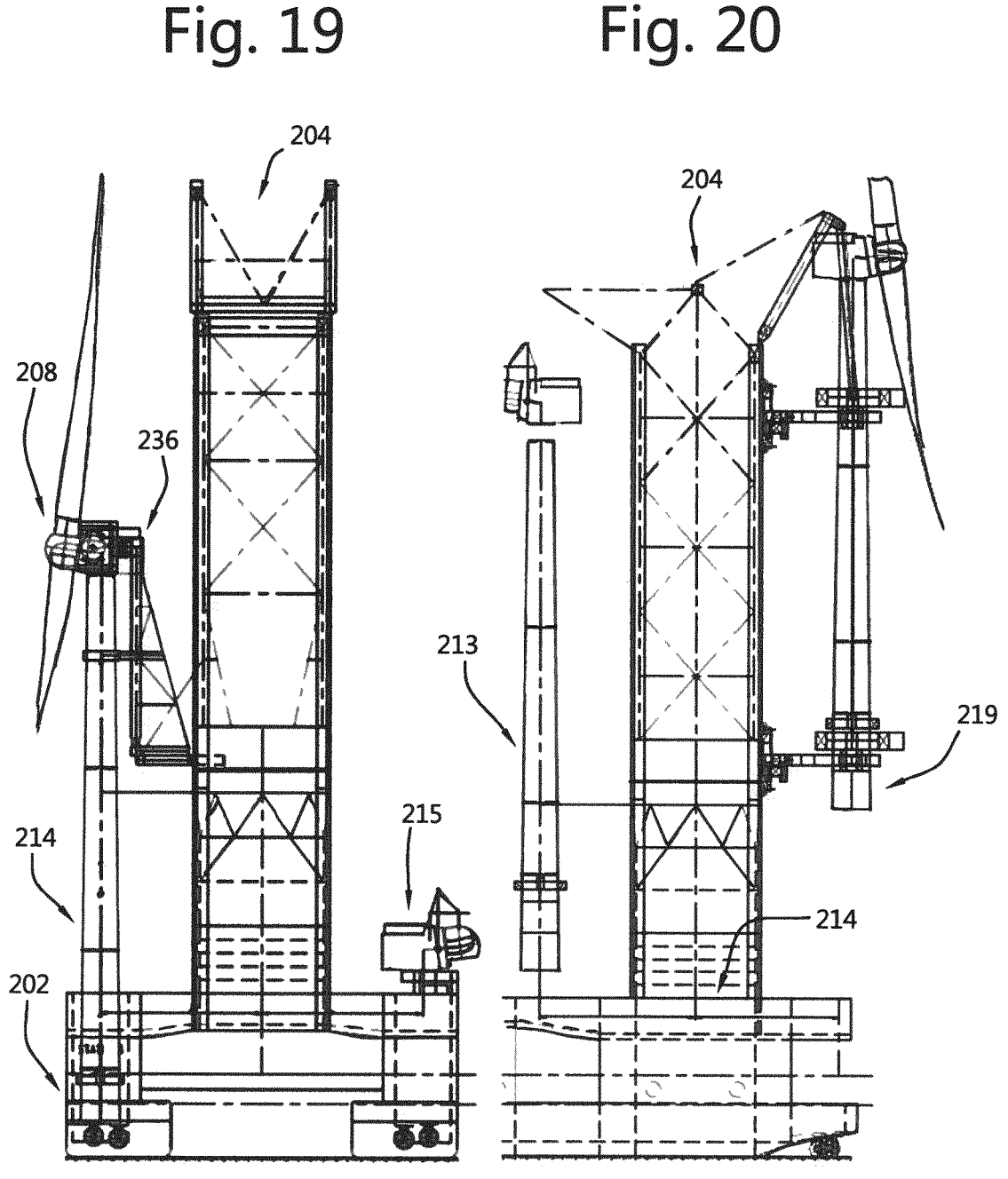
FIG. 19 shows a frontal view of the vessel of FIG. 14 with the mast and nacelle of FIG. 20 being fitted with blades at a second wind turbine assembly station.
FIG. 20 shows a side view of the vessel of FIG. 14 with the installation crane supporting a assembled wind turbine, the assembled wind turbine comprising the mast and nacelle of FIG. 20 fitted with blades, being supported by the installation crane.

The method furthermore comprises the assembly steps of arranging the mast 235 and the nacelle 216 mounted on top of the mast from the first wind turbine assembly station 213, shown in FIG. 18, to the second wind turbine assembly station 214, shown in FIG. 19, using the installation crane 204.

The method further comprises the assembly step of completing the assembly of the wind turbine 208 by mounting the blades 211 to the nacelle 216 at the second assembly station 214.

In the preferred embodiment shown, a blade handling apparatus 236 is used for mounting the blades. In the particular embodiment shown, the blade handling apparatus comprises a gripper section for engaging and supporting a blade, and a base with which the blade handling apparatus is mounted to the vessel, in the embodiment shown to the wind turbine installation crane that is mounted to the vessel. The blade handling apparatus further comprises an arm between the base and the gripper section.

The blades mounting process comprising the steps lifting a first blade into a fastening position adjacent the nacelle, mounting the first blade to the nacelle, and rotating the nacelle into a successive installation position, lifting a second blade into a fastening position adjacent the nacelle, mounting the second blade to the nacelle, and rotating the nacelle into a successive installation position; and lifting a third blade into a fastening position adjacent the nacelle, and mounting the third blade to the nacelle.

In the preferred method shown, see FIG. 24, the nacelle 216 is positioned, more in particular is rotated about a vertical pivot axis, in a position for mounting to the nacelle a blade 211*a* supported in a vertical position above the deck, while a blade 211*b* already mounted to the nacelle is supported mainly vertically above the sea, i.e. is supported mainly outside ca contour of the vessel when seen in top view.

Once the assembly process is completed by mounting the blades to the nacelle, the assembled wind turbine is picked up by the wind turbine installation crane and can be lowered onto a foundation at the installation side of the installation crane. As an alternative, the assembled wind turbine can be stored in the third assembly station, for example while the vessel is moved to the foundation on which the wind turbine is to be installed. Temporarily storage of the wind turbine at the third wind turbine assembly station also allows for assembly of another wind turbine, and thus for having two assembled wind turbines ready for being installed.

The method further comprises the wind turbine installation crane, after supporting the assembled wind turbine at the second wind turbine assembly station, arranging the assembled wind turbine from the second wind turbine assembly station into the mounting position, above a wind turbine foundation adjacent the vessel, at the installation side of the installation crane. This is shown in FIG. 20. Subsequently, the installation crane is used for lowering the assembled wind turbine onto the foundation.

Figures 21, 22, 23:
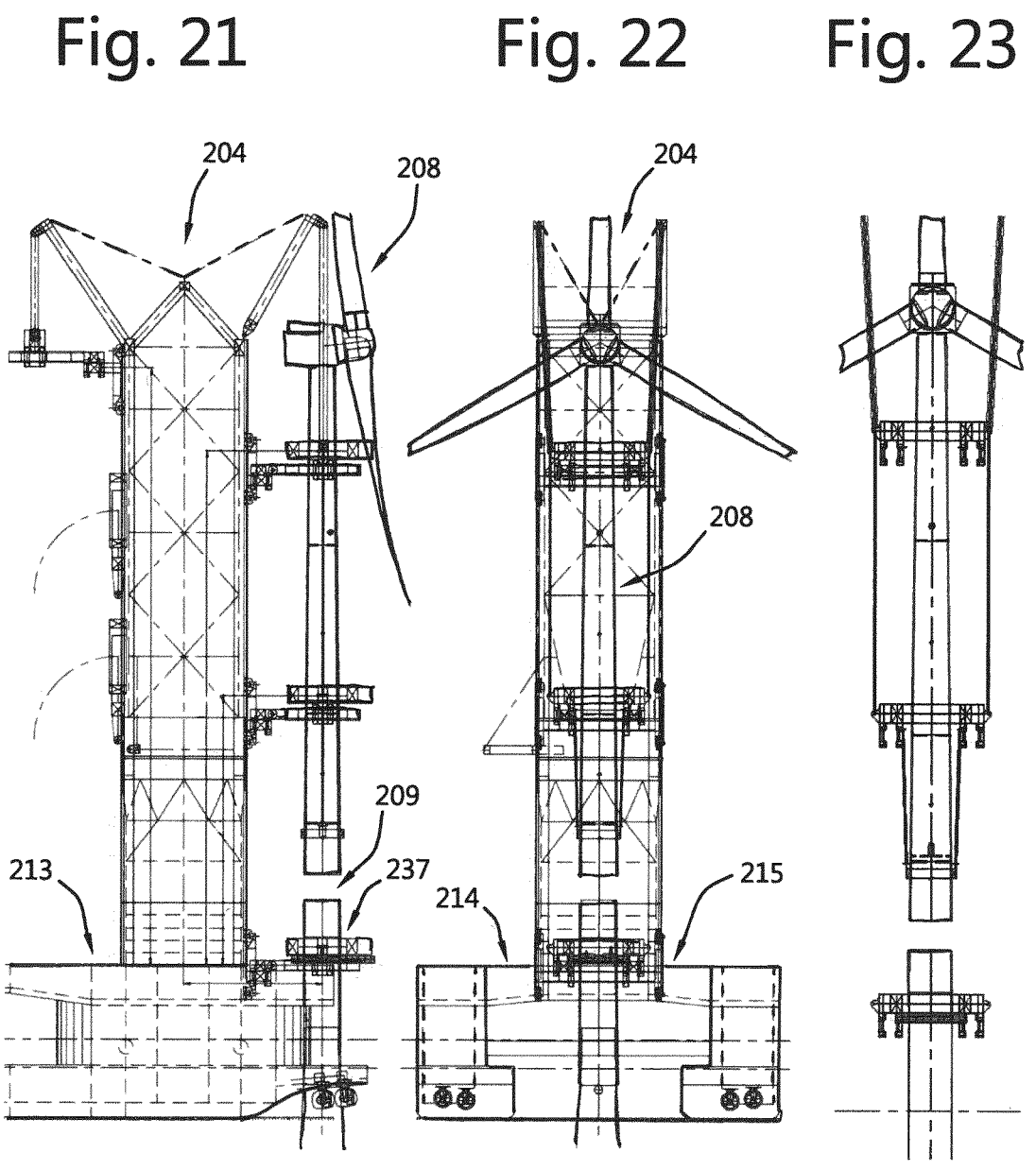
FIG. 21 shows a partial side view of vessel according to the invention with a wind turbine installation crane supporting an assembled wind turbine above a foundation
FIG. 22 shows a frontal view of the vessel of the vessel of FIG. 21 supporting the wind turbine.
FIG. 23 shows in isolation three trolleys of the wind turbine installation crane of FIG. 21

In a preferred method for mounting a wind turbine on a floating foundation according to the invention, the method comprises, prior to lowering the assembled wind turbine onto the floating foundation, engaging the floating foundation with a foundation restraint system, wherein the foundation restraint system is configured to reduce movement of the floating foundation relative to the vessel, more in particular relative to the assembled wind turbine to be mounted on the floating foundation and/or to monitor the movement of the floating foundation relative to the to the vessel, more in particular relative to the assembled wind turbine to be mounted on the floating foundation. FIG. 21 shows an wind turbine installation crane 204 supporting an assembled wind turbine 208 above a floating foundation 209. The vessel is provided with a foundation restraint system 237 engaging the floating foundation 209.

In the preferred embodiment shown, the installation crane is mounted on a catamaran type hull, or semi-submersible, and the installation crane is mounted on part of the deck that bridges the distance between the two hulls of the catamaran. Furthermore, the installation crane is mounted between the two hulls of the catamaran such that these two hulls extend on opposite sides of an installation location at the installation side of the crane. Thus, in the particular embodiment shown, when an assembled wind turbine is lowered onto, or is lifted from, a floating foundation, that floating foundation is partially located between the two hulls of the catamaran.

Figure 27:
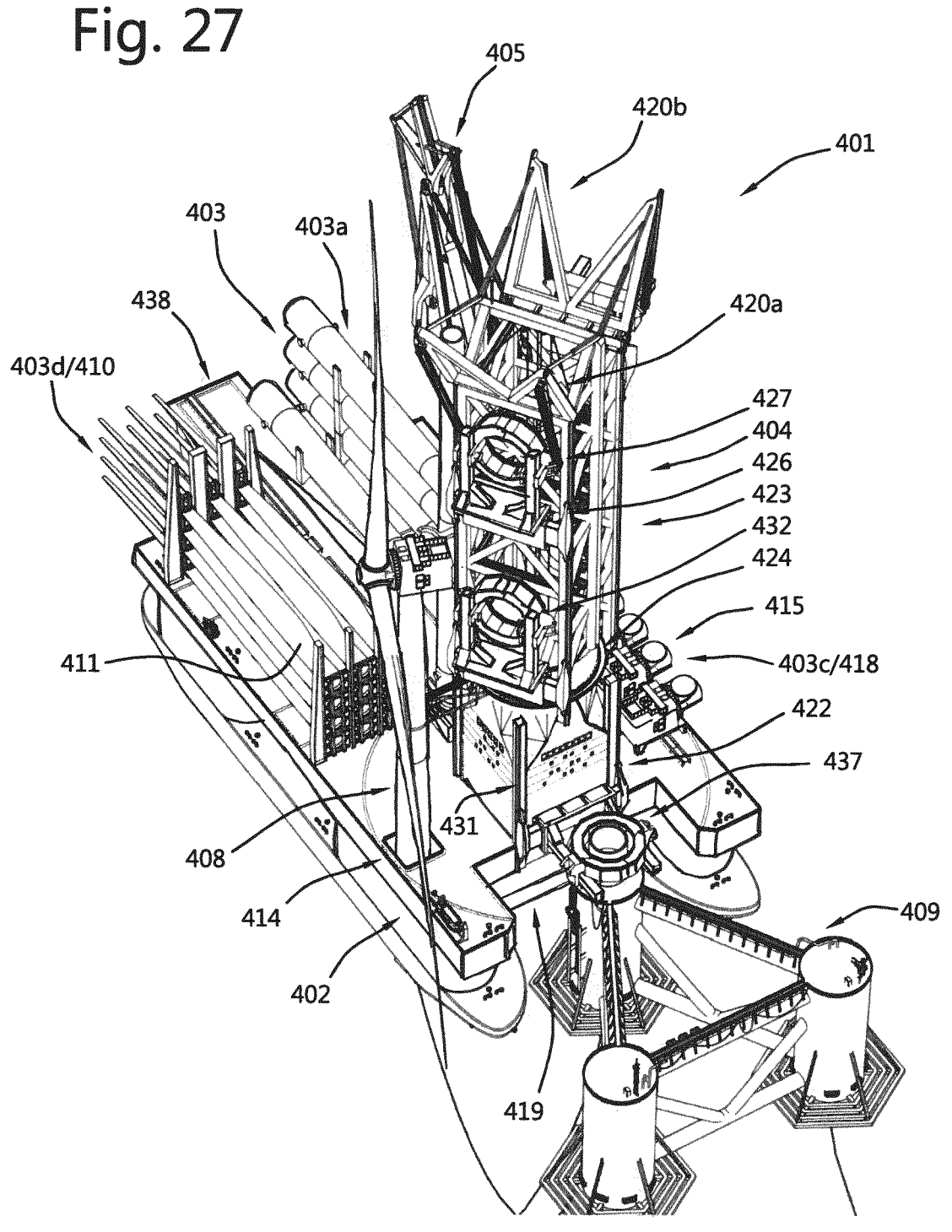
FIG. 27 shows an exemplary embodiment of a wind turbine assembly and installation vessel according to the invention, the vessel comprising an installation crane having a first hoisting device comprising two trolleys for hoisting an assembled wind turbine and a second hoisting device for hoisting a nacelle.

FIG. 27 shows another exemplary embodiment of a wind turbine assembly vessel 401 according to the invention. The vessel 401 is similar to the vessel 101 shown in FIG. 1, and also to the vessel shown in FIG. 14 and the vessel shown in FIG. 25.

The vessel 401 is positioned along a floating foundation 409. More in particular, the vessel is positioned with the bow of the vessel facing the floating foundation, such that the installation crane can support an assembled wind turbine at the installation side of the crane in a mounting position above the foundation and lower the wind turbine onto the foundation.

In the embodiment shown the floating foundation 409 comprises three stabilizing columns interconnected by beams in a triangular arrangement, when seen from above. One of the stabilizing columns of the floating foundation is embodied with a mast mounting structure configured to mount the mast of the wind turbine thereon.

The floating foundation, e.g. each buoyant column thereof, is provided with ballast tanks for containing a ballast, e.g. a ballast liquid, e.g. ballast water. In an embodiment, a ballast control system is provided which is configured for moving the ballast liquid between ballast tanks, e.g. of the at least three stabilizing columns, to adjust a vertical orientation of the upwardly directed mounting axis. Also, the floating foundation comprises water-entrapment plates, wherein the plates are attached to a lower end of the stabilizing columns.

The wind turbine assembly vessel 401 comprises a floating hull 402, a wind turbine components storage deck 403, an installation crane 404 and a handling crane 405.

In the embodiment shown, the vessel 401 is of the type known as semi-submersible vessel with a pair of substantially parallel, laterally spaced buoyant pontoons, e.g. with water ballast tanks to permit said pontoons to be moved between a submerged condition and a surface floating condition, and with a row of multiple columns supported by and extending upwardly from each pontoon, and a deck structure supported by the upper ends of said columns. The crane is mounted on the deck structure of the hull.

The semi-submersible vessel 401 has a bow and a stern, and the crane is mounted at the bow, e.g. on the deck structure between the two pontoons (seen from above), e.g. the deck structure having a bow end that is located aft of the bow of the pontoons.

The handling crane 405 is provided adjacent a side of the hull of the vessel 401 as well. In the embodiment shown, the handling crane is located adjacent the larboard side, also referred to as port side, of the vessel.

In the embodiment shown, the bridge of the vessel and crew quarters are comprised in the installation crane 404. Incorporating the bridge and the crew quarters in the crane allows for providing the vessel with a deck that covers the almost the entire vessel.

In the embodiment shown, the vessel is provided with the handling crane and the installation crane, which are both mounted on the hull of the vessel, and extend from the deck upwards. The deck is free of any other major structures that extend above the deck. Thus the deck is free for storage and movement of wind turbine components along the deck, and for providing assembly stations adjacent the installation crane.

A major part of the deck of the vessel is the wind turbine components storage deck 403, which wind turbine components storage deck comprises distinct storage areas for distinct wind turbine components. In the particular embodiment shown, the wind turbine components storage deck 403 comprises mast storage area 403*a*, a nacelles storage area 403*c*, and a blades storage area 403*d*.

The vessel 401 carries multiple wind turbine masts at the mast storage area 403*a*. In contrast with the vessel 101 shown in FIG. 1, the wind turbine masts are full length wind turbine masts. The vessel 101 shown in FIG. 1 carries lower mast parts and an upper mast parts to be combined in a full length wind turbine mast. Furthermore, the vessel 401 carries the wind turbine masts in a horizontal storage position. The horizontal storage position provided the vessel with a low center of gravity, compared to transporting the masts in an upright position. The horizontal transport position makes that the masts have to be up-ended to enable assembly of a wind turbine. In the embodiment shown, the installation crane, and the deck of the vessel, are configured for upending wind turbine masts, and thus enable the horizontal transport position.

For upending, a mast is positioned with its top end at the first assembly station, and with its lowered end on a cart. At the first assembly station a trolley on a trolley track at the base section of the crane is lowered towards the deck of the vessel, such that the trolley can be hingeably coupled with the top end of the mast. Subsequently, the trolly is lifted, away form the deck and onto the trolley track on the top section of the crane. Thus, the top end of the mast is lifted, while the bottom end of the mast moves with the cart towards the base section of the crane. Thus, the mast is upended, i.e. is pivoted form a horizontal position into a vertical position.

The blades storage area 403*d* is provided at an opposite side of the vessel 401 of the mast storage area 403*a*. The nacelles storage area 403*c* is provided more or less adjacent the installation crane 404.

In the preferred embodiment of the wind turbine installation vessel 401, the reach of the handling crane 405 is such that that the installation crane can lift and lower wind turbine components, e.g. blades or nacelles, stored on the wind turbine storage deck 403.

The wind turbine assembly and installation vessel 401 further comprises a first assembly station 413, a second assembly station 414 and a third assembly station 415.

The first assembly station is located on a first side of the installation crane, the second assembly station is located on a second side of the installation crane, the third assembly station is located on a third side of the installation crane, and the installation side is on a fourth side of the crane and at the bow of the vessel.

The first wind turbine assembly station 413 is located opposite the installation side 419 of the installation crane 404. The second wind turbine assembly station 414 is located opposite the third wind turbine assembly station 415.

It is noted that, similar to the vessel 201 shown in for example FIG. 19, the third assembly station 415 is configured for the storage of nacelles. Therefore, in the embodiment shown, the installation crane 404 is effectively provided with two assembly stations, being the first assembly station 413 for mounting the nacelle on the mast of the wind turbine, and the second assembly station 414 for mounting the blades to the nacelle.

From here on, the first assembly station will also be referred to as the nacelle installation station 413, the second assembly station will also be referred to as the blade installation station 414, and the third assembly station will also be referred to as the nacelle pickup station 415.

It is noted that, in the particular embodiment shown, the wind turbine installation crane 204 is a two sided crane, having a first hoisting device 420*a* and a second hoisting device 420*b* on an opposite side of the crane. See for example FIG. 28. Providing the crane with hoisting devices on opposite sides thereof enables the crane to perform hoisting actions simultaneously on opposite sides of the crane. For example, lifting a nacelle at the nacelle pickup station 415 while at the same time lifting or lowering a wind turbine mast with nacelle at the blade installation station 414, or lowering a nacelle onto the wind turbine mast at the nacelle installation station 413 while at the same time supporting an assembled wind turbine above a foundation at the installation side 419 of the vessel.

In the embodiment shown in FIG. 27, the installation crane is provided with a first hoisting device for hoisting and installing assembled wind turbines, in particular for hoisting and supporting the mast of a wind turbine, and a second hoisting device configured for hoisting wind turbine components, in particular nacelles, and for upending piles. See for example FIG. 31.

Similar to the installation cranes shown in the other figures, the installation crane 404 has a base section 422 and a top section 423. The top section 423 is rotatable supported by a bearing 424, which bearing is supported by the base section 422. Thus, the top section 243, including the two hoisting devices, can be rotated relative to the base section 422 about a vertical axis, and the crane can thus with the hoisting devices transfer at least wind turbine components, or assembled wind turbines, between the assembly stations and the installation side.

In the embodiment shown, the base part section 422 of the crane is a closed construction, housing the bridge and crew quarters, and the top section 423 is an open, truss construction.

In the embodiment shown, the wind turbine installation crane 204 is a two sided crane, having two hoisting devices 420*a*,420*b* located on opposite sides of the crane. The hoisting devices 420 each comprise at least one hoisting winch 439 with an associated hoisting wire 440, a trolley 441, e.g. a wind turbine support trolley, that is supported by the hoisting wire, and trolley guide 442 that guides the trolley in a vertical direction along the crane.

In the exemplary embodiments shown in the figures, the trolley guide comprises a first trolley guide 426, mounted to the top section 423 of the installation crane, and a second trolley guide 431, mounted to the base section 422 of the installation crane. Thus, the trolley 441 of the hoisting device can move along both the top section and the base section of the crane. More in particular, the second trolley guide 431 enables for the trolley to be lowered close to the deck, or close to a foundation onto which the wind turbine is to be installed, while the first trolley guide 426 enables the trolley to be rotated with the top section 432 of the crane.

Thus, FIG. 27 shows a wind turbine assembly and installation vessel 401 according to the invention, the wind turbine assembly and installation vessel comprising:

a floating hull 402;

a wind turbine components storage deck 403, for storing components of a wind turbine, e.g. a mast 435, a nacelle 416, and blades 411;

a handling crane 405 for hoisting the components of a wind turbine stored on the wind turbine component storage deck 403;

an installation crane 404, wherein the installation crane has a first side, a second side, a third side located opposite the second side, and a fourth side located opposite the first side, the fourth side being an installation side 419, and wherein the installation crane 404 is configured for supporting an assembled wind turbine 408 at the installation side 419 in a mounting position above a foundation 409 and for lowering the assembled wind turbine 408 onto the foundation 409, a first assembly station 413, or nacelle installation station, for mounting a nacelle 416 on the wind turbine mast 435 or wind turbine mast section, and a second assembly station 414, or blade installation station, for mounting wind turbine blades 411 to the nacelle 416 mounted on the wind turbine mast 435 or wind turbine mast section, wherein the first assembly station 413 is located on the first side of the installation crane 404, the second assembly station 414 is located on the second side of the installation crane 404, and the installation side 419 is located on the fourth side of the installation crane 404, wherein the installation crane 404 has a hoisting device 420, the hoisting device 420 comprising at least one hoisting winch 439 with an associated hoisting wire 440, at least one trolley 441, e.g. a first wind turbine support trolley 427, that is supported by the hoisting wire 440 for supporting the mast 435 or mast section of the wind turbine, and a trolley guide 442 for guiding the trolley 441 in a vertical direction along the installation crane 404, and wherein the trolley 441 is configured to engage the mast 435 or mast section of the wind turbine between a bottom end and a top end of the mast 435 or mast section, to support the mast 435 or mast section in a lateral direction, wherein the installation crane 404 has a base section 422 and a top section 423, wherein the top section 423 is rotatable supported by a bearing 424, which bearing 424 is supported by the base section 422, and the top section 423 can thus with the hoisting device 420 be rotated relative to the base section 422 about a vertical axis, and wherein the trolley guide 442 comprises a first trolley guide 426, or top trolley guide, mounted to the top section 423 of the installation crane 404, and at least one second trolley guide 431, or base trolley guide, mounted to the base section 422 of the installation crane 404 at one of the first assembly side, the second assembly side or the installation side, preferably has a second trolley guide 431 mounted to the base section 422 of the installation crane 404 at each of the first assembly side, the second assembly side and the installation side, and the trolley 427 of the hoisting device 420 can thus move along both the top section 423 and the base section 422 of the installation crane 404 at at least one assembly station, preferably at each assembly station and at the installation side.

The wind turbine assembly vessel 401 enables a method for assembly and installation of a wind turbine according to the invention. The method for example comprising:

storing wind turbine components, in the embodiment shown a mast 435, a nacelle 416, and blades 411 on the wind turbine components storage deck 403;

arranging the mast 435 of the wind turbine into the first assembly station 413, preferably using the wind turbine installation crane 404, and supporting the mast 435 in an upright installation position, optionally preceded by: upending, preferably using the wind turbine installation crane 404, the mast 435 of the wind turbine from a horizontal storage position into an upright installation position;

lifting the nacelle 416 and hoisting the nacelle 416 on the mast 435 in the first assembly station 413, preferably using the wind turbine installation crane 404, and mounting the nacelle 416 on the mast 435;

arranging the combined mast 435 and nacelle 416 from the first assembly station 413 to the second assembly station 414, using the installation crane 404, and supporting the mast 435 in an upright installation position preferably with the nacelle 416, in particular a hub of the nacelle 416, in an installation position for mounting a blade 411 to the nacelle 416;

mounting the blades 411 to the nacelle 416, preferably using a blade handling apparatus, to provide an assembled wind turbine 408, the blades mounting process comprising;

lifting a first blade into a fastening position adjacent the nacelle 416, preferably using the blade handling apparatus, mounting the first blade to the nacelle 416, and rotating the nacelle 416, in particular a hub of the nacelle 416, into a successive installation position, lifting a second blade into a fastening position adjacent the nacelle 416, preferably using the blade handling apparatus, mounting the second blade to the nacelle 416, and rotating the nacelle, in particular a hub of the nacelle 416, into a successive installation position 416; and lifting a third blade into a fastening position adjacent the nacelle 416, preferably using the blade handling apparatus, and mounting the third blade to the nacelle 416;

arranging the assembled wind turbine 408 from the second assembly station 414 into the mounting position at the fourth side, o installation side 419, of the installation crane 404; and lowering the assembled wind turbine 408 onto a foundation 409, using the installation crane 404.

In this method, arranging the combined mast and nacelle from the first assembly station to the second assembly station comprises lifting the combined mast and nacelle at the first assembly station and lowering the combined mats and nacelle at the second assembly station using a hoisting device of the installation crane, and rotating the top section of the installation crane relative to the base section of the installation crane to move the combined mast and nacelle from the first assembly station to the second assembly station.

Furthermore, in this method, arranging the assembled wind turbine from the second assembly station into the mounting position at the fourth side of the installation crane comprises lifting the assembled wind turbine at the second assembly station using a hoisting device of the installation crane, and rotating the top section of the installation crane relative to the base section of the installation crane to move the assembled wind turbine from the second assembly station to the installation side of the installation crane.

The installation crane 404 is provided adjacent a side of the hull of the vessel 401, in the embodiment shown the front side of the vessel. The installation crane 404 has an installation side at the bow of the vessel. The installation crane 404 is configured for supporting an assembled wind turbine at its installation side in a mounting position above a foundation and is configured for lowering the wind turbine onto the foundation. The foundation can be a foundation mounted on the sea floor, or can be a floating foundation.

The installation crane 404 has a vertical crane structure erected on the hull of the vessel 401. The vertical crane structure comprise the base section 422 and the top section 423 of the installation crane. The vertical crane structure has the base section of the crane structure fixed on the hull and the slewable top section of the crane structure, wherein the hoisting device comprises one or more winch drive cables depending from one or more sheave blocks arranged on the slewable top section, e.g. on a pivotal jib of the slewable top section. The slewing of the top section, can be used to pick-up an assembled wind turbine from a deck of the vessel by means of the hoisting device and to bring the wind turbine with its mast above the mast mounting structure of the floating foundation.

The vertical crane structure comprises pivotal jibs 535 for each of the first wind turbine hoisting device 420*a* and the second wind turbine hoisting device 420*b*. In the embodiment shown, the hoisting jibs are provided at opposite sides and at the top of the crane structure, such that the form a W. The hoisting wire depends from sheave blocks arranged on the respective pivotal jib.

The installation crane is provided with the first wind turbine installation trolley 427, or upper wind turbine installation trolley, and the second wind turbine installation trolley 432, or lower wind turbine installation trolley. The trolleys each support a mast engagement device 428, 432 as well as an active controlled motion mechanism, or active horizontal motion device 428, 434, configured and operated to provide a controlled motion of the respective mast engagement device in a horizontal plane so as to bring and maintain the mast of the suspended wind turbine in alignment with the mounting axis of the floating foundation. The mast engaging devices are configured to actively force the suspended wind turbine out of its plumb line orientation and into alignment with the mounting axis, i.e. the axis at which the mast is aligned with the foundation.

Providing the crane with the first wind turbine installation trolley 427, or upper wind turbine installation trolley, and the second wind turbine installation trolley 432, or lower wind turbine installation trolley enables for the mast engagement device of the respective upper and lower wind turbine installation trolley to act on the mast of the supported wind turbine at different heights, e.g. the lower one below the centre of gravity of the wind turbine to be installed and the upper one above said centre of gravity. While mounting the assembled wind turbine on the foundation, the active controlled horizontal motion devices 429, 434 are operated to bring and maintain the mast 435 of the suspended wind turbine in alignment with the mounting axis of the floating foundation. For example, the upper and lower mast engaging device are at least 20 meters apart in vertical direction.

In the embodiment shown, the active controlled horizontal motion devices 428, 434 each comprise a first set of horizontal tracks extending in a first horizontal direction, said first set supporting a first carrier, and said first carriers supporting a second set of one or more horizontal tracks extending in a second horizontal direction different from the first direction, e.g. the first and second direction being orthogonal directions. The second set of horizontal tracks supports further second carriers supporting said mast engagement device.

Figure 29:
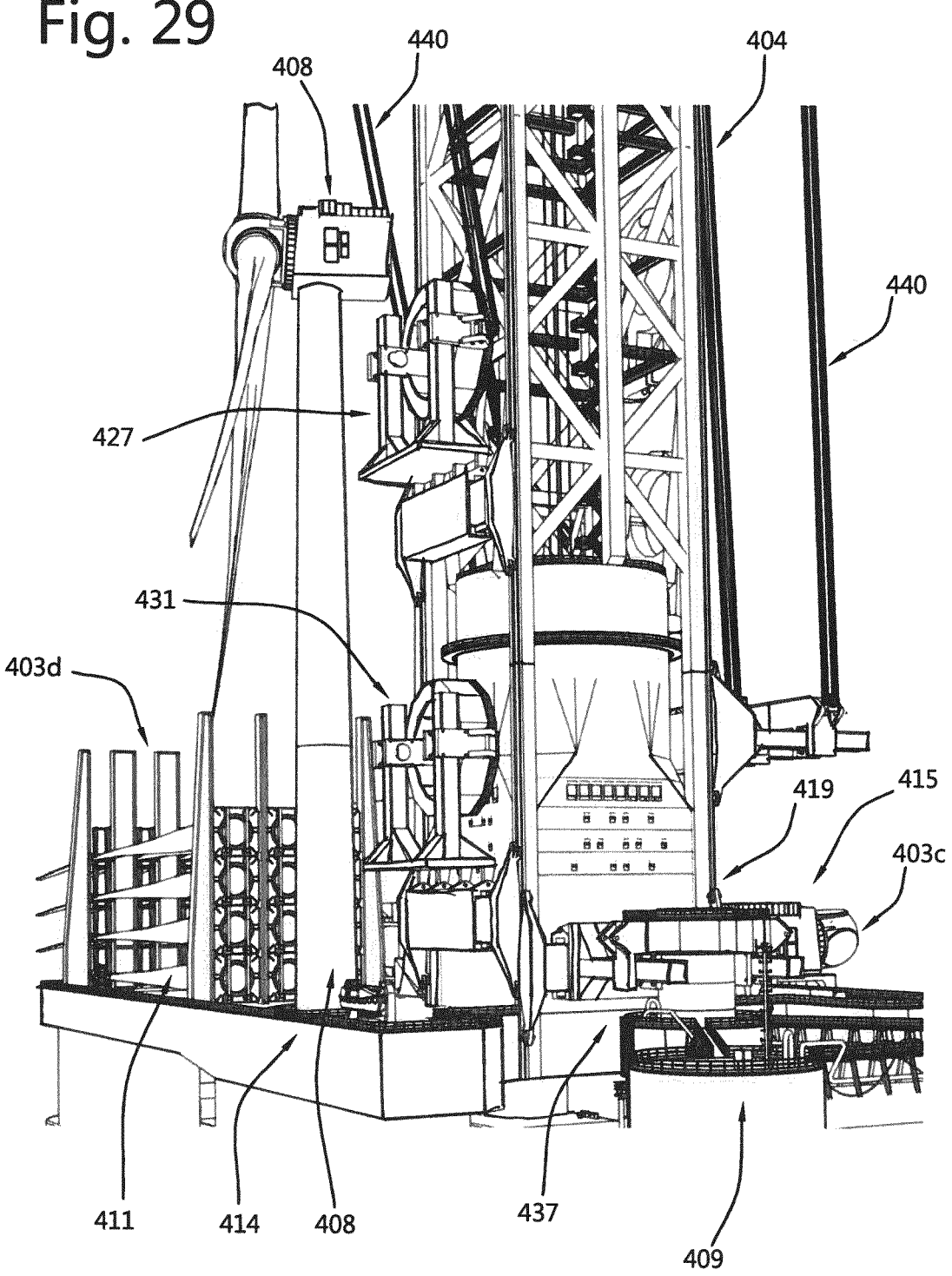
FIG. 29 shows the vessel of FIG. 27 with the two trolleys of the hoisting device lowered in a position for engaging the assembled wind turbine.
Figure 30:
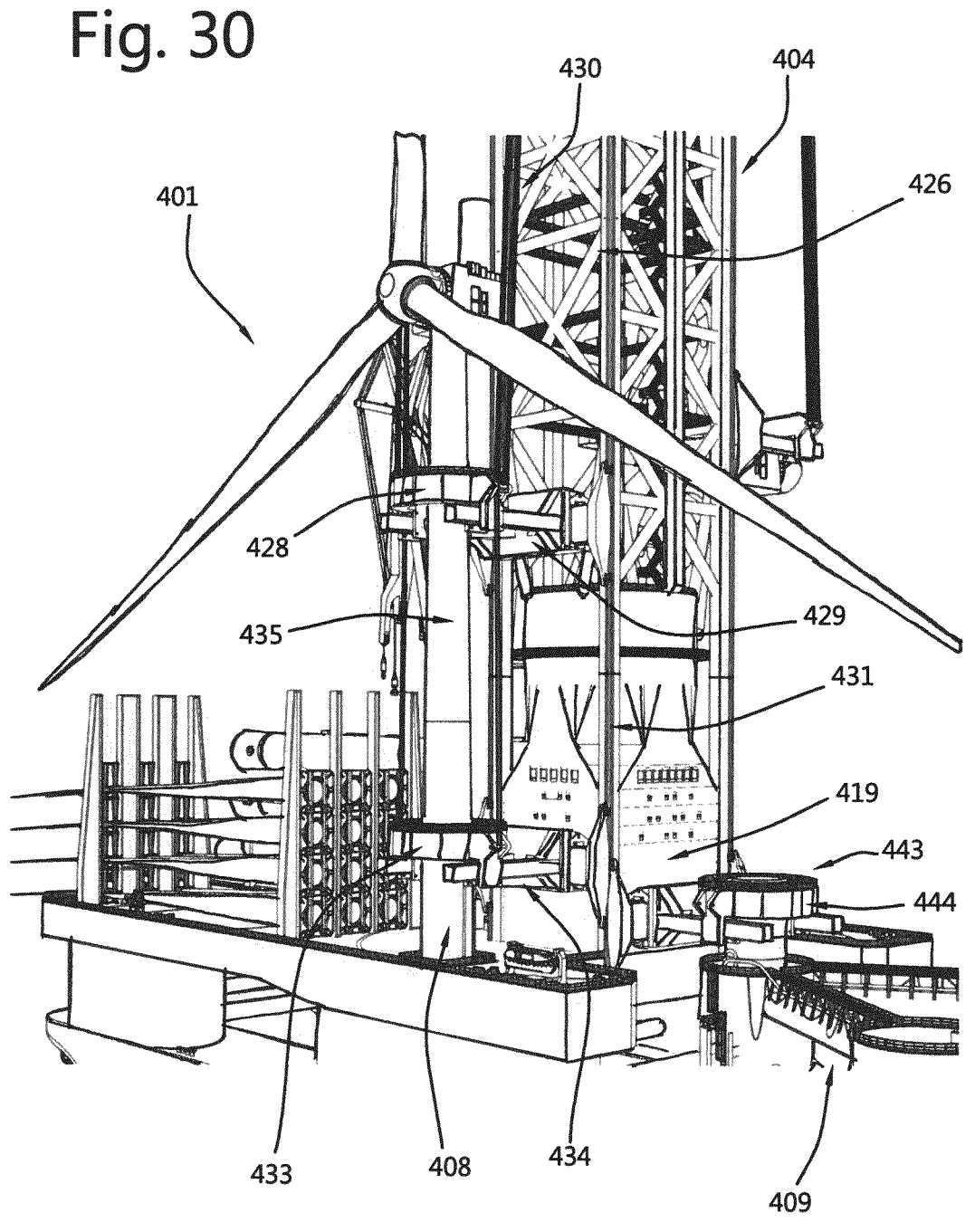
FIG. 30 shows the vessel of FIG. 27 with the two trolleys of the hoisting device engaging the assembled wind turbine.

In the embodiment shown in for example FIG. 29 and FIG. 30, the trolleys comprise two support arms, the support arms supporting a ring for engaging the mast of the wind turbine. The ring is moveably supported by the arms, such that it can move along the arms in a first direction towards and away from the crane. The arms are each mounted on a base, which base is movable supported on a cross beam of the trolley. Thus, the base can be moved in a direction perpendicular to the arms, and thus move the arms and ring in a second direction that is perpendicular to the first direction.

Furthermore, in the embodiment shown, the arms are pivotable relative to the base, such that the ring of the trolley can be hinged between a passive position, shown in FIG. 29 and an active position shown in FIG. 30.

Furthermore, the active controlled horizontal motion device comprises horizontal displacement actuators, e.g. hydraulic cylinders or assemblies of one or more cables and associated (electric) winches, or rack and pinion drive devices.

In the embodiment shown in FIG. 231, the assembled wind turbine 408 is received in the upper wind turbine installation trolley 427 and the lower wind turbine installation trolley 432. The upper wind turbine installation trolley 427 is supported via upper trolley suspension elements 130, in the embodiment shown the hoisting wire 440 of the hoisting winch 439. The lower wind turbine installation trolley 432 is supported via lower trolley suspension elements, in the embodiment shown trolley suspension cables 446, by the upper wind turbine installation trolley. The assembled wind turbine is supported via wind turbine suspension elements, in the embodiment shown wind turbine suspension cables 447, which are connected to the mast engagement device of the lower wind turbine support trolley.

The wind turbine suspension cables extend between an attachment member fitted, e.g. temporarily fitted, on the wind turbine mast at a height below the upper mast engaging device.

The installation crane is provided with first and second upper sheave blocks that are horizontally spaced apart, and the upper wind turbine support trolley is provided with first and second lower sheave blocks that are horizontally spaced apart. A first multiple fall cable arrangement of hoisting wire extends the between the first upper and lower sheave blocks and a second multiple fall cable arrangement of hoisting wire extends between the second upper and lower sheave blocks. This configuration is such that in use, the nacelle and one blade of the wind turbine that is directed upward are located between multiple fall cable arrangements without these cable arrangement coming into contact with any of the blades and the nacelle.

It is noted that, in the particular embodiment shown, the wind turbine installation crane 204 is a two sided crane, having a first hoisting device 420*a* and a second hoisting device 420*b* on an opposite side of the crane.

In the embodiment shown the first hoisting device is adapted to support and to raise and lower in a controllable manner an assembled wind turbine, the assembled wind turbine comprising a mast combined with the nacelle and the blades fitted. Therefore, the first hoisting device is provided with the first wind turbine installation trolley 427, or upper wind turbine installation trolley, and the second wind turbine installation trolley 432, or lower wind turbine installation trolley In the embodiment shown, the second hoisting device is configured for hoisting a nacelle, more in particular for lifting a nacelle located at the third assembly station, or nacelle storage location, and for lowering the nacelle on top of a mast set up in the first wind turbine assembly station. The hoisting device is furthermore configured for upending a wind turbine mast, or a pile. The second hoisting device is therefore, in the embodiment shown, provided with a trolley that is configured to engage a nacelle, and that can also be configured for pivotably engaging the top end of a pile or mast.

FIG. 25 shows the second hoisting device 420*b* being used for upending a pile 448, while the first hoisting device 420*a* supports a hammer 449 driving another pile into the seafloor for providing a foundation for a wind turbine. In the embodiment shown, the vessel is adapted for upending piles, lowering piles towards the sea floor, and riving piles into the sea floor. The piles are stored on the deck for shipment for example from a pile factory located on shore, to a wind farm. Once the vessel has arrived at the wind farm, the piles can be upended, such that they can be engaged by the crane and can be lowered into the sea. In the embodiment sown, the vessel is provided with temporarily pile set up positions on opposite sides, and adjacent to, the installation crane. Thus, after upending and prior to being lowered into the sea, the piles can be setup adjacent the installation crane. In the embodiment shown, two piles are set up adjacent the installation crane.

In the embodiment shown, the vessel 401 is provided with a tail-deck 438, extending in line with the installation crane 404. The tail deck 438 is provided to enable the upending of a pile, or foundation piles, for mounting a wind turbine. These piles are of significant length, having a length larger than the length of wind turbine masts. To enable upending of the pile sections, the deck, including the tail deck, is provided with track for supporting an upend cart. During the upending process, the upend cart supports the bottom end of the pile, or mast, while the top end of the pile, or mast, is lifted by the installation crane. Thus, the bottom end of the pile, or mast, is guided along the deck, over the tracks, towards the installation crane.

It is submitted that the process of upending piles, lowering piles, and driving piles in the sea floor, can also be performed by an installation crane according to the invention having a single hoisting device.

To enable upending of the piles and wind turbine masts, the base section 422 of the installation crane is at the side of the deck, i.e. the side of the installation crane facing the first wind turbine assembly station, provided with a trolley guide for guiding the trolley, in particular a trolley for upending a mast or pile, along the crane in a vertical direction. The top section of the crane is provided with two first trolley guides or top trolley guides 426, one at each wind turbine hoisting device. In addition, the exemplary embodiment shown is provided with multiple second trolley guides, or base trolley guides 431, mounted to the base section 422 of the installation crane.

In the embodiment shown, the installation crane is furthermore provided with two pile engagement devices 451. The pile engagement devices are mounted to the top section of the installation crane, and are in alignment with the second hoisting device for engaging the a pile that is being upended using the second hoisting device. Pile engagement devices are provided to engage a pile that is upended, and to secure the pile in position while the pile is being moved by slewing of the top section. The pile engagement devices prevent swinging of the pile, in particular when rotation of the top section of the installation crane starts or stops. Also, they may prevent swing of the pile caused by movement of the vessel.

Figure 32:
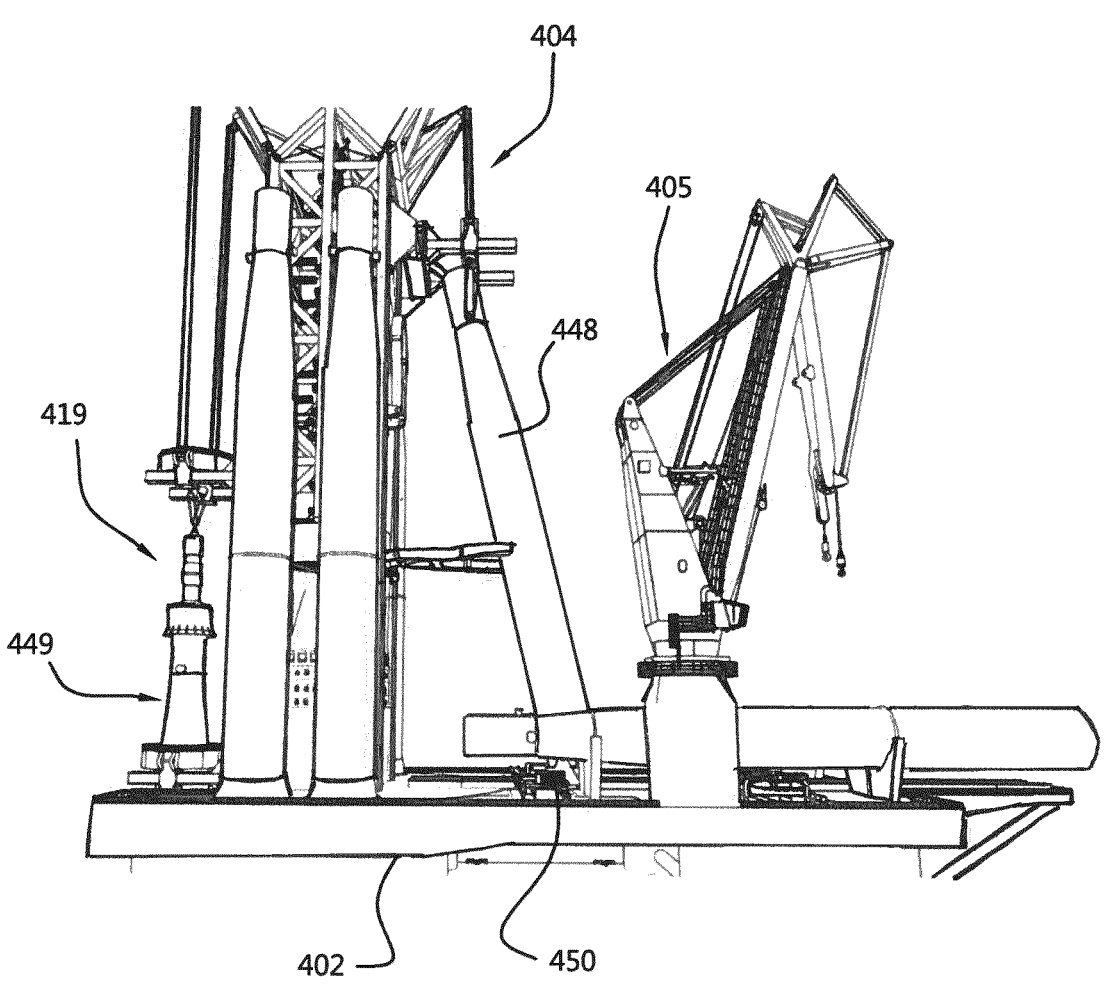
FIG. 32 shows the vessel of FIG. 27 during a pile upending process.

The pile engagement devices are mounted between two tracks of the trolley guide, and can be hinged between an inactive position, in which they are folded against the top section of the installation crane, to allow a trolley to pass along, and an active position, in which they extend outward form the top section of the installation crane for engaging a pile supported by the second wind turbine hoisting device. In FIG. 32, the lower of the two pile engagement devices is hinged into the active position, while the upper pile engagement device is still in the inactive position.

In the embodiment shown, the installation crane is provided with a base trolley guide at each side of the crane, thus at the first and second wind turbine assembly station, at the installation side of the installation crane and at the nacelle storage side of the installation crane. Thus, at all for sides, a trolley can be lowered along the base section of the crane.

Providing a base trolley guide at the first wind turbine assembly station, enables a trolley to be lowered close to the deck. This is beneficial for the upending process. Lowering a trolley close to the deck allows for coupling the trolley with a top end of the a mast or pile supported on the deck in a horizontal configuration, and thus enable upending of the pile using the installation crane.

Furthermore, to enable upending of the pile, the deck, in the embodiment shown including a tail deck, is provided with track for supporting an upend cart 450. During the upending process, the upend cart supports the bottom end of the pile, or mast, while the top end of the pile, or mast, is lifted by the installation crane. Thus, the bottom end of the pile, or mast, is guided along the deck, over the tracks, towards the installation crane.

Figure 28:
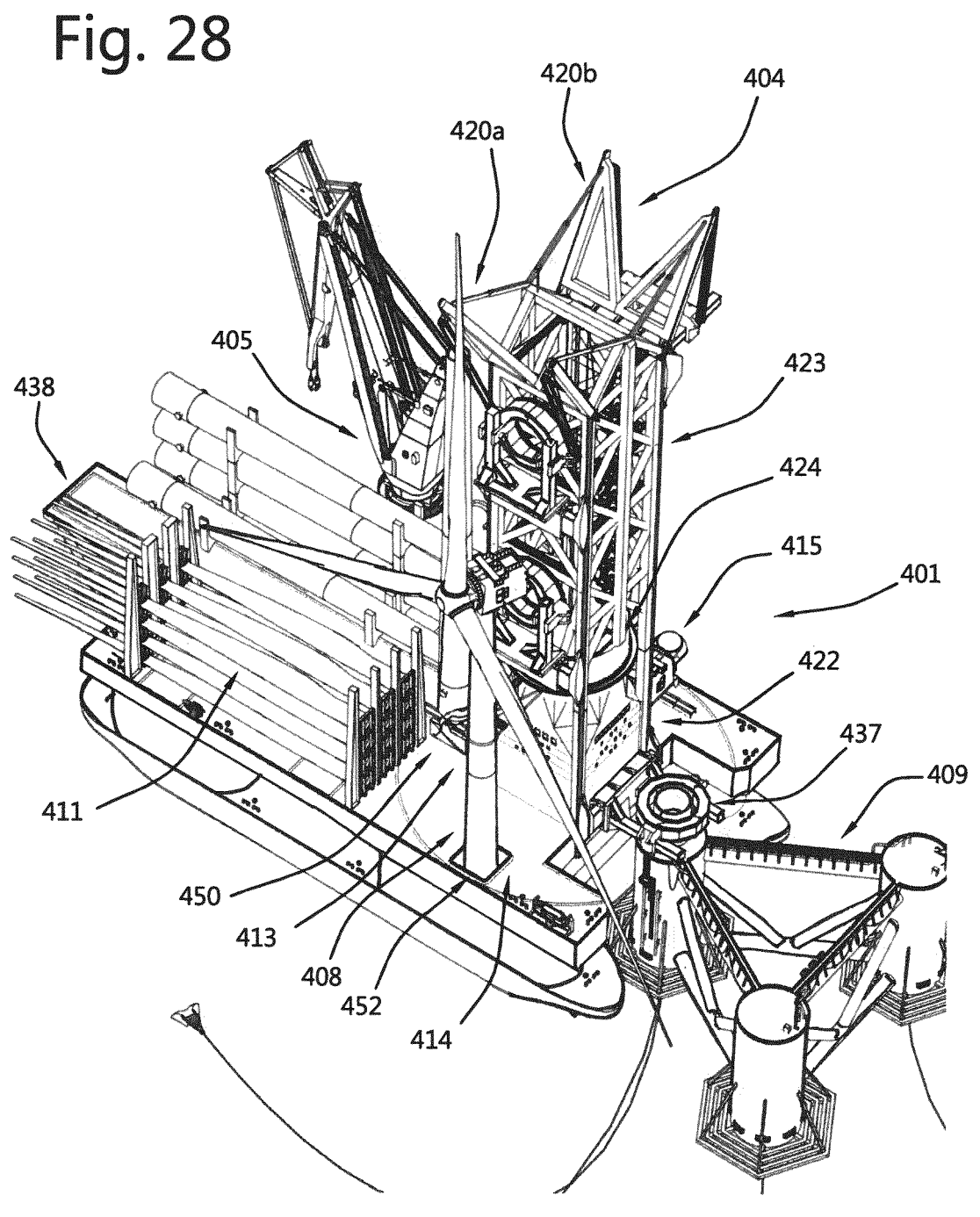
FIG. 28 shows the vessel of FIG. 27 with the hoisting device in a position facing an assembled wind turbine at a second assembly station.

It is submitted that the trolleys of the first hoisting device and the trolley of the second hoisting device can be arranged in an active position, for supporting the wind turbine or wind turbine component, and an inactive position, for moving along a mast or an upper mast part of the wind turbine supported by the wind turbine installation crane, e.g. at the at least one wind turbine assembly station. FIGS. 27-29 show the trolleys of the first hoisting device in the inactive position, while FIG. 30 shows the trolleys of the first hoisting device in the active position.

Figure 31:
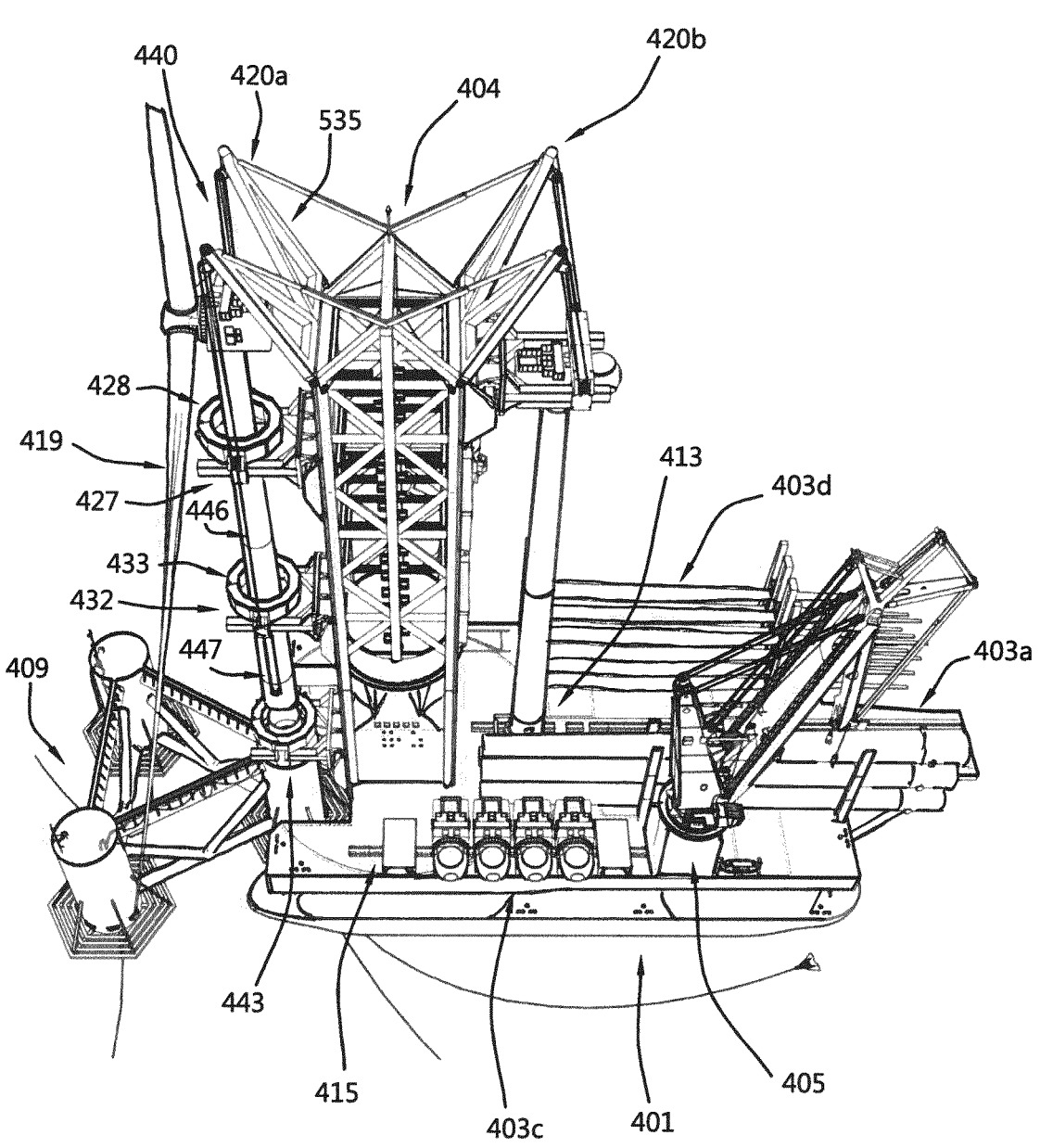
FIG. 31 shows the vessel of FIG. 27 with the hoisting device supporting the assembled wind turbine above a floating foundation.

In the particular embodiment shown, the wind turbine installation assembly and installation vessel 401 is provided with a foundation restraint system 445, located at the installation side of the installation crane 404, for engaging the foundation 409 and to enable alignment of the assembled wind turbine 408 supported by the installation crane 404, see for example FIG. 31, with the floating foundation. The restraining system is configured to restrain at least to some degree of motion of the mast mounting structure relative to the vessel in the horizontal plane.

In the embodiment shown the floating foundation 409 comprises three stabilizing columns interconnected by beams in a triangular arrangement, when seen from above. One of the stabilizing columns of the floating foundation is embodied with a mast mounting structure configured to mount the mast of the wind turbine thereon.

The floating foundation, e.g. each buoyant column thereof, is provided with ballast tanks for containing a ballast, e.g. a ballast liquid, e.g. ballast water. In an embodiment, a ballast control system is provided which is configured for moving the ballast liquid between ballast tanks, e.g. of the at least three stabilizing columns, to adjust a vertical orientation of the upwardly directed mounting axis. Also, the floating foundation comprises water-entrapment plates, wherein the plates are attached to a lower end of the stabilizing columns.

In the embodiment shown, the foundation restraint system 445 comprises a trolley guide or track mounted trolley 443, provided with an engagement member in the form of a gripper device 444, for engaging the mast mounting structure of the floating foundation. The foundation restraint system furthermore has an active controlled motion mechanism configured and operated to provide a controlled motion of the engagement member relative to the hull of the vessel and thereby a controlled restraining of the engaged floating foundation relative to the hull of the vessel. The active controlled motion mechanism is embodied to actively restrain the engaged floating foundation relative to the hull of the vessel in two non-parallel horizontal directions, e.g. in orthogonal horizontal directions.

The wind turbine assembly and installation vessel furthermore comprises an alignment system that comprises the foundation restraint system 445 and the first wind turbine installation trolley 427, or upper wind turbine installation trolley, and the second wind turbine installation trolley 432, or lower wind turbine installation trolley. The trolleys each support a mast engagement device 428, 432 as well as an active controlled motion mechanism, or active horizontal motion device 428, 434, configured and operated to provide a controlled motion of the respective mast engagement device in a horizontal plane so as to bring and maintain the mast of the suspended wind turbine in alignment with the mounting axis of the floating foundation. The mast engaging devices are configured to actively force the suspended wind turbine out of its plumb line orientation and into alignment with the mounting axis.

In an embodiment, use is made of one or more sensors for monitoring the motion in one or more directions of the mast mounting structure relative to the lower end portion of the mast floating foundation during installation. Preferably, these one or more sensors are linked to a controller, e.g. a computerized controller, that is configured and operated to cause automated operation of the heave compensation device and/or of the alignment system. For example, one or more sensors are embodied as camera's, radar, displacement sensors, etc.

For example, one or more of the motion monitoring sensors are combined with a restraining system as discussed herein.

For example, one or more motion monitoring sensors are configured to monitor tilting of the mast mounting structure relative to the hull of the vessel, e.g. relative to the restraining system.

In an embodiment, the restraining system comprises at least three mooring lines that secure the floating foundation to the vessel, e.g. to the bow of the vessel, said mooring lines extending in different directions, e.g. primarily in a horizontal plane. This, for example, allows for keeping a substantially fixed relative horizontal position of the vessel and the floating foundation. Preferably, the foundation is anchored to the seabed in this configuration.

In an embodiment, the vessel is anchored via multiple anchor lines to the seabed in addition to a part of the vessel being coupled to the anchored floating foundation via the restraining system. For example, the restraining system couples the bow of the vessel, e.g. the semi-submersible vessel, to the floating foundation (e.g. a stabilizing column thereof) and one or more anchors lines extend from the stern of the vessel during the installation.

In an embodiment the restraining system, e.g. also, comprises one or more tensioning line assemblies arranged on the vessel, each including one or more tensioning lines and one or more corresponding tension devices that provide controlled tension to these tensioning lines, said tensioning lines being connected to the floating foundation and the tensioning line assemblies being configured and operated to tension said one or more lines and thereby restrain the floating foundation primarily in heave direction relative to the vessel.

The installation crane, in the embodiment shown the first hoisting device of the installation crane, crane is provided with a heave compensation device that is adapted to compensate for sea-state induced heave motion of a wind turbine mast, supported by the installation crane, relative to the mast mounting structure of a floating foundation.

In particular for a hoisting device with one or more hoisting winches and hoisting cables, as is preferred here, suitable heave compensation devices are well known in the art, both in passive and active embodiments or hybrids thereof. For example, the hoisting device includes one or more winches and one or more hoisting cables, the heave compensation being formed by suitable operation of the (electric) winches and/or by one or more heave compensation cylinders carrying one or more cable sheaves over which a hoisting cable is passed.

In the method use is made of a mast alignment system that is configured to engage on the suspended wind turbine, e.g. on the mast of the suspended wind turbine, and to bring and maintain the mast of the suspended wind turbine in alignment with the mounting axis of the floating foundation in order to compensate for sea-state induced motions, at least including tilt motions in one or more vertical planes, of the wind turbine mast relative to the mounting axis of the floating foundation.

The method comprises—with the hull of the vessel in floating condition and the floating foundation in floating condition—the steps of:

suspending the wind turbine from the crane by means of the hoisting system, positioning the lower end of the mast of the suspended wind turbine above the mast mounting structure of the floating foundation, operating the heave compensation device so as to compensate for sea-state induced heave motion of the wind turbine mast relative to the mast mounting structure of the floating foundation, operating the mast alignment system so as to bring and maintain the mast of the wind turbine in alignment with the mounting axis of the floating foundation in order to compensate for sea-state induced tilt motions of the wind turbine mast relative to the mounting axis of the floating foundation, whilst the heave compensation device and the mast alignment system are in operation, operating the hoisting system and thereby lowering the suspended wind turbine with the lower end portion of the mast onto the mast mounting structure of the floating foundation, fastening the mast with the lower end portion thereof to the mast mounting structure of the floating foundation.

The method thus envisages the provision and operation of a mast alignment system in order to allow for the correct landing of the lower end portion of the mast onto the mast mounting structure of the floating foundation. In general terms, the mast alignment system serves to force the suspended wind turbine out of its plumb line orientation so as to bring and keep the mast thereof in alignment with the mounting axis, which is continuous subject to at least tilting motions relative to the mast due to sea-state acting on the floating hull of the vessel and on the floating foundation.

The invention allows, for example, to anchor multiple floating foundations at their final location in an offshore windfarm, all without wind turbine, and then sail the vessel to the windfarm and successively install the wind turbines on the floating foundations. This approach allows for a more (cost-)effective approach to establishing a floating foundation offshore windfarm than the above-referenced approach wherein completely assembled floating wind turbines have to be towed over relatively long distance to their location in the windfarm. In an embodiment, floating foundations of a windfarm are installed in one calendar year and the associated wind turbines are installed on these foundations in a later calendar year.

The invention, for example, allows for the use of deep draught floating foundations, e.g. spar-type foundations, without the need for a deep draught installation location close to shore, like the above-referenced fjord.

In embodiments, landing the mast onto the mast mounting structure may already cause, or is followed by, a preliminary fastening between the mast and the foundation being established, so that the wind turbine is stable relative to the foundation, e.g. allowing for ceasing the operation of the alignment system, e.g. allowing for disengaging the alignment system.

For example, the lower end portion of the mast is configured for stabbing thereof into or over the mast mounting structure of the floating foundation, said stabbing connection providing a stable preliminary fastening between the mast and the foundation.

In an example, one or more preliminary fastener devices are provided at the lower end portion and/or on the mast mounting structure that establish, e.g. automatically or on command, a preliminary fastening between the mast and the foundation. Then a final fastening of the lower end portion to the mast mounting structure may be performed, e.g. providing a connection by bolts, welding, grouting, etc.

In an embodiment, the lower end portion of the mast and the mast mounting structure are provided with cooperating self-actuating fastening members, e.g. like an automatic latch, that fasten the mast to the foundation In embodiments, at least the mast alignment system remains in operation during a part or all of the fastening step, e.g. the system serving or assisting in stabilizing of the wind turbine relative to the foundation during this step.

In embodiments, at least the heave compensation device remains in operation during a part or all of the fastening step, e.g. the device serving or assisting in supporting at least part of the weight of the wind turbine relative to the foundation also during this step. In another embodiment, the weight of the wind turbine is transferred from the crane onto the floating foundation once the lower end portion of the mast has been lowered onto the mast mounting structure of the floating foundation. This can be done, e.g. by suitable operation of the hoisting system and/or the heave compensation device.

In a preferred installation method—at least during the step of lowering the mast onto the foundation—the vessel is facing the waves with its bow or its stern. Most preferably, the vessel is embodied to suspend the wind turbine at the bow or the stern of the vessel, preferably in the mid-plane of the vessel.

It is preferred, for the floating foundation to be restrained by a restraining system at least, or solely, in the horizontal plane relative to the vessel, at least to some degree, during the wind turbine installation process. The restraining can, for example, involve multiple mooring lines extending in different directions being arranged between the floating foundation on the one hand and hull of the vessel on the other hand, so as to provide a coupling of the floating foundation and the hull at least, or solely, in the horizontal plane.

In an embodiment, the restraining system is provided at the bow of the semi-submersible vessel.

The installation crane 404 is provided with booms for each of the two hoisting devices. Thus, the hoisting device comprise two spaced apart jibs, that preferably support the one or more suspension elements, which are connected to the first trolley or the wind turbine engagement device.

The two jibs can be arranged in an active position, for supporting the first trolley and the first wind turbine engagement device in an active position, and an inactive position, for moving along a nacelle or blade of a partially or fully assembled wind turbine in an assembly station.

The installation crane is configured such that, when an assembled installation crane is supported by the installation crane, the jibs extend above the nacelle of the wind turbine, and the is positioned between the jibs, when seen in a frontal view.

The vessel 401 furthermore comprises a mast-receiving well 452, see FIG. 28, that is sunk into the hull, at the second wind turbine assembly station, which is assembly station is configured for mounting blades to the nacelle of a wind turbine using a blade manipulator (not shown in the figure), and wherein the mast-receiving well is configured to receive therein at least a portion of the mast of the wind turbine, preferably using the wind turbine installation crane, such that the distance between the nacelle and the storage deck is reduced, preferably is less than the length of the turbine blade, more preferably less than four fifth the length of the blade, to facilitate mounting blades to the nacelle.

It is submitted that a semi-submersible vessel is well-suited to be provided with a mast-receiving well that is sunk into, or even through, the hull, which well is configured to receive therein at least a portion of the mast of the wind turbine in the course of the assembly of the wind turbine.

In the preferred embodiment shown, the mast-receiving well extends into a support column, optionally even into the pontoon. The well, has a floor configured for the mast to stand thereon, e.g. the floor being integrated with the pontoon and/or with a lower section of the support column.

The mast-receiving well is arranged with reach of the installation crane, thereby allowing for use of the crane to place the mast, or part thereof in the well and to later remove the assembled, or partly assembled wind turbine from the well, the wind turbine then being placed by the crane on the foundation.

The installation crane is mounted directly above a support column at the end of a row of columns, so practically at a corner of the deckbox structure, and the mast-receiving well is provided in the adjacent support column of the same row of columns on the pontoon. In another embodiment, e.g. when the vessel has one installation crane at one corner of the deckbox structure above a support column at the end of a row of columns on the one pontoon, the mast-receiving well is arranged into or through a support corner at the end of the row of columns on the other pontoon, e.g. the crane and the well both being located at the stern of the vessel, each, for example, practically at a corner of the deckbox structure.

For example, the well has a depth of at least 15 meters, e.g. at least 30 meters, measured from the deck of the deckbox structure. For example, the well has a depth over 40 meters, which is, for example, possible within a vessel like the recently launched Sleipnir vessel as the overall height there is about 50 meters.

For example, an embodiment of the well having a depth of at least 30 meters, e.g. over 40 meters, allows for receiving a significant portion of the entire mast of a wind turbine in the well, e.g. as mast heights may vary between 75 and 110 meters in practical embodiments. Due to the placement in the well, the top of the mast is closer to the deck, which facilitates operations like mounting the nacelle on the mast top, mounting one or more, e.g. all, blades to the nacelle, etc.

In view of the height of the mast, and the advantages of having the top end relatively close to the deck for performing some assembly steps, e.g. mounting the nacelle and/or mounting one or more, e.g. all, blades, it is envisaged that in embodiments the well extends through the hull, e.g. through a support column and the further down through the pontoon. In the latter version the well resembles a moonpool or shaft entirely through the hull, e.g. allowing for operations wherein the mast sticks out below the bottom of the pontoon of the vessel. In such an open bottomed well, the mast or part thereof can be suspended, e.g. by means of winch driven cables, e.g. said cables engaging on the lower end of the mast.

An open bottomed well may allow for arranging, e.g. suspending, the mast (or mast part) therein such that the top thereof is in proximity of the deck. For example, this allows for the nacelle to be moved substantially horizontally over the deck, e.g. by one or more vehicles or by a cart, e.g. over rails mounted on deck, e.g. skidded by a skid cart, in order for the nacelle to be positioned over the mast top end and connected thereto. For example, the mast is then lifted over part of its height to a height that is suited for mounting one or more blades to the nacelle.

The above described operation could in combination with an closed bottom well, so one that does extend into the hull yet not through the hull, also be carried out when use is made of a two-part mast for the wind turbine. Herein the upper part of the mast is placed in the well and the nacelle mounted then on top thereof.

With reference to FIGS. 33-38 the use of a semi-submersible vessel in the on-board assembly of a wind turbine and the installation by means of a crane of the vessel of the assembled wind turbine on a foundation will be discussed.

The FIGS. 33-38 illustrate a semi-submersible vessel 1000 which comprises a twin-pontoon floating hull with:
a deckbox structure 1001;
two parallel pontoons 1002, 1003,
for each of the two pontoons 1002,1003 an associated row of (here four; in other known embodiments three or two) support columns 1010-1013, 1014. These columns each extend upward from the respective pontoon. The deckbox structure 1001 is supported on all of the support columns. The columns contribute along with the pontoons to the buoyancy of the vessel.
Reference numeral 1004 indicates the bow of the vessel and 1005 the stern.

The deckbox structure 1001 has a deck 1006 and a box bottom 1007 that is above the waterline.

The vessel 1000 is provide with an installation crane 1100 that is mounted on the deckbox structure and is configured to install an assembled wind turbine on a foundation (not shown) that is present within reach of the crane 1100.

As is known in the art, the foundation can be a sea-bed mounted or fixed foundation, e.g. a monopile foundation or a jacket-type foundation. In another embodiment, e.g. for deeper water, the foundation is a floating foundation, e.g. a spar type foundation (e.g. as in the Hywind project), or as disclosed in WO2009/131826.

The depicted crane 1100 is a tub mounted crane, wherein the slewable superstructure 1101 of the crane is mounted via a bearing, e.g. a roller bearing or an arrangement of bogies, on a tub 1102 that is integral with the deckbox structure 1001. As shown and preferred, the crane 1100 is arranged directly above a support column 1010 at the end of a row of columns.

The crane 1100 has a pivotal boom 1103 that is pivoted up and down by means of a luffing mechanism, here comprising winch driven luffing cables 1104 extending between the boom 1103 and a gantry structure of the superstructure 1101.

The crane 1100 has a reach with a capacity to handle a completely assembled wind turbine on its own, as will be explained herein.

In other embodiment, the crane is a mast crane.

Generally, as is known in the art, a completely assembled wind turbine that is to be installed on an offshore foundation comprises at least a part of a wind turbine mast, preferably the entire mast, and a rotor assembly that is mounted on the mast, commonly a nacelle having a hub, which rotor assembly is, preferably, provided with one or more, e.g. all, of the rotor blades, ahead of installation on the foundation.

It is envisaged that the assembly of the wind turbine is at least in part done on-board the vessel 1000.

Preferably, even when the foundation is a floating foundation, the vessel 1000 is located at the offshore windfarm, e.g. moored adjacent the foundation at its final location in the windfarm, when performing one of more of the assembly step for assembly of the wind turbine.

It is illustrated in FIGS. 33-38 that at an assembly station on-board of the vessel 1000, the hull of the vessel is provided with a mast-receiving well 1040 that is sunk into, or through, the hull.

Figure 33:
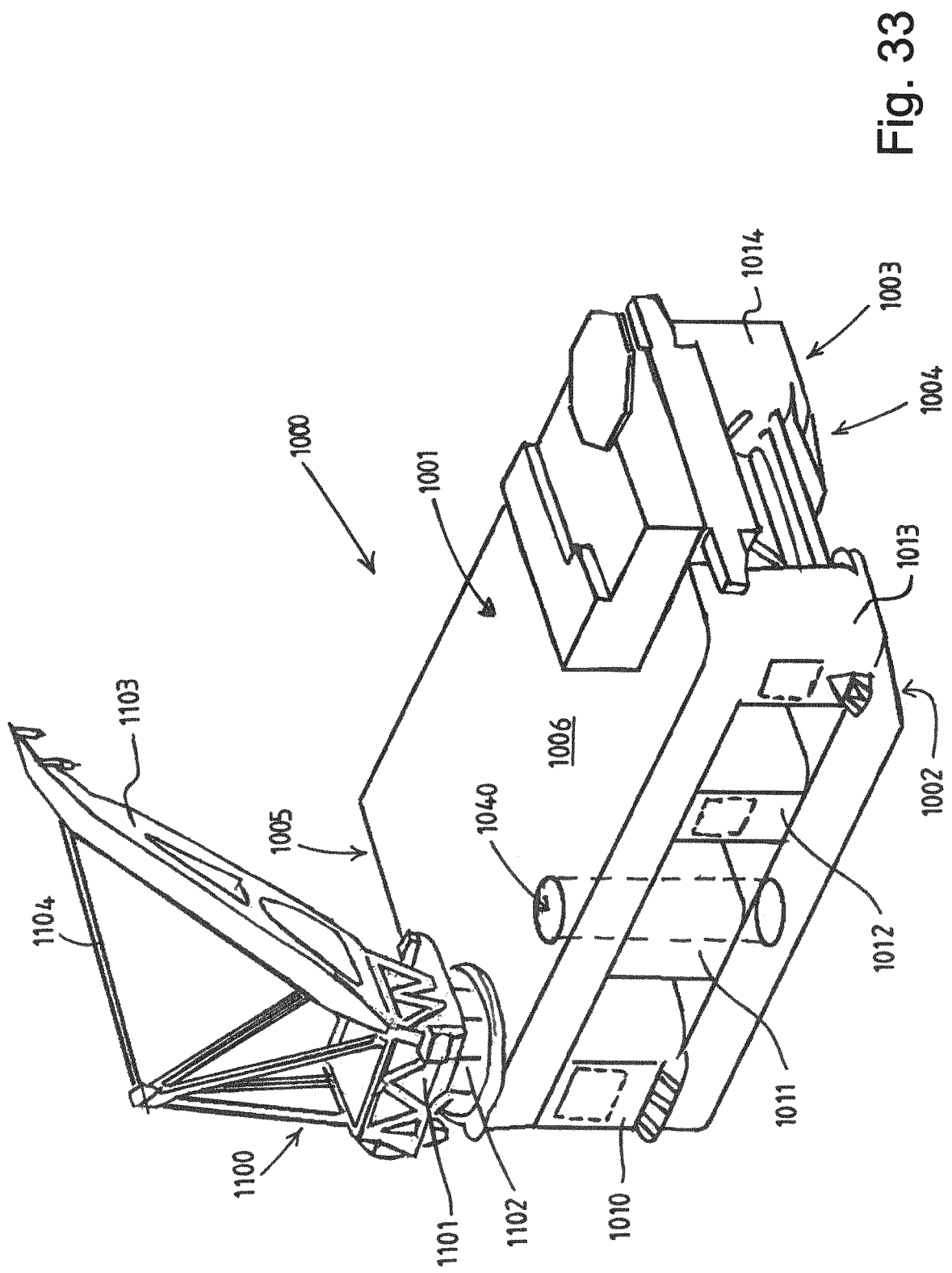
FIG. 33 shows a semi-submersible vessel with an installation crane and a mast-receiving well.
Figure 34:
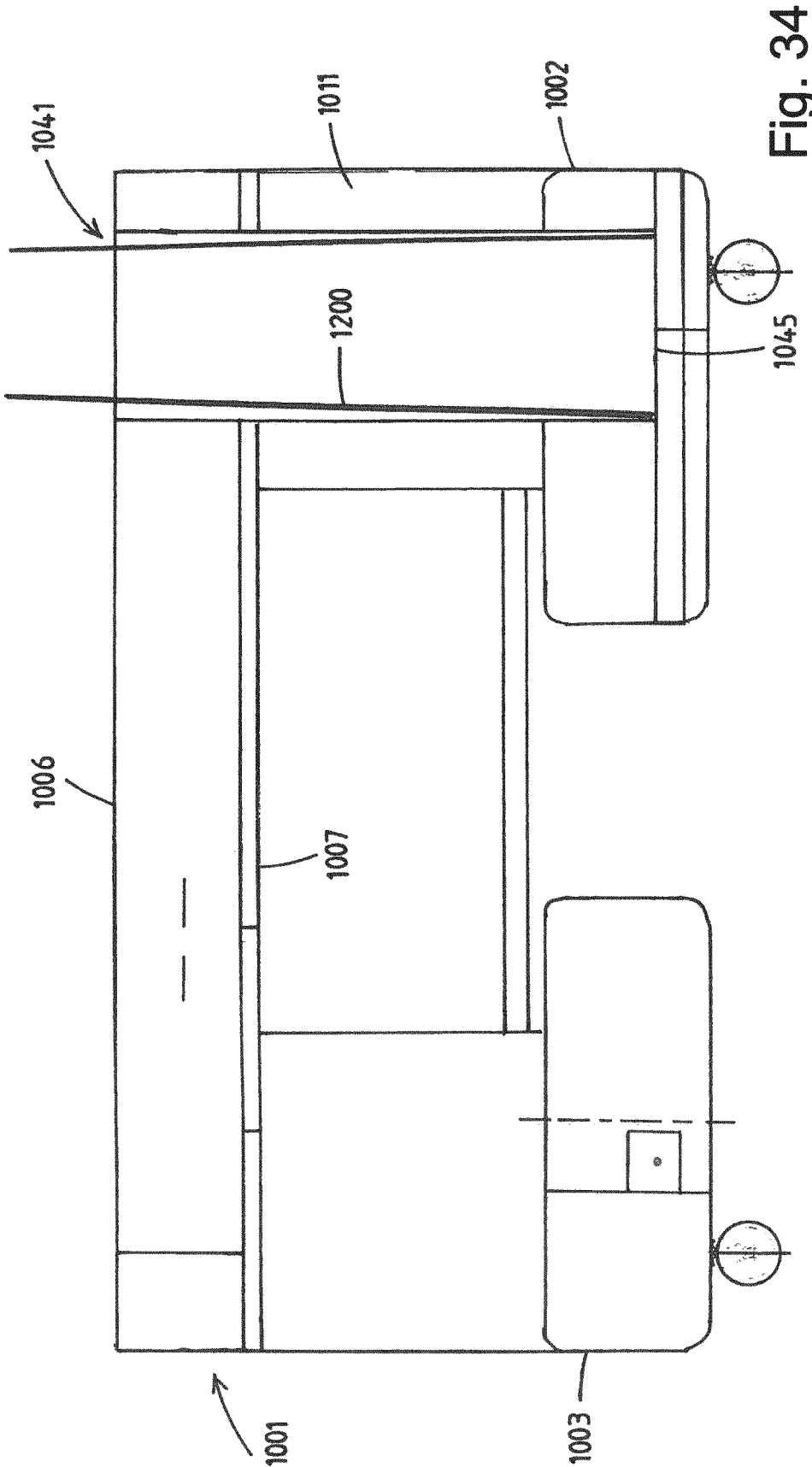
FIG. 34 shows a cross-section of the vessel with the mast-receiving well.

As can best be seen in FIGS. 33 and 34, in embodiments, the well 1040 extends from a top opening 1041 thereof, e.g. flush with the deck of the vessel, into a support column 1011 of the hull.

The well 1040 is configured to receive therein at least a portion of the mast of the wind turbine during an assembly step of the wind turbine, e.g. during mounting of the rotor assembly, here nacelle, on the mast and/or during assembly of one or more, e.g. all, of the rotor blades to the rotor assembly.

By way of example, the depicted vessel 1000 has a breadth of 100 meters, a length of the deckbox of 180 meters, a height of the deckbox of 12 meters, a height of the columns of 24 meters, a height of the pontoons of 14 meters. The columns have a horizontal cross-section of at least 20×20 meters.

The total height between the deck and the bottom of the pontoons is, in this example, 50 meters. This height, as well as the structural strength and integration of the column in the hull, allows for effective implementation of the well 1040 in the column.

The available height in the hull of a semi-submersible vessel allows for the well 1040 to be embodied so as to receive therein a significant portion of the total mast of the wind turbine in the course of the assembly of the wind turbine.

The well 1040 may extend to a bottom end or floor of the well that is located in the column. As shown, in another embodiment, the mast-receiving well extends through the entire height of the support column and even into the pontoon under the column.

As shown, the well 1040 has a floor 1050, which is, preferably, configured for the mast to stand thereon. It is illustrated here that the floor 1050 is integrated with the structure, e.g. bulkheads, walls, of the pontoon and/or with the support column, e.g. with a lower section of the support column.

It will be appreciated that the mast-receiving well 1040 can be retrofitted in existing semi-submersible (heavy lift) crane vessels.

It is illustrated that, as preferred, the mast-receiving well 1040 is arranged within reach of the installation crane 1100.

It is illustrated that the installation crane 1100 is mounted directly above a support column 1010 at the end of a row of columns, so practically at a corner of the deckbox structure 1001, and the mast-receiving well 1040 is provided in the adjacent support column 1011 of the same row of columns on the pontoon.

The crane 1100 has sufficient lifting capacity, as preferred, to use the crane 1100 to place an entire wind turbine mast 1200, or an upper part thereof (e.g. having a length between 40-65% of the total mast) in the well 1040 and to later remove the assembled, or partly assembled wind turbine from the well, the wind turbine then being placed by the crane 1100 on the foundation.

In embodiments, as known in the art, the vessel has two, possible identical, cranes 1100, each fitted at a corresponding corner, e.g. at the stern, of the deckbox structure.

In an embodiment, the vessel 1000 has in addition to the crane 1100 configured to installation of the assembled, or partly assembled, wind turbine on the offshore foundation, a further crane mounted to the hull of lower hoisting capacity than the crane 1100. For example, an additional crane is provided for handling of wind turbine components, e.g. the mast, or mast parts, and/or the nacelle between storage locations therefore on the deck of the vessel and one or more assembly stations arranged within reach of the crane 1100.

As explained herein, an embodiment of the well 1040 having a depth of at least 30 meters, e.g. over 40 meters, allows for receiving a significant portion of the entire mast of a wind turbine in the well, e.g. as mast heights may vary between 75 and 110 meters in practical embodiments for offshore wind turbines.

Figure 35:
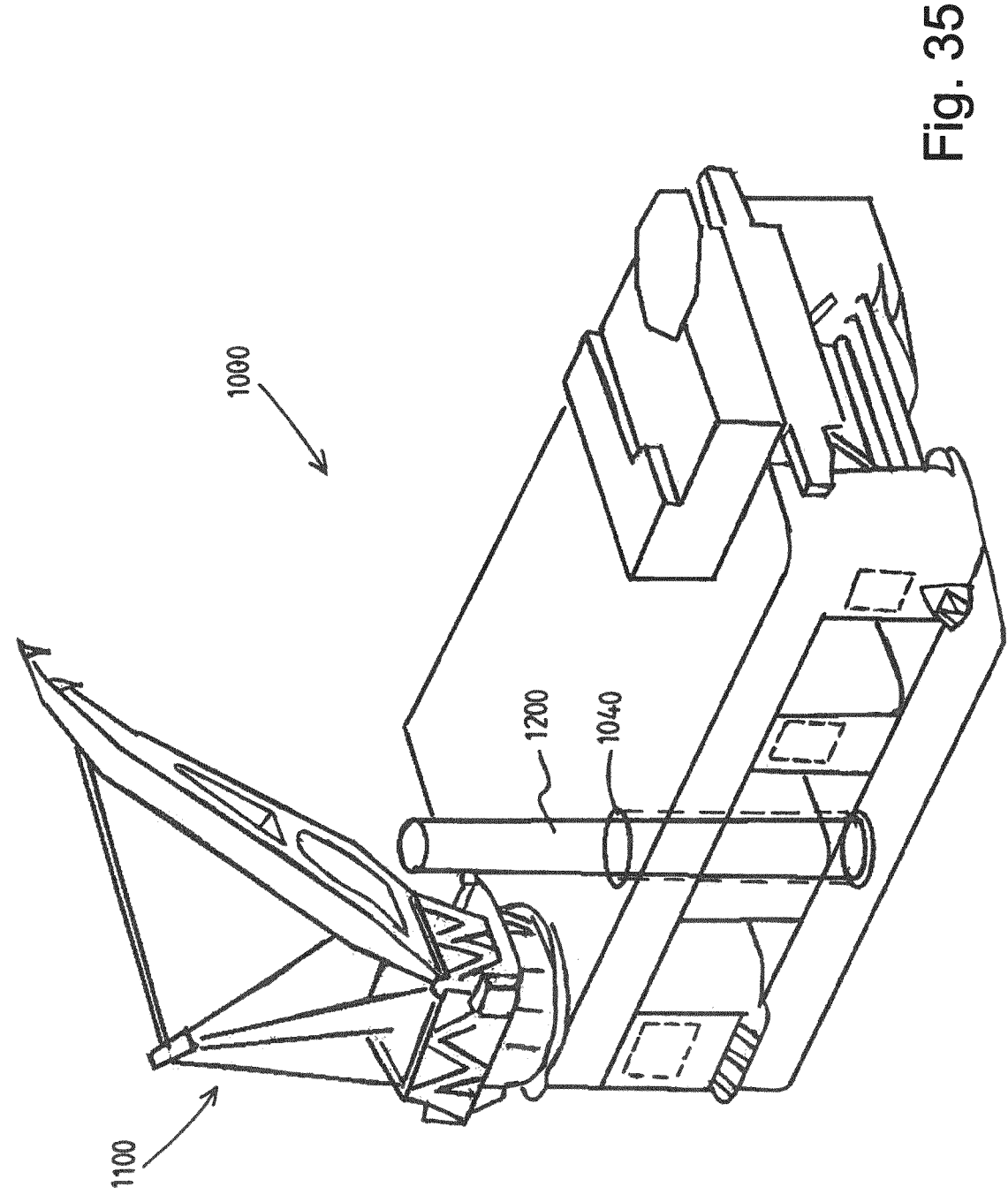
FIG. 35 shows the vessel of FIG. 33 with the mast arranged in the mast-receiving well.

FIG. 35 illustrates that an entire wind turbine mast 1200 has been placed in the well 1040, the mast having a height between 75 and 110 meters in this example. As can be seen, due to the placement of the mast 1200 in the well, the top of the mast is closer to the deck, which facilitates operations like mounting the nacelle on the mast top, mounting one or more, e.g. all, blades to the nacelle, etc.

Figure 36:
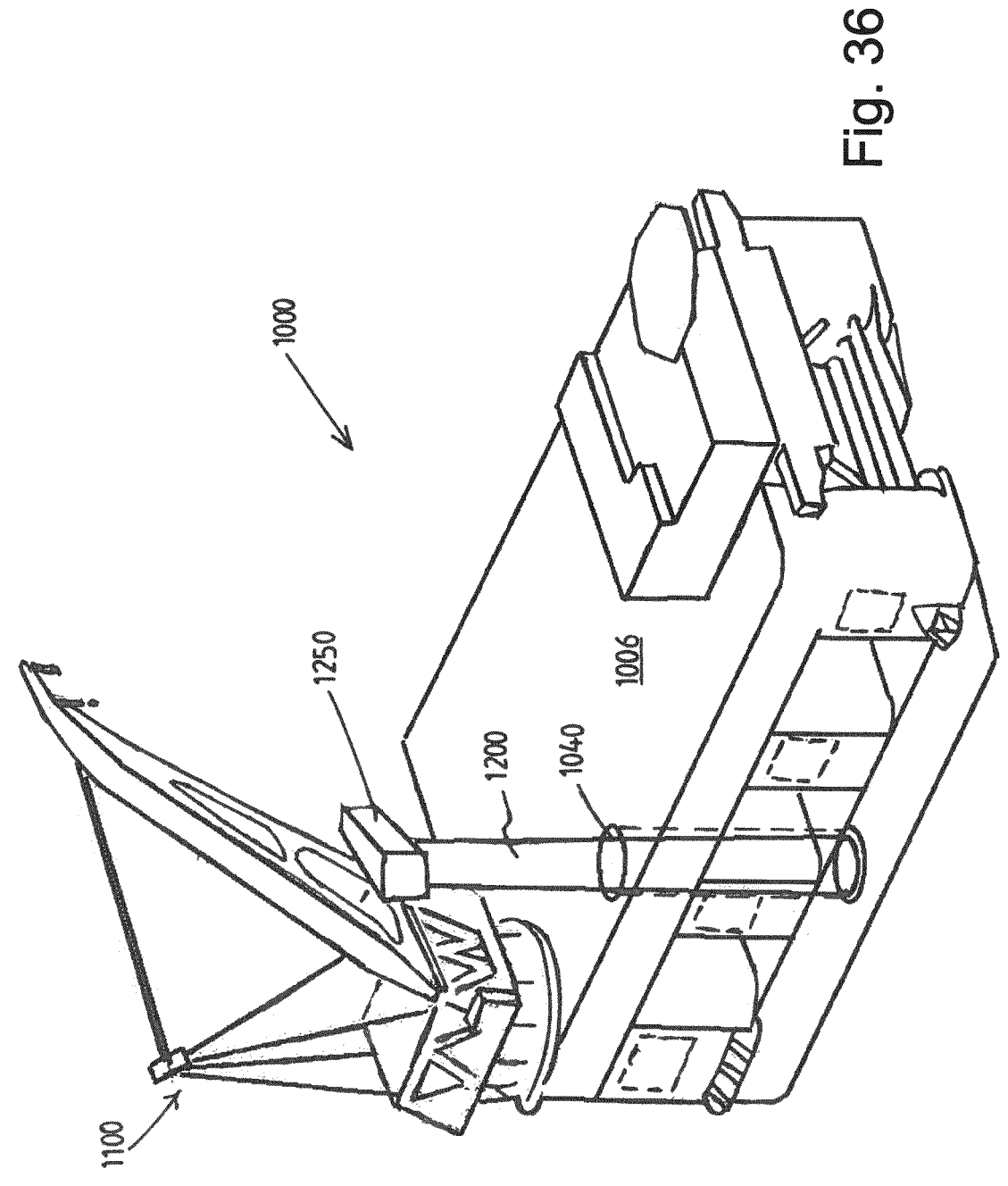
FIG. 36 shows the vessel of FIG. 35 with the nacelle mounted on top of the mast.

FIG. 36 illustrates that a nacelle 1250 has been lifted on top of the mast 1200, here by means of the crane 1100. The nacelle 1250 may have been stored in a storage area on the deck of the vessel.

In embodiments, this subassembly of mast 1200 and nacelle 1250, devoid of any blades, is lifted by means of the crane 1100 out of the well 1040 and then the crane 1100 is swung into a position wherein the mast is above the offshore foundation. The partly assembled wind turbine is then placed on the foundation and secured thereto. In a further assembly step, e.g. using the crane 1100, the blades 1275, 1276, 1277 are fitted to the nacelle.

In another approach, the nacelle 1250 is already, e.g. onshore, provided with two of the blades ahead of placing the nacelle on top of the mast. This approach is known in the field as the bunny ears approach. Then, only one further blade is installed once the wind turbine has been placed on the foundation. This can be done with the crane 1100, for example.

It is preferred, for one or more the blades 1275, 1276, 1277 to be mounted to the nacelle 1250 whilst mounted on the mast 1200, with the mast being received at least in part in the well 1040.

Figure 37:
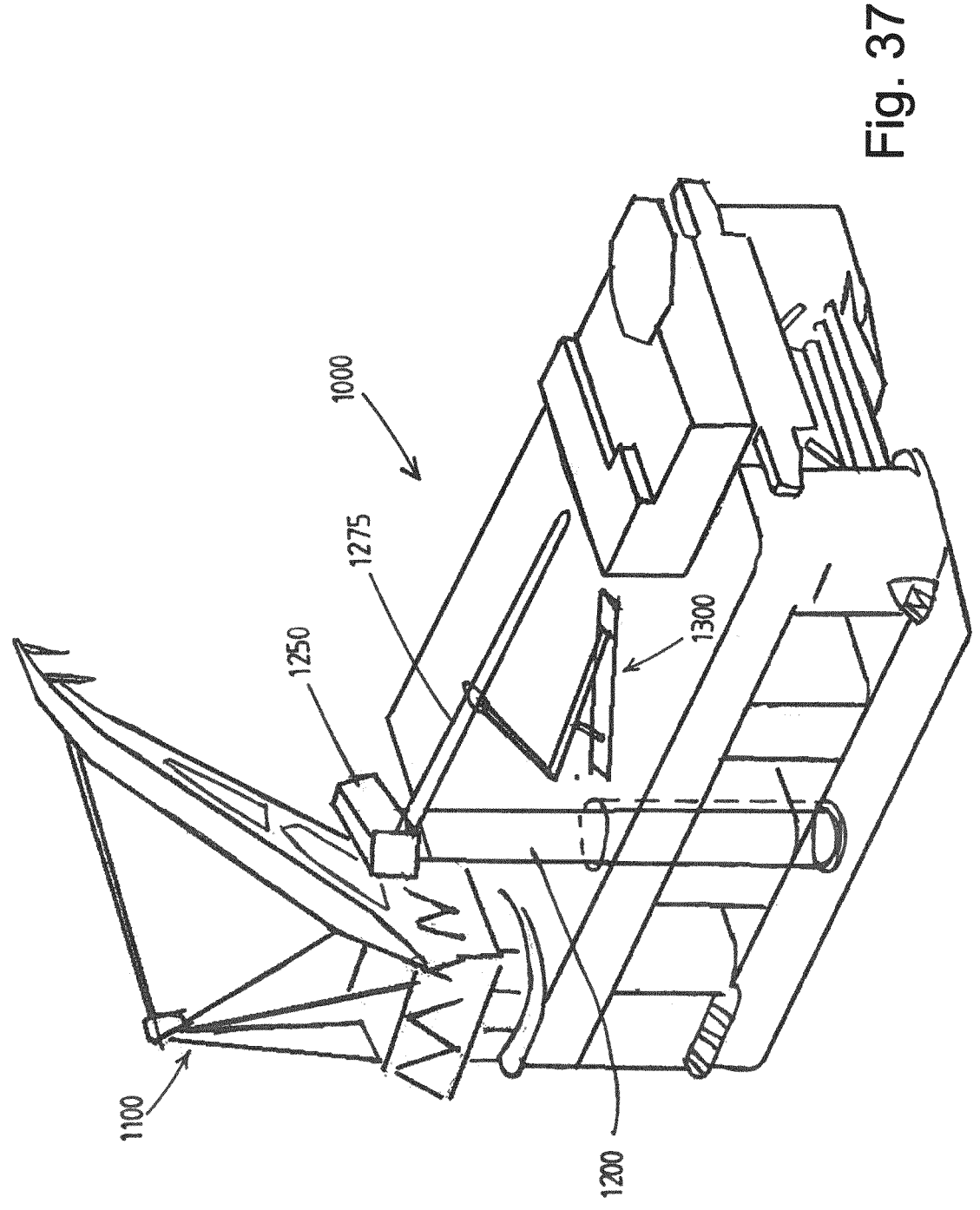
FIG. 37 shows the mounting of a first blade to the nacelle using a blade handling apparatus onboard the vessel.

FIG. 37 illustrates that one by one the blades 1275, 1276, 1277 are mounted to the nacelle 1250. Once all, here three, blades are mounted the wind turbine is completely assembled and ready to the lifted out of the well 1040 and placed on the foundation using the crane 1100.

FIG. 37 illustrates that, as preferred, not the installation crane 1100 is used for the mounting of the blades to the nacelle, but a blade handling apparatus 1300 that is configured for transferring a blade between the horizontal supply position and a fastening position, e.g. a tilted or horizontal fastening position.

FIG. 37 illustrates that the blade handling apparatus 1300 is placed on the deck of the vessel.

For example, as schematically shown, the apparatus 1300 is configured to bring the blade in a fastening position in which the root end of the blade is aligned with a blade mounting structure, wherein the blade handling apparatus comprises:

a blade gripper adapted for gripping the blade;

a base;

a pivotal boom, e.g. an articulated boom, to which the one or more blade grippers are attached, which boom is movable between a lowered position for gripping a blade in the horizontal supply position and a raised position in which the blade has said fastening orientation;

preferably, one or more actuators, e.g. on the boom, for manipulating the blade into the fastening position.

FIG. 37 illustrates an embodiment, wherein the horizontal rotational hub is provided with three blade mounting structures spaced by 120°, and wherein the fastening orientation is a tilted orientation, preferably for each blade to be installed using the blade handling apparatus 1300, corresponds to about the four-o'clock or to about the eight-o'clock position, seen in front view onto the nacelle, e.g. wherein the blade includes 30-40° with the horizontal.

FIG. 37 illustrates that, in an embodiment, the tilted orientation is the same for each of the three blades associated with the hub, the hub being rotated over 120° between each installation of a blade.

Figure 38:
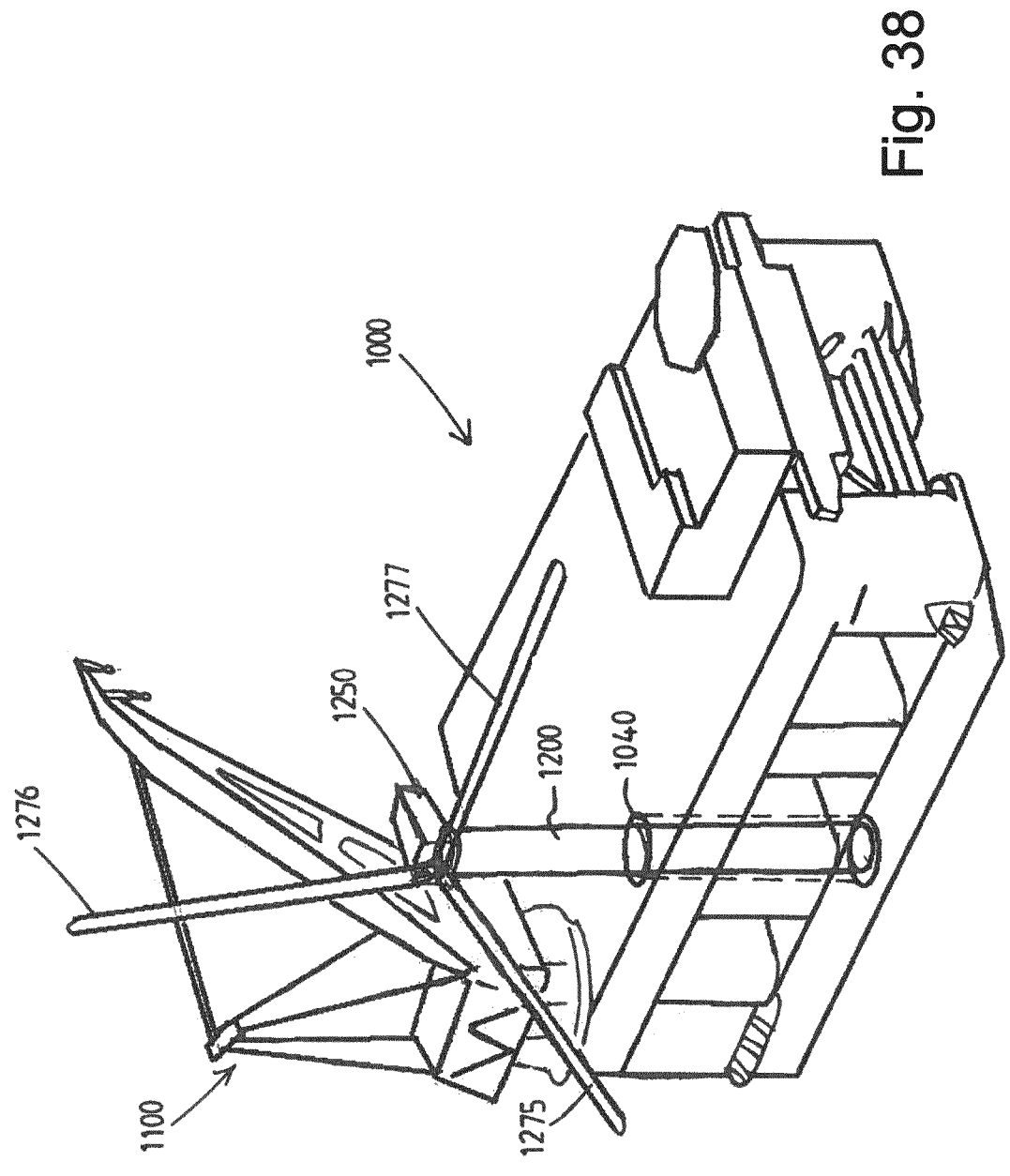
FIG. 38 shows the wind turbine completely assembled.

The FIG. 38 illustrates the completed assembly, all step having been performed at a single assembly station on-board of the vessel 1000, here at the well 1040.

The figures illustrate that, in embodiments, the nacelle 1250 is fitted on the mast 1200 so that the front of the nacelle, where the blades are fitted to the hub of the nacelle, faces outwards relative to a long side of the hull of the vessel. As preferred, and as shown, the axis of then hub is not perpendicular to the long side of the hull of the vessel, yet at an angle (when seen from above) between said perpendicular line and the side of the hull.

The FIG. 38 illustrates that a benefit of this arrangement of the hub of the nacelle as well as of arranging the well 1040 into or through a support column, is that one blade of the fully assembled wind turbine may extend outside of the hull, rather close to the deckbox and the crane 1100.

The apparatus 1300 may, not shown, have an articulated boom allowing to bring the blade in a horizontal fastening position for fastening the blade to the hub of the nacelle.

In another approach, not shown, it is envisaged that the well 1040 extends entirely through the hull, e.g. through a support column and then further down through the pontoon. In the latter version the well resembles a moonpool or shaft entirely through the hull, e.g. allowing for operations wherein the mast of the wind turbine sticks out below the bottom of the pontoon of the vessel. In such an open bottomed well, the mast or part thereof can be suspended, e.g. by means of winch driven cables, e.g. said cables engaging on the lower end of the mast.

The extension of the well through the hull, may, in embodiments, allow for the nacelle 1250 to be mounted on the top of the mast without the need for use of a crane. For example, the mast (or mast part) is suspended in the well such that the top thereof is in proximity of the deck. For example, this allows for the nacelle to be moved substantially horizontally over the deck, e.g. by one or more vehicles or by a cart, e.g. over rails mounted on deck, e.g. skidded by a skid cart, in order for the nacelle to be positioned over the mast top end and connected thereto. For example, the mast is then lifted over part of its height, e.g. using the crane 1100 or the suspension device that suspends the mast in the well 1040, to a height that is suited for mounting one or more blades to the nacelle, e.g. as discussed above.

In embodiments, the well 1040 extends through the deckbox structure at a location remote from any of the support columns of the hull, e.g. in the spacing between two support columns. For example, an additional well sidewall, e.g. tubular sidewall, is then fitted between the deckbox structure and the pontoon to provide a dry well in which the mast or mast part is to be placed.

The invention claimed is:

1. A vessel for assembling wind turbines and for installing the assembled wind turbine on a foundation, the vessel comprising:

a floating hull;

a wind turbine installation crane mounted on the floating hull;

a single main deck, wherein the single main deck is a wind turbine components storage deck, for storing components of a wind turbine; and at least one wind turbine assembly station, wherein the installation crane has at least one assembly side facing the at least one wind turbine assembly station, and has an installation side, and wherein the installation crane is configured to perform one or more wind turbine assembly steps, wherein the main deck is provided with an upend track for supporting an upend cart, to enable upending of wind turbine masts or foundation piles, wherein, during the upending process, the upend cart supports the bottom end of the pile, or mast, while the top end of the pile, or mast, is lifted by the installation crane, and thus, the bottom end of the pile, or mast, is guided along the deck, over the tracks, towards the installation crane, wherein the installation crane is provided with a wind turbine hoisting device having one or more wind turbine suspension elements, said wind turbine hoisting device being adapted to support and to raise and lower in a controllable manner an assembled wind turbine, the assembled wind turbine comprising a mast combined with the nacelle and the blades fitted, wherein the installation crane has a base section and a top section, wherein the top section is rotatable supported by a bearing, and wherein the top section can be rotated with the wind turbine hoisting device relative to the base section about a vertical axis, and wherein the hoisting device can thus transfer at least an upper mast part between the assembly stations and the installation side, wherein the installation crane is configured for arranging the assembled wind turbine from the at least one wind turbine assembly station into a mounting position, above a wind turbine foundation adjacent the vessel, at the installation side of the installation crane, for supporting an assembled wind turbine at the installation side in a mounting position above a foundation and for lowering the wind turbine onto the foundation.

2. The vessel according to claim 1, wherein, at the installation side of the crane, the main deck extends on opposite sides of the installation crane and, when the installation crane supports an assembled wind turbine above a foundation, the foundation is partially enclosed by the vessel on three sides.

3. The vessel according to claim 1, wherein the vessel comprises a catamaran like hull, with two main floaters extending along opposite sides of the vessel, and at the installation side of the crane, the hull extends at opposite sides of the installation crane, and wherein, when the installation crane supports an assembled wind turbine above a foundation, the foundation is partially enclosed by the hull of the vessel on three sides.

4. The vessel according to claim 1, wherein the upend track is located at a side of the installation crane opposite the installation side, and, when the vessel is at an installation location for mounting a wind turbine on a foundation, the installation crane is located between the upend track and the foundation.

5. The vessel according to claim 1, wherein the upend track and the installation crane are set up on a centre line of the vessel, and the upend track extends in a longitudinal direction of the vessel.

6. The vessel according to claim 1, wherein the at least one wind turbine assembly station is a first wind turbine assembly station, and wherein the vessel further comprises a second wind turbine assembly station, wherein the first assembly station is configured for supporting a mast in an upright installation position, wherein the second assembly station is configured for supporting the mast in an upright installation position with the nacelle in an installation position for mounting blades to the nacelle, and wherein the first wind turbine assembly station is located on a first side of the installation crane, the second assembly station is located on a second side of the installation crane.

7. The vessel according to according to claim 6, wherein the vessel further comprises a third wind turbine assembly station, and wherein the second and third wind turbine assembly station are located on opposite sides of the installation crane, and the first assembly station is located opposite a first vertical side of the wind turbine installation crane.

8. The vessel according to claim 1, wherein the vessel further comprises a blade handling apparatus for transferring a blade between a horizontal supply position and a fastening position adjacent the nacelle on top of a mast or an upper mast section.

9. The vessel according to claim 1, wherein the vessel comprises a foundation restraint system, the foundation restraint system being configured for engaging a floating foundation, and to reduce movement of the floating foundation relative to the vessel and/or monitor the movement of the floating foundation relative to the to the vessel.

10. The vessel according to claim 1, wherein the wind turbine installation crane is configured to actively compensate for sea-state induced movement of an assembled wind turbine relative to the foundation onto which the wind turbine is to be lowered.

11. The vessel according to claim 1, wherein the vessel furthermore comprises a mast-receiving well that is sunk into, or through, the hull, and wherein the mast-receiving well is configured to receive therein at least a portion of the mast of the wind turbine, such that the distance between the nacelle and the storage deck is reduced, to facilitate mounting blades to the nacelle.

12. The vessel according to claim 1, wherein the vessel comprises a nacelle support, the nacelle support being fixed to the deck of the vessel, such that a nacelle can be supported by the nacelle support at a distance above the deck to enable blades to be mounted to the nacelle.

13. A method for assembling wind turbines on a wind turbine assembly vessel, using a wind turbine assembly vessel, wherein the wind turbine assembly vessel comprises:

a floating hull;

a foundation restraint system;

a wind turbine components storage deck, for storing components of a wind turbine;

at least one wind turbine assembly station; and a wind turbine installation crane, mounted on the floating hull, wherein the wind turbine installation crane has at least one assembly side facing the at least one wind turbine assembly station, and has an installation side, wherein the method comprises:

moving one or more wind turbine components from the wind turbine components storage deck to the at least one wind turbine assembly station;

engaging a floating foundation with the foundation restraint system;

reducing movement of the floating foundation relative to the vessel and/or monitoring the movement of the floating foundation relative to the vessel; and using the installation crane to:

perform one or more assembly steps;

support the assembled wind turbine at the assembly side and arranging the assembled wind turbine from the assembly station into the mounting position, above a wind turbine foundation adjacent the vessel, at the installation side of the installation crane; and lower the assembled wind turbine onto the foundation.

14. The method according to claim 13, wherein the method further comprises the wind turbine assembly step of lifting the nacelle and hoisting the nacelle on the mast or upper mast part, using the wind turbine installation crane, and mounting the nacelle on the mast or upper mast part.

15. The method according to claim 13, wherein the method further comprises the wind turbine assembly step of arranging the mast or the upper mast part, with the nacelle mounted thereupon, in an upright installation position with the nacelle in an installation position for mounting a blade to the nacelle.

16. The method according to claim 13, wherein the method further comprises a blade mounting process for mounting the blades to the nacelle, the blades mounting process comprising one or more of the steps of:

lifting a first blade into a fastening position adjacent the nacelle, mounting the first blade to the nacelle, and rotating the nacelle into a successive installation position;

lifting a second blade into a fastening position adjacent the nacelle, mounting the second blade to the nacelle, and rotating the nacelle into a successive installation position; and lifting a third blade into a fastening position adjacent the nacelle, and mounting the third blade to the nacelle.

17. The method according to claim 16, wherein the nacelle is mounted on a nacelle support fixed to the deck of the vessel, such that the nacelle is supported by the nacelle support at a distance above the deck.

18. The method according to claim 13, wherein the method further comprises upending the mast or the upper mast part of the wind turbine from a horizontal storage position into the upright installation position, using the wind turbine installation crane.

19. The method according to claim 13, wherein the at least one wind turbine assembly station is a first wind turbine assembly station, located on a first side of the installation crane, the first side being opposite the installation side of the installation crane, and the vessel further comprises a second wind turbine assembly station, located on a second side of the installation crane, wherein the first assembly station is used for up-ending a mast or a top section of the mast and/or for mounting the nacelle on the mast or the top section of the mast, wherein the second assembly station is used for completing the assembly of the wind turbine using the installation crane, and/or for mounting the blades to the nacelle, and wherein the installation crane is used for arranging the mast or top section of the mast from the first assembly station to the second assembly station, for arranging the assembled wind turbine from the second assembly station to the installation side of the installation crane, and for lowering the assembled wind turbine on the foundation.

20. A method for assembling wind turbines on a wind turbine assembly vessel, using a wind turbine assembly vessel, wherein the wind turbine assembly vessel comprises:

a floating hull;

a wind turbine components storage deck, for storing components of a wind turbine, a lower mast part, an upper mast part, a rotor assembly;

at least one wind turbine assembly station; and an installation crane, mounted on the floating hull, wherein the installation crane has at least one assembly side facing the at least one wind turbine assembly station, and has an installation side, wherein the method comprises:

moving one or more wind turbine components from the wind turbine components storage deck to the at least one wind turbine assembly station;

a blade mounting process for mounting the blades to the nacelle, the blades mounting process comprising one or more of the steps of:

lifting a first blade into a fastening position adjacent the nacelle, mounting the first blade to the nacelle, and rotating the nacelle into a successive installation position;

lifting a second blade into a fastening position adjacent the nacelle, mounting the second blade to the nacelle, and rotating the nacelle into a successive installation position; and lifting a third blade into a fastening position adjacent the nacelle, and mounting the third blade to the nacelle; and using the installation crane to:

perform one or more assembly steps;

support the assembled wind turbine at the assembly side and arranging the assembled wind turbine from the assembly station into the mounting position, above a wind turbine foundation adjacent the vessel, at the installation side of the installation crane; and lower the assembled wind turbine onto the foundation.

* * * * *